US012600043B2

(12) United States Patent　　　　　(10) Patent No.:　US 12,600,043 B2

Camasmie　　　　　　　　　　　　(45) Date of Patent:　　Apr. 14, 2026

(54) ROBOT FOR ASSISTING WITH AND PERFORMING HOUSEHOLD CHORES

(71) Applicant: Symbol Robotics Inc., Winter Park, FL (US)

(72) Inventor: Paulo Camasmie, Winter Park, FL (US)

(73) Assignee: Symbol Robotics Inc., Winter Park, FL (US)

( * ) Notice: Subject to any disclaimer, the term of this patent is extended or adjusted under 35 U.S.C. 154(b) by 0 days.

(21) Appl. No.: 18/797,905

(22) Filed: Aug. 8, 2024

(65) Prior Publication Data

US 2025/0050507 A1　　　Feb. 13, 2025

Related U.S. Application Data

(60) Provisional application No. 63/531,465, filed on Aug. 8, 2023.

(51) Int. Cl.
B25J 5/00　　　　(2006.01)
B25J 9/00　　　　(2006.01)
B25J 9/16　　　　(2006.01)
B25J 11/00　　　(2006.01)

(52) U.S. Cl.
CPC ............. B25J 11/008 (2013.01); B25J 5/007 (2013.01); B25J 9/0009 (2013.01); B25J 9/163 (2013.01); B25J 9/1661 (2013.01)

(58) Field of Classification Search
CPC ........ B25J 9/163; B25J 9/0009; B25J 19/023; B25J 9/1661; B25J 5/007; B25J 11/009; B25J 11/0005; B25J 11/008
See application file for complete search history.

(56) References Cited

U.S. PATENT DOCUMENTS

| | | | | |
|---|---|---|---|---|
| 7,269,479 | B2 * | 9/2007 | Okamoto | ............... B25J 9/0003 |
| | | | | 901/2 |
| 10,913,151 | B1 | 2/2021 | Hinkle | |
| 11,383,387 | B2 * | 7/2022 | Youn | .................... B25J 11/0015 |
| 2004/0059467 | A1 | 3/2004 | Lau et al. | |
| 2014/0246258 | A1 * | 9/2014 | Wyrobek | ............. B25J 19/0016 |
| | | | | 180/21 |

(Continued)

OTHER PUBLICATIONS

Cakmak et al., Towards a comprehensive chore list for domestic robots, 2013, IEEE, p. 93-94 (Year: 2013).*

(Continued)

*Primary Examiner* — Mcdieunel Marc
(74) *Attorney, Agent, or Firm* — The Webb Law Firm

(57)　　　　　　ABSTRACT

A folding robot for assisting with and performing household chores includes a head having a screen and a sensor, an elongate neck member, a torso, one or more arms connected to the torso, a riser member connected and rotatable with respect to the torso, one or more legs connected to the riser member by a hip joint, and a controller configured to send and receive data associated with the robot for completion of household tasks. Each arm includes a first arm member, a second arm member, a wrist member, and at least two fingers. Each leg includes a leg member, a first drive wheel disposed at a first end of the leg member coaxial with the hip joint, and a second drive wheel disposed at a second end of the leg member. The first drive wheel and second drive wheel are independently controllable for travel of the robot.

19 Claims, 58 Drawing Sheets

(56)  References Cited

U.S. PATENT DOCUMENTS

| | | |
|---|---|---|
| 2017/0326724 A1 | 11/2017 | Wei et al. |
| 2019/0380552 A1* | 12/2019 | Han .................... G05D 1/0225 |
| 2021/0166592 A1* | 6/2021 | Kang .................. G05D 1/0274 |
| 2021/0170610 A1* | 6/2021 | Kang ..................... B25J 9/161 |

OTHER PUBLICATIONS

Veseli et al., How Service Oriented Architecture enhances utilization of robots in commonplace: a case study on the Polog region. 2022, IEEE, p. 1-5 (Year: 2022).*

Yamazak et al., Home-Assistant Robot for an Aging Society, 2012, IEEE, p. 2429-2441 (Year: 2012).*

Beetz et al., The Assistive Kitchen—A demonstration scenario for cognitive technical systems, 2008, IEEE, p. 1-8 (Year: 2008).*

Mondal et al., Personal robot: Towards developing a complete humanoid robot assistant using the Internet of Things, 2017, IEEE, p. 1-6 (Year: 2017).*

Shah et al., Unsupervised Maneuvering Robot for Scouring Application, 2019, IEEE, p. 1-5 (Year: 2019).*

Luo et al., CNN Based Reliable Classification of Household Chores Objects for Service Robotics Applications, 2019, IEEE, p. 547 -552 (Year: 2019).*

Fung et al., An augmented reality system for teaching sequential tasks to a household robot, 2011, IEEE, p. 282-287 (Year: 2011).*

* cited by examiner

Battery
75%
recharging
---->>>>--

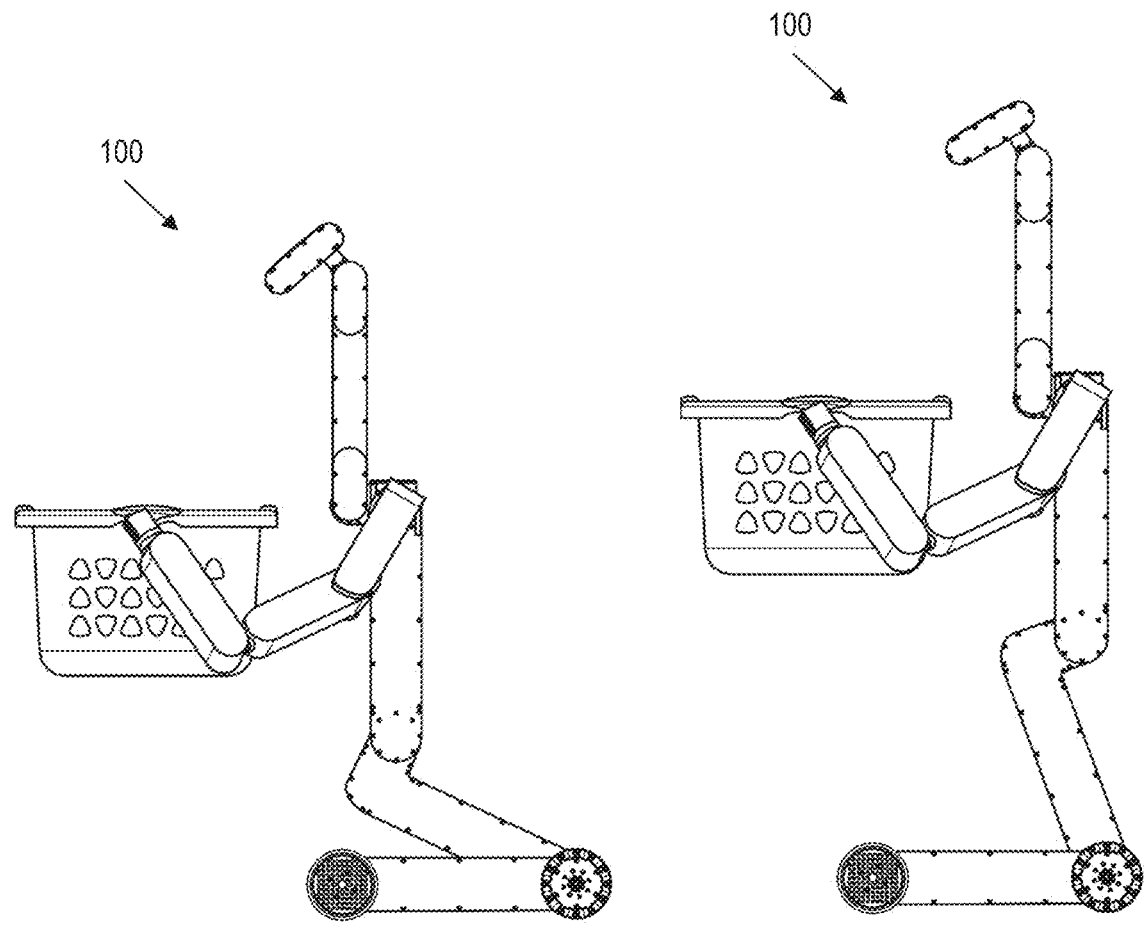
FIG. 45                                    FIG. 46

134

140                     140

116

500

500

500

ROBOT FOR ASSISTING WITH AND PERFORMING HOUSEHOLD CHORES

CROSS REFERENCE TO RELATED APPLICATION

This application claims the benefit of U.S. Provisional Patent Application No. 63/531,465, which was filed Aug. 8, 2023, the disclosure of which is incorporated by reference herein in its entirety.

BACKGROUND

Field of the Disclosure

The present disclosure relates to a robot for assisting with and performing household chores, and particularly, to a folding robot for assisting with and performing household chores having multiple states and modes defined by multiple different folding configurations.

Description of Related Art

Existing robots for home use and for the completion of household tasks and chores are generally limited in their functionalities and are only capable of completion of the tasks for which they are designed. For example, robot (i.e., automated) vacuums, mops, lawn mowers, security systems and the like each have the dedicated functionality of only vacuuming the floor, mopping the floor, mowing the lawn, or security monitoring, respectively. These household robots are also limited in their size and orientations that contribute to their limited functionality and cause issues related to versatility, maneuverability, storage, and powering and/or battery charging. Industrial automation and known humanoid robots are similarly limited in their size, orientations and functionality, and their cost and energy consumption make home use unattainable for general consumers. Further, none of these robots have the capacity to independently learn how to complete tasks from prior experience, experience of other robots, communication networks such as the internet, and through human interaction, as well as to teach other robots and humans how to complete tasks.

In view of the foregoing, there exists a need for a robot for assisting with and performing household chores, and particularly, to a folding robot having multiple states and modes defined by multiple different folding configurations for assisting with and performing household chores.

SUMMARY

Accordingly, aspects of the present disclosure are directed to non-limiting embodiments of a robot for assisting with and performing household chores.

According to an aspect of the disclosure, a robot for assisting with and performing housing chores includes a head having a screen and one or more first sensors, an elongate neck member, a torso, one or more arms connected to the torso by a shoulder joint, a riser member connected to the torso and rotatable with respect to the torso, one or more legs connected to the riser member by a hip joint, and at least one controller configured to send and receive data associated with the robot for completion of household tasks. Each of the one or more arms includes a first arm member, a second arm member, a wrist member, and at least two fingers. Each of the one or more legs includes a leg member, a first drive wheel disposed at a first end of the leg member coaxial with the hip joint, and a second drive wheel disposed at a second end of the leg member. The first drive wheel and second drive wheel are independently controllable for travel of the robot.

Further, the robot is configured to move and fold such that it has multiple states and modes of operation defined by a task to be completed, and in which different members and components are extended, folded, moved, or otherwise positioned for completion of various household tasks. One of the various states or modes includes a standby mode in which the robot is folded for minimized space occupation, such that it may be stored in a closet or under furniture until it receives instructions to complete a task.

According to another aspect of the disclosure, a system for operating a robot includes at least one processor programmed or configured to receive data associated with the robot for completion of household tasks, send data associated with the robot for completion of household tasks, learn sequences of operation of the robot for completion of household tasks, teach sequences of operation of the robot for completion of household tasks, and execute operation of the robot for completion of household tasks.

According to another aspect of the disclose, a computer program product for providing one or more features with regard to a robot, the computer program product including at least one computer-readable medium including one or more instructions that, when executed by at least one processor, cause the at least one processor to receive data associated with the robot for completion of household tasks, send data associated with the robot for completion of household tasks, learn sequences of operation of the robot for completion of household tasks, teach sequences of operation of the robot for completion of household tasks, and execute operation of the robot for completion of household tasks.

According to additional aspects of the disclosure, the robot is configured to assist with daily chores, saving a user time and inconvenience. The robot is further configured to map and navigate an environment and manipulate it with members such as arms and hands. The robot is useful for any class of users, but is particularly useful for users living alone, users with children, seniors, and users with disabilities.

Non-limiting illustrative examples of the embodiments of the present disclosure will now be described in the following numbered clauses.

Clause 1: A robot for assisting with and performing household chores, comprising: a head having a screen and one or more first sensors; an elongate neck member; a torso; one or more arms connected to the torso by a shoulder joint, wherein each of the one or more arms comprise: a first arm member; a second arm member; a wrist; and at least two fingers; a riser member connected to the torso and rotatable with respect to the torso; one or more legs connected to the riser member by a hip joint, wherein each of the one or more legs comprise: a leg member; a first drive wheel disposed at a first end of the leg member, coaxial with the hip joint; and a second drive wheel disposed at a second end of the leg member, wherein the first drive wheel and second drive wheel are independently controllable for travel of the robot; and at least one controller configured to send and receive data associated with the robot for completion of household tasks.

Clause 2: The robot of clause 1, wherein the robot is configured to move and fold to multiple states such that the components including the head, the elongate neck member, the torso, the one or more arms, the first arm member, the second arm member, the wrist member, the at least two fingers, the riser member, the one or more legs, the leg member, and the first and second drive wheels are positionable in multiple configurations, and wherein each state of the multiple states correspond to a mode of operation defined by a task to be completed, and further defined by which of the components, are extended, folded, moved, or otherwise positioned for completion of various household tasks.

Clause 3: The robot of clause 1 or 2, wherein the hip joint of each one or more legs allows rotation of the leg member with respect to the riser member, wherein the shoulder joint of each of the one or more arms allows rotation of the first arm member with respect to the torso about a first axis extending perpendicular from a side surface of the torso and about a second axis extending perpendicular to the first axis, and wherein the first arm member is rotatable with respect to the second arm member about a third axis extending from first arm member and about a fourth axis perpendicular to the third axis.

Clause 4: The robot of any of clauses 1-3, wherein the elongate neck member is configured to rotate with respect to the torso, and wherein the head is rotatable with respect to the elongate neck member about a fifth axis extending from the elongate neck member and about a sixth axis extending perpendicular to the fifth axis.

Clause 5: The robot of any of clauses 1-4, wherein the robot comprises: two arms connected to the torso; and two legs connected to the riser member; wherein the first and second drive wheels of each leg member are actuated by independent motors, and wherein each of the independent motors are controlled by the controller for travel of the robot.

Clause 6: The robot of any of clauses 1-5, wherein the one or more first sensors of the head of the robot is a camera, and wherein the robot comprises at least one of the following additional sensors: a camera; a motion sensor; a time-of-flight sensor; a multiple inertial measurements unit sensor; an accelerometer; a pressure sensor; a temperature sensor; a humidity sensor; a smoke detector; a Carbon Monoxide (CO) sensor; a particulate matter sensor; an indoor air-quality sensor; a radiation sensor; an oximeter; a heart rate sensor; or a biometric sensor.

Clause 7: The robot of any of clauses 1-6, further comprising one or more speakers, one or more lights, and one or more microphones, wherein the one or more speakers are configured to communicate audible warnings, alerts, messages and instructions to a user and other robots, wherein the one or more lights are configured to communicate visual warnings, alerts, messages and instructions to a user and other robots, wherein the one or more microphones are configured to record sounds including verbal commands from a user, and wherein the controller is further configured to receive and process the sounds recorded by the one or more speakers, convert the sounds to a data set, and communicate the data set with the components during execution of a task.

Clause 8: The robot of any of clauses 1-7, wherein a first mode of operation is a standby mode in which the robot is in a folded state such that: the elongate neck member, the torso, the first arm member, the second arm member, the riser member, and the one or more legs are rotated and folded to be parallel to each other; the head is folded down such that the one or more first sensors is directed perpendicular to the elongate neck member, the torso, the first arm member, the second arm member, the riser member, and the one or more legs.

Clause 9: The robot of any of clauses 1-8, wherein in a second mode of operation, the robot is in a partially folded state such that: the torso, the first arm member, the second arm member, the riser member, and the one or more legs are rotated and folded to be parallel to each other; the elongate neck member is extended upward to be perpendicular to the riser member; and the screen or the one or more first sensors is directed perpendicular to the elongate neck member in a first direction.

Clause 10: The robot of any of clauses 1-9, wherein in a third mode of operation, the robot is in a partially extended state such that: the riser member, and the one or more legs are rotated and folded to be parallel to each other; the torso is extended perpendicular to the riser member; the elongate neck member is extended up from and parallel to the torso; and the screen or the one or more first sensors is directed perpendicular to the elongate neck member in a first direction.

Clause 11: The robot of any of clauses 1-10, wherein in a fourth mode of operation, the robot is in a partially extended state such that: the riser member, and the one or more legs are rotated and folded to be parallel to each other; the torso is extended perpendicular to the riser member; the elongate neck member is extended up from and parallel to the torso; and the screen or the one or more first sensors is directed perpendicular to the elongate neck member in a second direction, opposite the first direction.

Clause 12: The robot of any of clauses 1-11, wherein in a fifth mode of operation the robot is in a partially extended state such that: the one or more legs are rotated and folded to be parallel to each other and to a surface of travel and the first and second drive wheels are in contact with the surface of travel; the riser member is extended up from and at an angle with respect to the one or more legs; the torso is extended up from and at an angle with respect to the riser member; the elongate neck member is extended up from and at an angle with respect to the riser member; the screen or the one or more first sensors is directed in the second direction; and the one or more arms extend from the torso in the second direction.

Clause 13: The robot of any of clauses 1-12, wherein in a sixth mode of operation the robot is in a partially extended state such that: the one or more legs are rotated and folded to be parallel to each other and to a surface of travel and the first and second drive wheels are in contact with the surface of travel; the riser member is extended up from and at an angle with respect to the one or more legs; the torso is extended up from and at an angle with respect to the riser member; the elongate neck member is extended up from and at an angle with respect to the riser member; the screen or the one or more first sensors is directed in the first direction; and the one or more arms extend from the torso in the first direction.

Clause 14: The robot of any of clauses 1-13, wherein in a seventh mode of operation the robot is in an extended state such that: the second drive wheel of the one or more legs is locked by a brake and in contact with the surface of travel; the one or more legs extend upward from the second drive wheel of the one or more legs at an angle with respect to the surface of travel; the riser member is extended up from and at an angle with respect to the one or more legs; the torso is extended up from and at an angle with respect to the riser member; the elongate neck member is extended up from and at an angle with respect to the riser member; and the robot is self-balancing on the second drive wheel of the one or more legs.

Clause 15: The robot of any of clauses 1-14, wherein the torso comprises a recess configured to receive and store one or more object and a lid configured to cover the recess and hold the one or more object in the recess in a closed position, and wherein, in an open position, the lid is configured to be a shelf for holding one or more object.

Clause 16: The robot of any of clauses 1-15, wherein the riser member comprises a compartment configured to receive and store one or more objects and a handle configured to allow a user to pick up and transport the robot.

Clause 17: The robot of any of clauses 1-16, wherein the compartment is further configured to receive and store one or more rechargeable batteries configured to power the robot, and a battery management system.

Clause 18: The robot of any of clauses 1-17, wherein a surface of the riser member comprises at least one charging terminal configured to accept one or more wires to charge the rechargeable batteries and configured to interact with a wireless charging pad to charge the rechargeable batteries.

Clause 19: A system for operating a robot, the system comprising: at least one processor programmed or configured to receive data associated with the robot for completion of household tasks, send data and associated with the robot for completion of household tasks, learn sequences of operation of the robot for completion of household tasks, teach sequences of operation of the robot for completion of household tasks, and execute operation of the robot for completion of household tasks.

Clause 20: A computer program product for providing one or more features with regard to a robot, the computer program product comprising: at least one computer-readable medium including one or more instructions that, when executed by at least one processor, cause the at least one processor to receive data associated with the robot for completion of household tasks, send data and associated with the robot for completion of household tasks, learn sequences of operation of the robot for completion of household tasks, teach sequences of operation of the robot for completion of household tasks, and execute operation of the robot for completion of household tasks.

Further details and advantages of the various examples described in detail herein will become clear upon reviewing the following detailed description of the various examples in conjunction with the accompanying drawing figures.

BRIEF DESCRIPTION OF THE DRAWINGS

Additional advantages and details are explained in greater detail below with reference to the exemplary embodiments that are illustrated in the accompanying schematic figures, in which:

FIGS. 44-46 are various views of an implementation of a robot according to some non-limiting embodiments of the present disclosure;

Corresponding reference characters indicate corresponding parts throughout the several views. The exemplifications set out herein illustrate exemplary embodiments of the disclosure, and such embodiments are not to be construed as limiting the scope of the disclosure in any manner.

DETAILED DESCRIPTION

Figure 1:
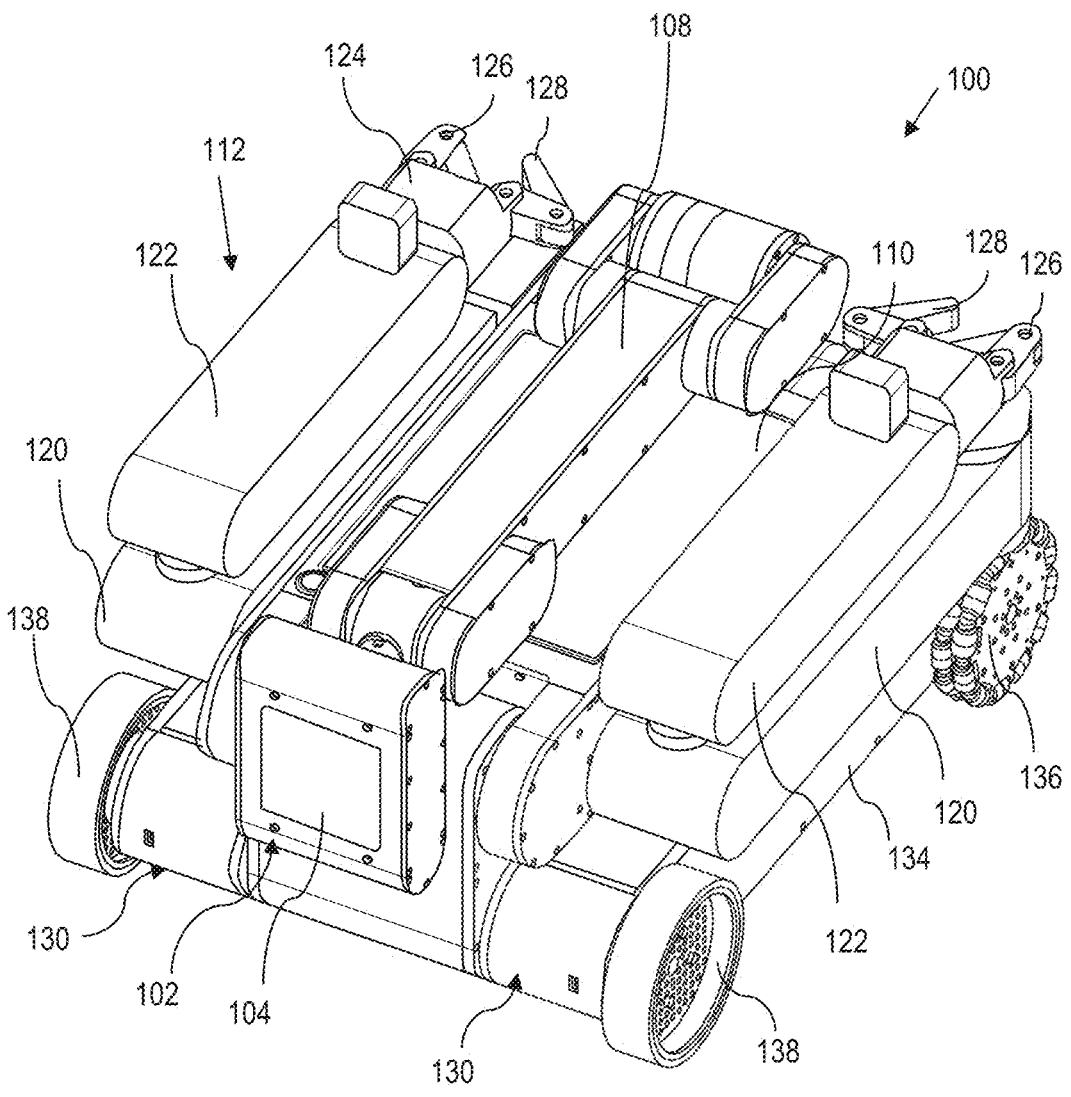
FIGS. 1-4 are various views of a robot according to some non-limiting embodiments of the present disclosure in a folded state.
Figure 2:
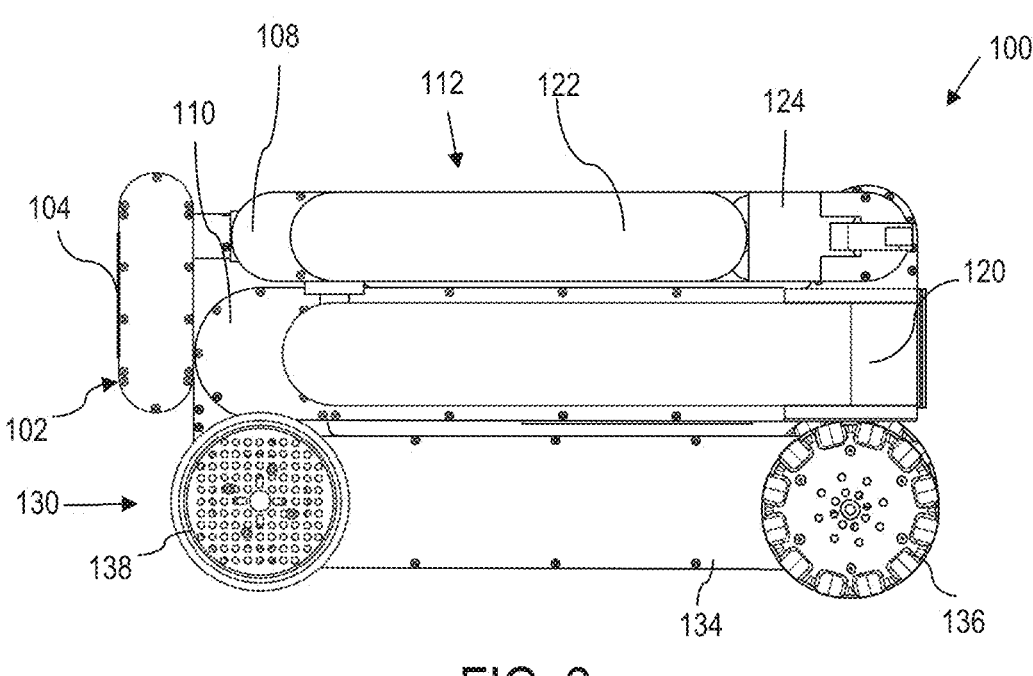
Figure 3:
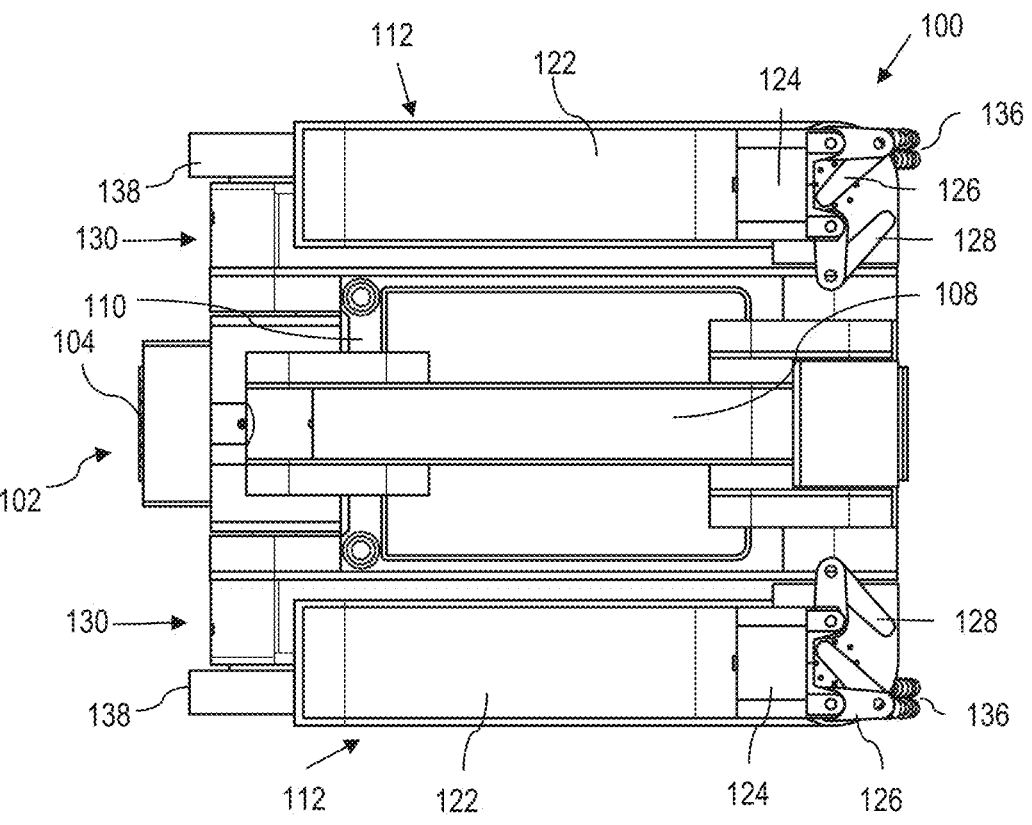
Figure 4:
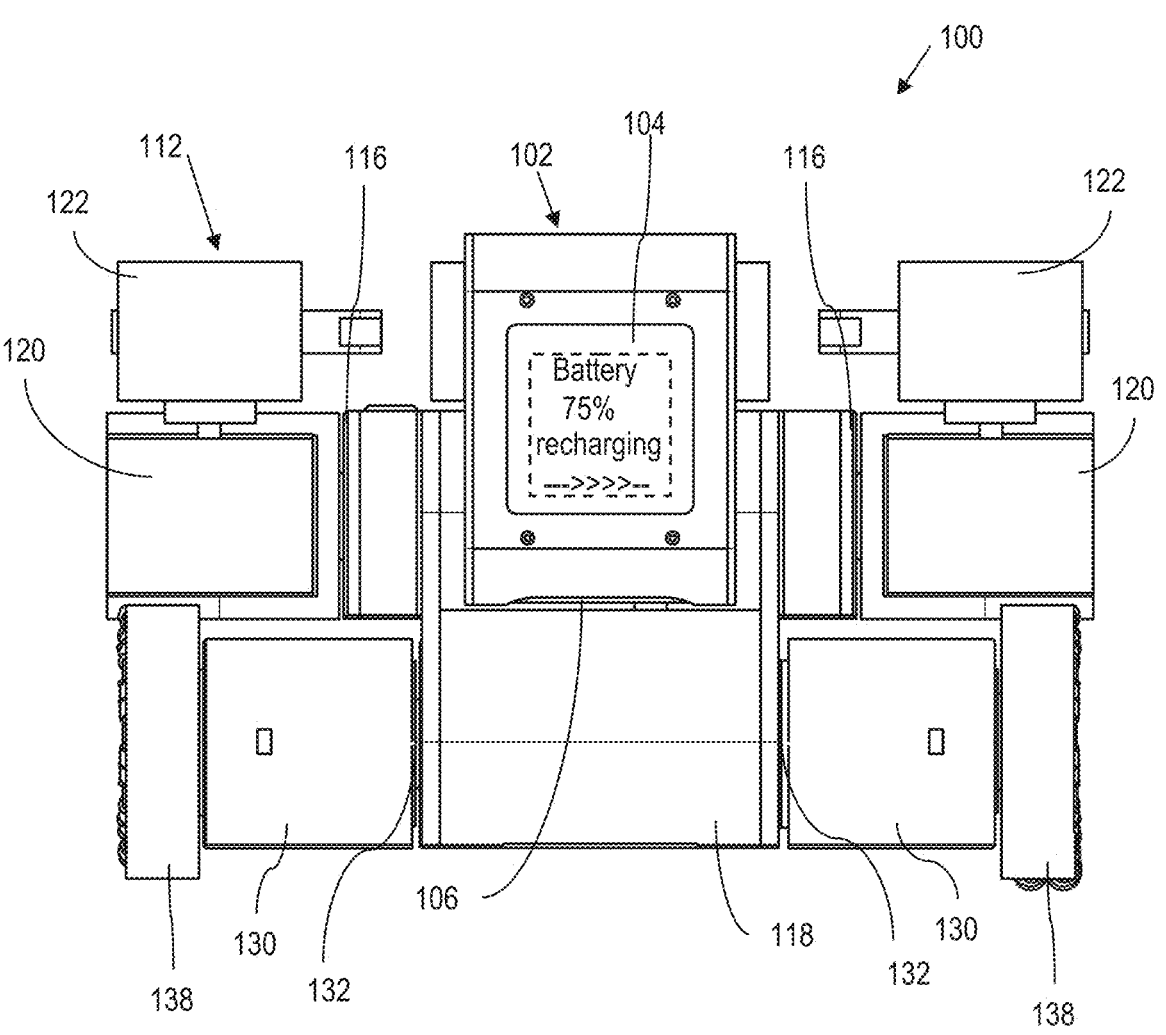

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments. Hence, specific dimensions and other physical characteristics related to the embodiments disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments as they are oriented in the drawing figures. Some non-limiting embodiments may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." As used in the specification and the claims, the singular form of "a," "an," and "the" include plural referents, such as unless the context clearly dictates otherwise. Where only one item is intended, the term "one" or similar language is used. Also, as used herein, the terms "comprising," "including," "has," "have," "having," variations thereof, and the like are intended to be open-ended terms and are meant to encompass the items listed thereafter and equivalents thereof as well as additional items. Further, the phrase "based on" is intended to mean "based at least partially on" unless explicitly stated otherwise. In addition, reference to an action being "based on" a condition may refer to the action being "in response to" the condition.

Unless specified or limited otherwise, the terms "fastened," "attached," "mounted," "connected," "supported," "coupled," and variations thereof are used broadly and encompass both direct and indirect fastenings, attachments, mountings, connections, supports, and couplings. Further, these terms are not restricted to physical or mechanical connections or couplings unless otherwise specified.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and communicates the processed information to the second unit. In non-limiting embodiments, a message may refer to a network packet (e.g., a data packet and/or the like) that includes data. It will be appreciated that numerous other arrangements are possible.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to a robot for assisting with and performing household chores. According to an aspect of the disclosure, a robot may include a head having a screen and one or more first sensors, an elongate neck member, a torso, one or more arms connected to the torso by a shoulder joint, a riser member connected to the torso and rotatable with respect to the torso, one or more legs connected to the riser member by a hip joint, and at least one controller configured to send and receive data associated with the robot for completion of household tasks. Each of the one or more arms may include a first arm member, a second arm member, a wrist member, and at least two fingers. Each of the one or more legs may include a leg member, a first drive wheel which may be disposed at a first end of the leg member and which may be coaxial with the hip joint, and a second drive wheel which may be disposed at a second end of the leg member. The first drive wheel and second drive wheel may be independently controllable for travel of the robot.

Further, the robot may be configured to move and fold such that it has multiple states and modes of operation defined by a task to be completed, and in which different members and components are extended, folded, moved, or otherwise positioned for completion of various household tasks. One of the various states or modes may include a standby mode in which the robot is folded for minimized space occupation, such that it may be store in a closet or under furniture until it receives instructions to complete a task.

The robot of the present disclosure may be considered a general-purpose robot, a multi-purpose robot and/or a collaborative robot, among other classifications. In some non-limiting embodiments, the robot may be configured to assist with daily chores, saving a user time and inconvenience. The robot may further be configured to map and navigate an environment and manipulate it with members such as arms and hands. The robot may be used by any class of users, but may be particularly useful for users living alone, users with children, seniors, and users with disabilities. The robot may be self-teaching such that it may learn how to complete tasks from prior experience, experience of other robots, communication networks such as the internet, and through human interaction, as well as to teach other robots and humans how to complete tasks. For example, before the robot learns how to put away dishes and glasses inside a kitchen cabinet, the robot may not know how to or be able to reach the cabinet, especially high ones, and may remove the dishes from the dishwasher and stack them neatly, ready for a human to complete the final step. Once the robot is told or shown how to put the dishes in the cabinet, it may teach itself the required movements and/or articulation necessary to complete the task.

In some non-limiting embodiments, the robot may include capable wheels, an extensible body, a long neck and long arms, which may allow the robot to see and reach over countertops, and shelves with its dexterous hands, while remaining lightweight, an optimized compact size, and providing a pleasant unassuming appearance. In some instances, travel with use of wheels may be preferable to walking via leg actuation and manipulation as travel by wheel may be faster, safer for users and the environment, and quieter or less disruptive.

In some non-limiting embodiments, the robot may include a complete suite of sensors to interact with the surrounding environment and humans. These sensors may include encoders, inertial measurement units, Time of Flight sensors, cameras, and 3D point cloud cameras (RGBD), microphones, and speakers. The robot may further include torque and force feedback sensors to interact with objects, and 30 degrees of freedom (DOF).

In this way, a folding robot of the present disclosure provides for multiple states and modes defined by multiple different folding configurations for assisting with and performing household chores.

Referring now to FIGS. 1-4, FIGS. 1-4 are various views of robot 100 according to some non-limiting embodiments of the present disclosure in a folded state. As shown in FIGS. 1-4, robot 100 may include head 102 including screen 104 and one or more first sensors 106, elongated neck member 108, torso 110, one or more arms 112 and one or more legs 130. In some non-limiting embodiments, each one or more arm 112 may be connected to torso 110 by shoulder joint 116, and each one or more arm 112 may include first arm member 120, second arm member 122, wrist member 124, and at least two fingers 126, 128. In some non-limiting embodiments, robot 100 may further include a third arm member which may provide further reach and versatility. In some non-limiting embodiments, robot 100 may further include riser member 118 connected to torso 110 and rotatable with respect torso 100. One or more legs 130 may be connected to riser member 118 by a hip joint 132. In some non-limiting embodiments, each of the one or more legs may include leg member 134, first drive wheel 136 disposed at a first end of leg member 134 and second drive wheel 138 disposed at a second end of the leg member 134. First drive wheel 136 may be coaxial with hip joint 132. In some non-limiting embodiments, first drive wheel 136 and second drive wheel 138 may be independently controllable for travel of robot 100. Robot 100 may further include at least one controller configured to send and receive data associated with robot 100 for completion of household tasks.

With continued reference to FIGS. 1-4 and with additional reference to FIGS. 5-25, robot 100 may be configured to move and fold to multiple states such that the components including head 102, elongate neck member 108, torso 110, one or more arms 112, first arm member 120, second arm member 122, wrist member 124, at least two fingers 126, 128, riser member 118, one or more legs 130, leg member 134, first drive wheel 136 and second drive wheel 138 are positionable in multiple configurations, and each state of the multiple states correspond to a mode of operation defined by a task to be completed, and further defined by which of the components are extended, folded, moved, or otherwise positioned for completion of various household tasks.

In some non-limiting embodiments, hip joint 132 of each one or more legs 130 may allow rotation of leg member 134 with respect to riser member 118, and shoulder joint 116 of each of one or more arms 112 may allow rotation of first arm member 120 with respect to torso 110 about a first axis A extending perpendicular from a side surface of torso 110 and about second axis A2 extending perpendicular to first axis A. First arm member 120 may be rotatable with respect to second arm member 122 about third axis A3 extending from first arm member 120 and about fourth axis A4 perpendicular to third axis A3.

In some non-limiting embodiments, elongate neck member 108 may be configured to rotate with respect to torso 110, and head 102 may be rotatable with respect to elongate neck member 108 about fifth axis A5 extending from elongate neck member 108 and about sixth axis A6 extending perpendicular to fifth axis A5. In some non-limiting embodiments, robot 100 may include two arms 112 connected to torso 110 and two legs 130 connected to riser member 118. Each of two arms 112 may include first arm member 120, second arm member 122, wrist member 124, at least two fingers 126, 128. Each of two legs 130 may include leg member 134, first drive wheel 136 disposed at a first end of leg member 134, coaxial with hip joint 132, and second drive wheel 138 disposed at a second end of leg member 134. The first and second drive wheels 136, 138 of each leg member may be actuated by independent motors, (e.g., motor 140 as shown in FIGS. 46-51). Each of the independent motors may be controlled by the controller for travel of robot 100.

As shown in FIGS. 1-4, in a folded state, head 102 may be down for privacy such that first sensor 106 may be pointed to the floor to provided privacy for any user in the area of robot 100. Screen 104 may further indicate a status of robot 100, such as battery level, mode of operation, sleep and/or awake status, or the like. As further shown in FIGS. 1-4, robot 100 may be super compact in a folded state such that little space is taken up in the home, office or vehicle. Robot 100 may also be suitable for space travel and may take up little room in an aircraft, space shuttle, or landing vehicle.

FIGS. 1-4 also show an aspect of the mobile base with rear omnidirectional wheel (i.e., first drive wheel 136) which may allow robot 100 to move sideways. These wheels may allow robot 100 to spin in place about a point between the axes of the two front wheels (i.e., second drive wheels 138). This feature allows robot 100 to perform tasks where robot 100 needs to pivot in place and obviates the need for an extra heavy joint along the torso of robot 100, thereby also reducing weight.

In exemplary embodiments, the folded state illustrated in FIGS. 1-4 may define a first mode of operation, which may be a standby mode. In some non-limiting embodiments, in the first mode of operation, in which robot 100 is in a folded state, elongate neck member 108, torso 110, first arm member 120, second arm member 122, riser member 118, and one or more legs 130 may be rotated and folded to be parallel to each other. Further, head 102 may be folded down such that one or more first sensors 106 is directed perpendicular to elongate neck member 108, torso 110, first arm member 120, second arm member 122, riser member 118, and one or more legs 130.

Sensor 106 (e.g., a camera) may face forward while robot 100 is fully folded. From this state, robot 100 may navigate a room, scan it, and map it while avoiding obstacles. Robot 100 can also localize itself and move to specific destinations.

If a user desires, robot 100 may be ready to receive commands such as hand gestures and may also watch home while residents are out.

Figure 5:
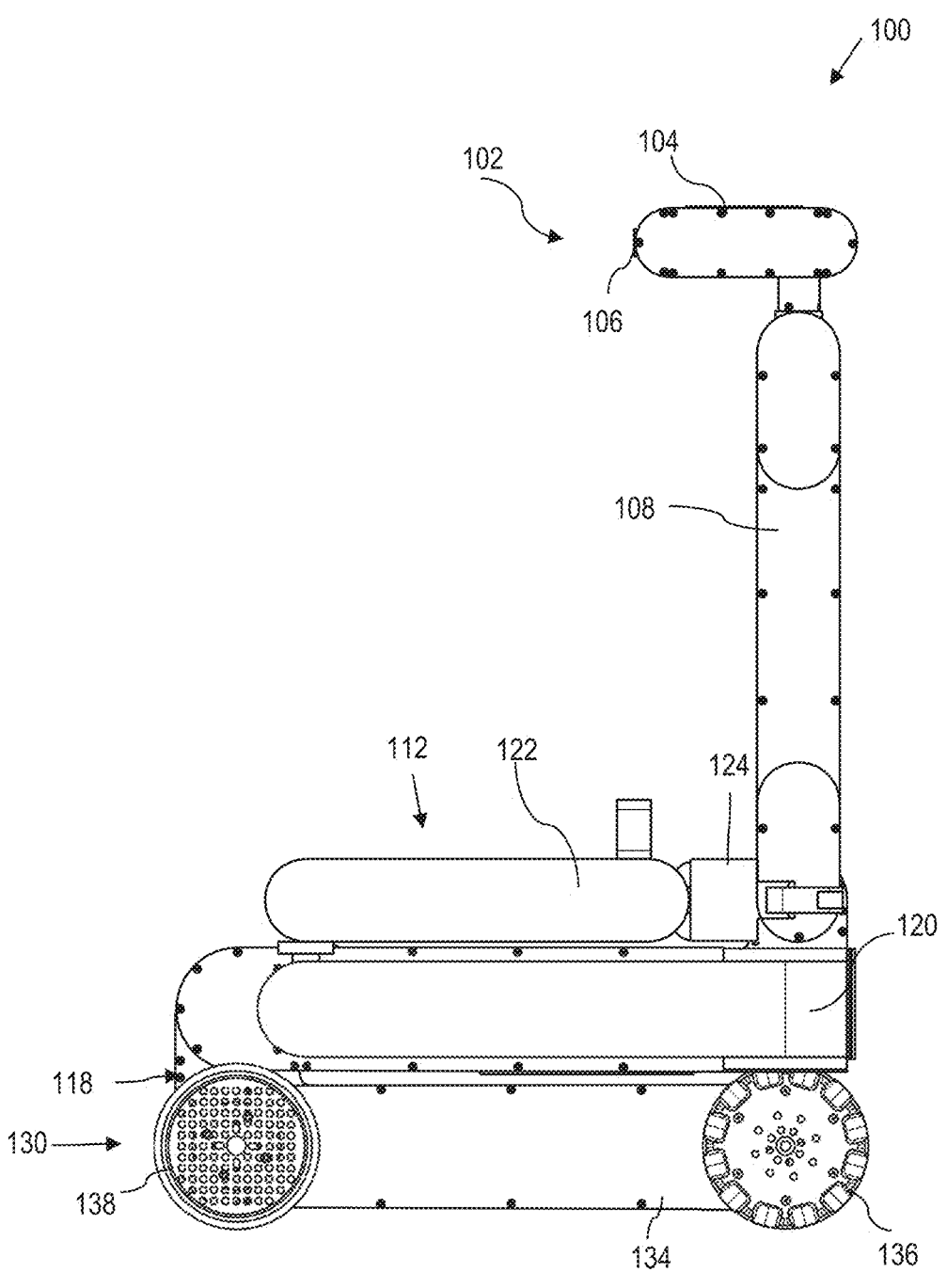
FIGS. 5 and 6 are a side view and a perspective view of a robot according to some non-limiting embodiments of the present disclosure in a partially folded state.
Figure 6:
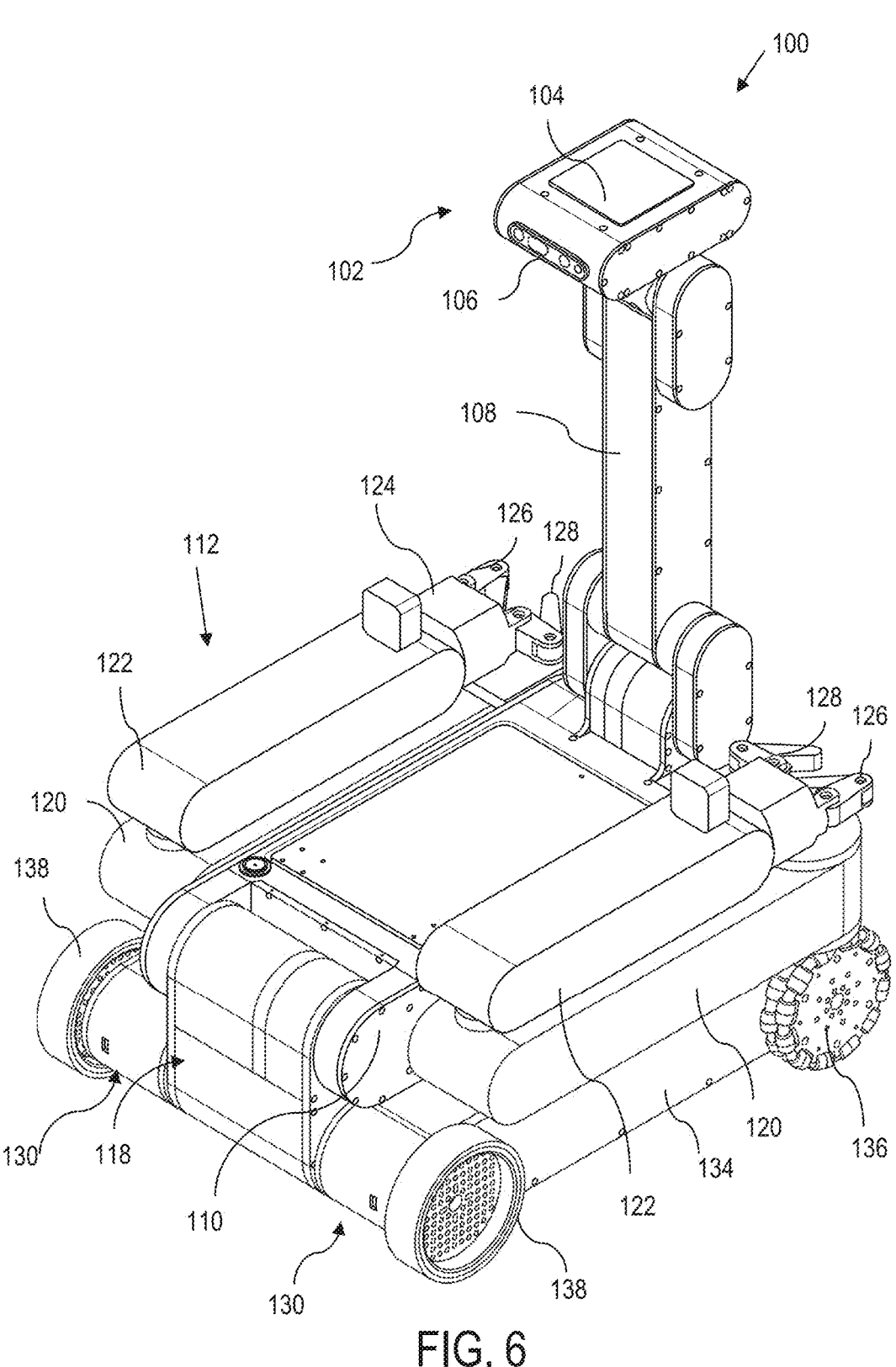
Figure 7:
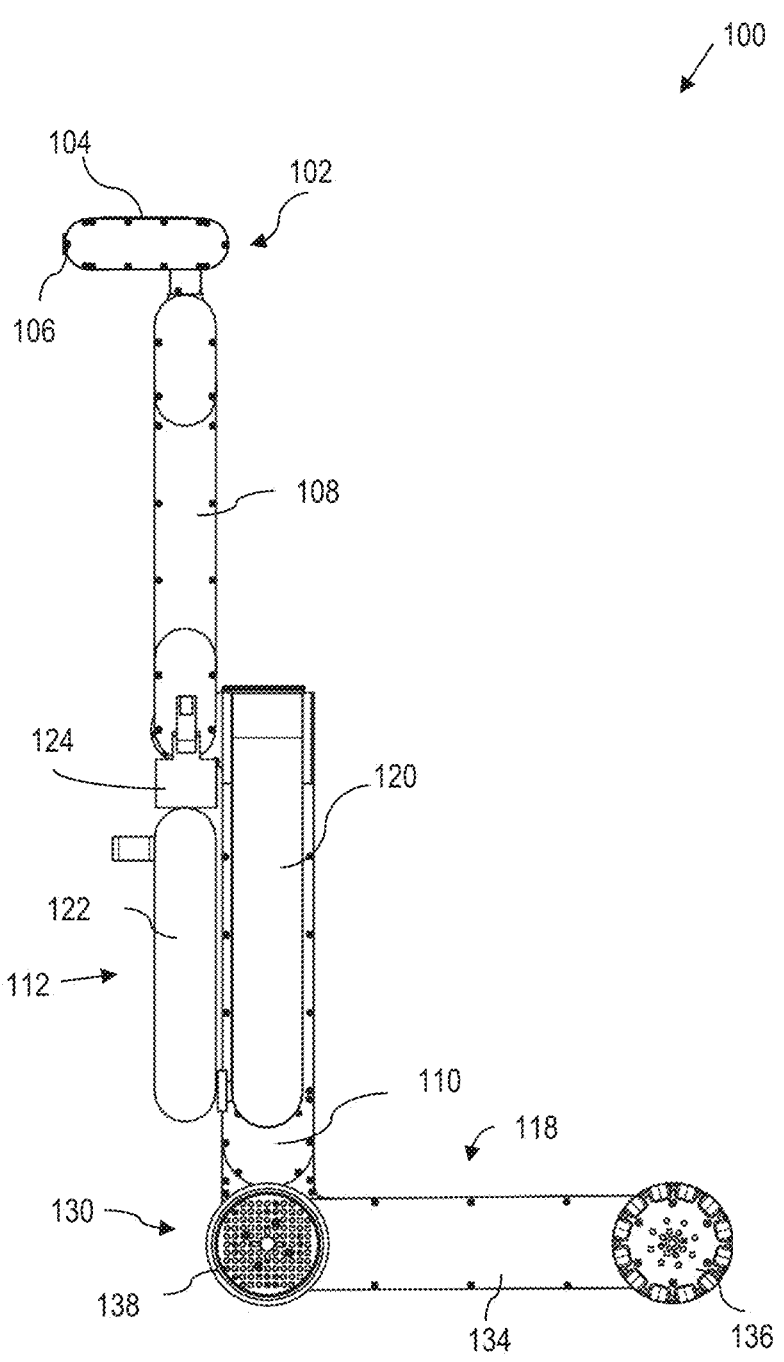
FIGS. 7-10 are various views of a robot according to some non-limiting embodiments of the present disclosure in a partially extended state.
Figure 8:
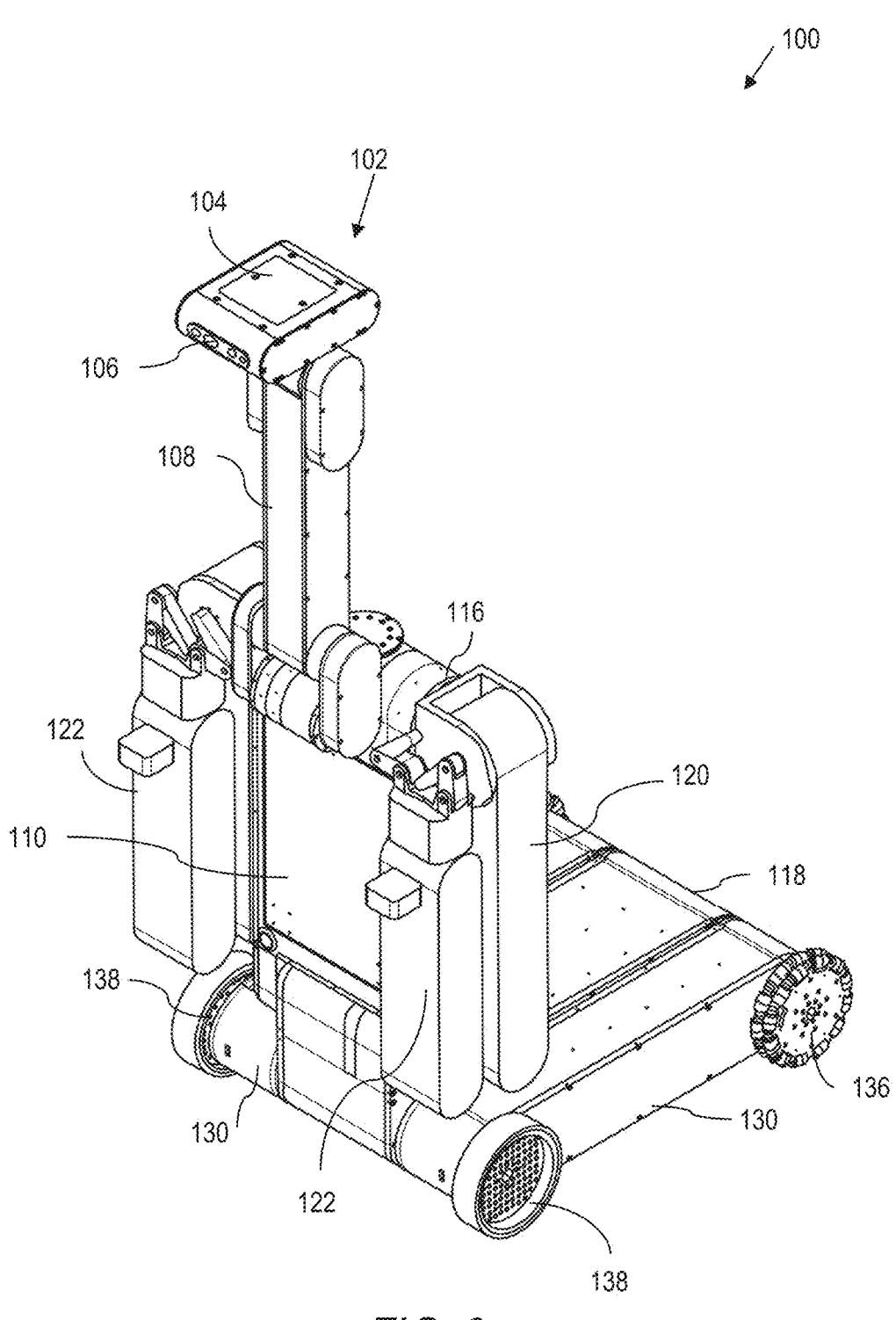

Referring now to FIGS. 5 and 6, FIGS. 5 and 6 are a side view and a perspective view of robot 100 according to some non-limiting embodiments of the present disclosure in a partially folded state. In some non-limiting embodiments, as shown for example in FIGS. 5 and 6, in a second mode of operation, robot 100 may be in a partially folded state such that torso 110, first arm member 120, second arm member 122, riser member 118, and one or more legs 130 may be rotated and folded to be parallel to each other. Elongate neck member 108 may be extended upward to be perpendicular to riser member 118 and screen 104 or one or more first sensors 106 may be directed perpendicular to elongate neck member 108 in a first direction (i.e., forward). As shown in FIG. 5, in this state, the neck (i.e., elongate neck 108) may be extended and head 102 may be facing a forward direction. It is to be understood, however, that robot 100 may face head 102 and arms 112 in the opposite direction (i.e., backward), and robot 100 may plan the best possible position, state, and mode of operation based on the task at hand.

Referring now to FIGS. 7-10, FIGS. 7-10 are various views of robot 100 according to some non-limiting embodiments of the present disclosure in a partially extended state. As shown in the exemplary embodiment of FIGS. 7-8, in a third mode of operation, robot 100 may be in a partially extended state such that riser member 118, and one or more legs 130 may be rotated and folded to be parallel to each other. Torso 110 may be extended perpendicular to riser member 118 and elongate neck member 108 may be extended up from and parallel to torso 110. Screen 104 or one or more first sensors 106 may be directed perpendicular to elongate neck member 108 in a first direction (i.e., forward).

Figure 9:
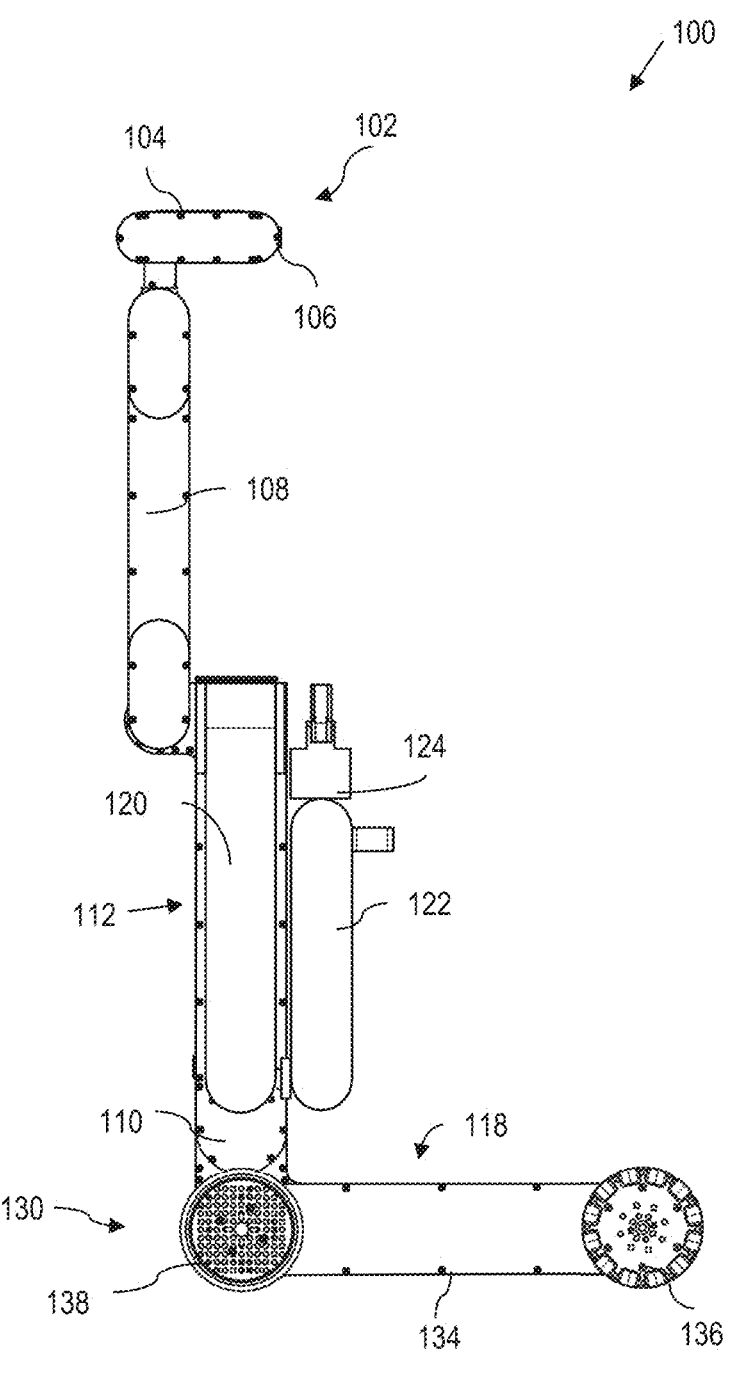
Figure 10:
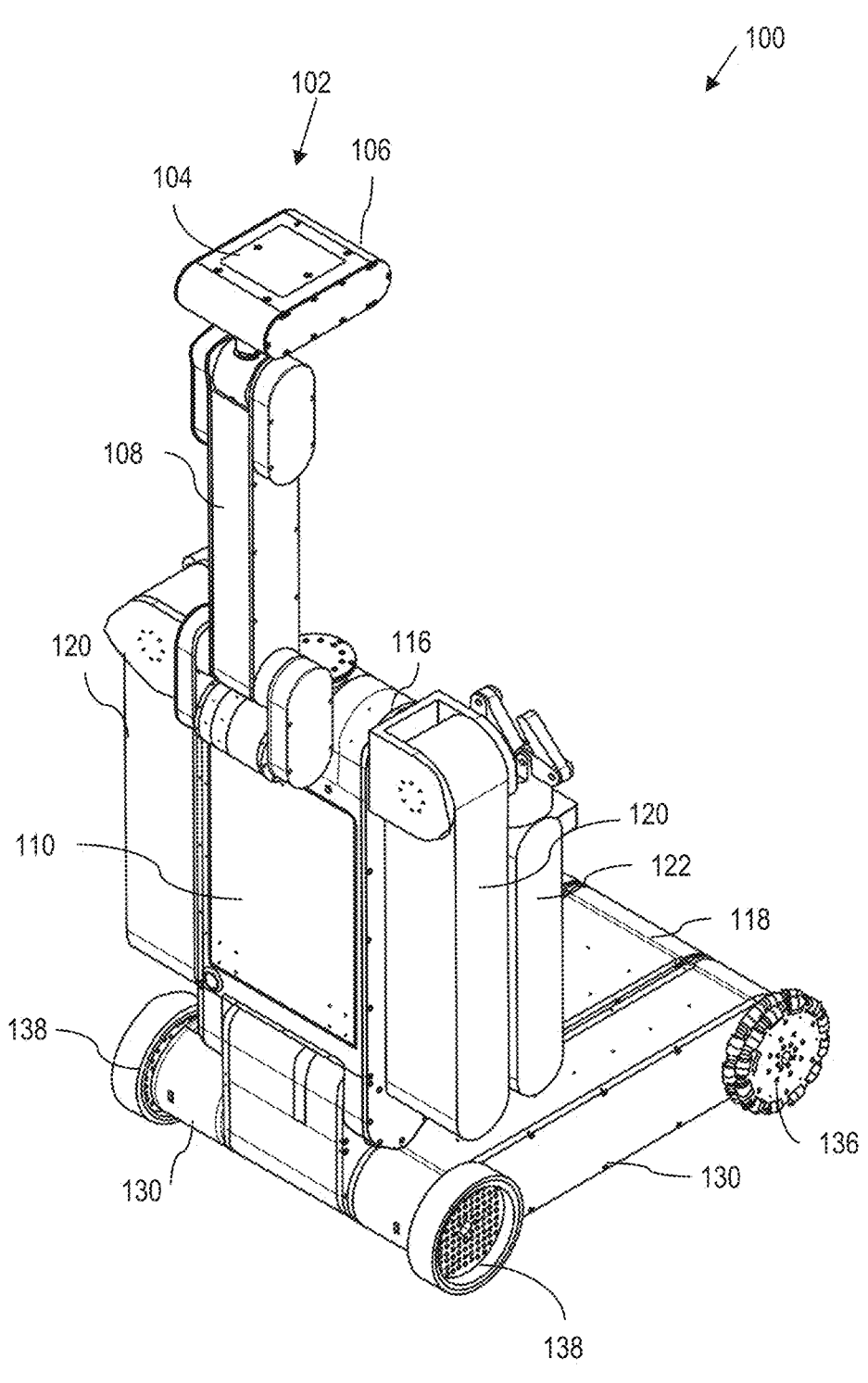
Figure 11:
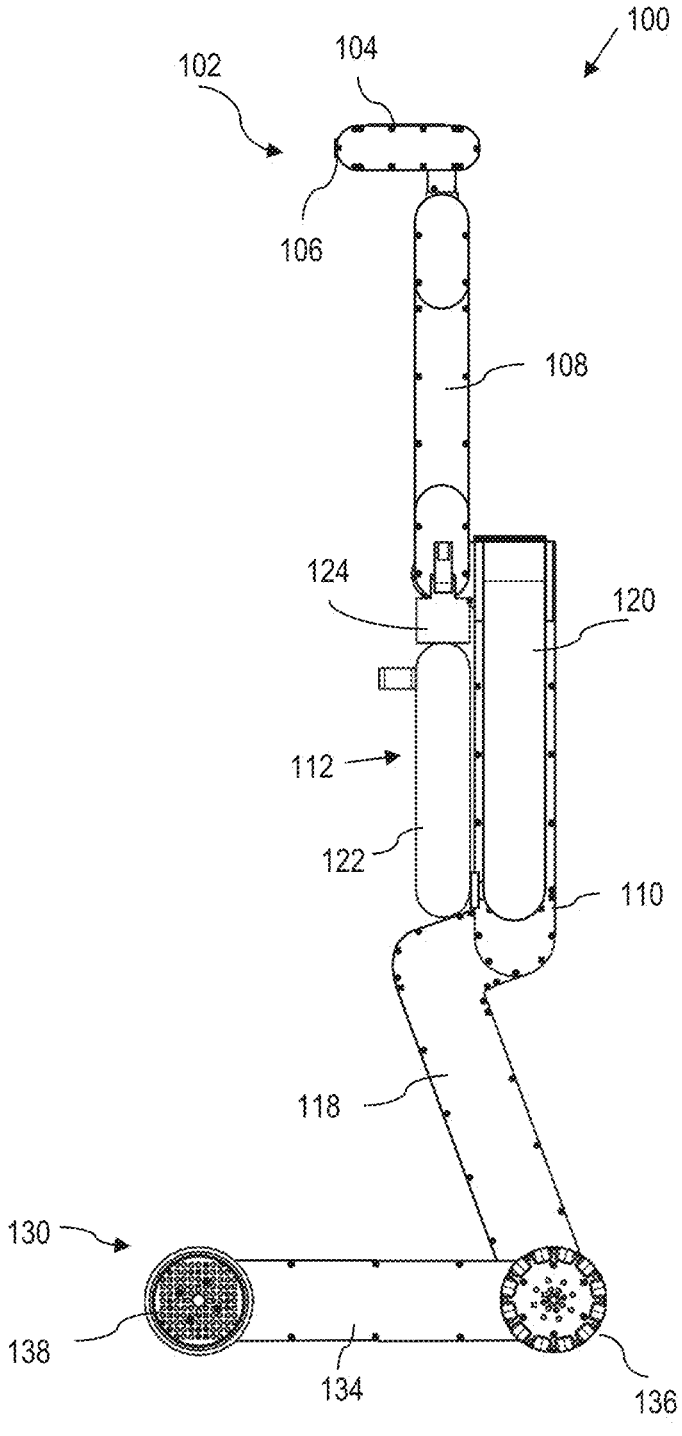
FIG. 11 is a side view of a robot according to some non-limiting embodiments of the present disclosure in a partially extended state.
Figure 12:
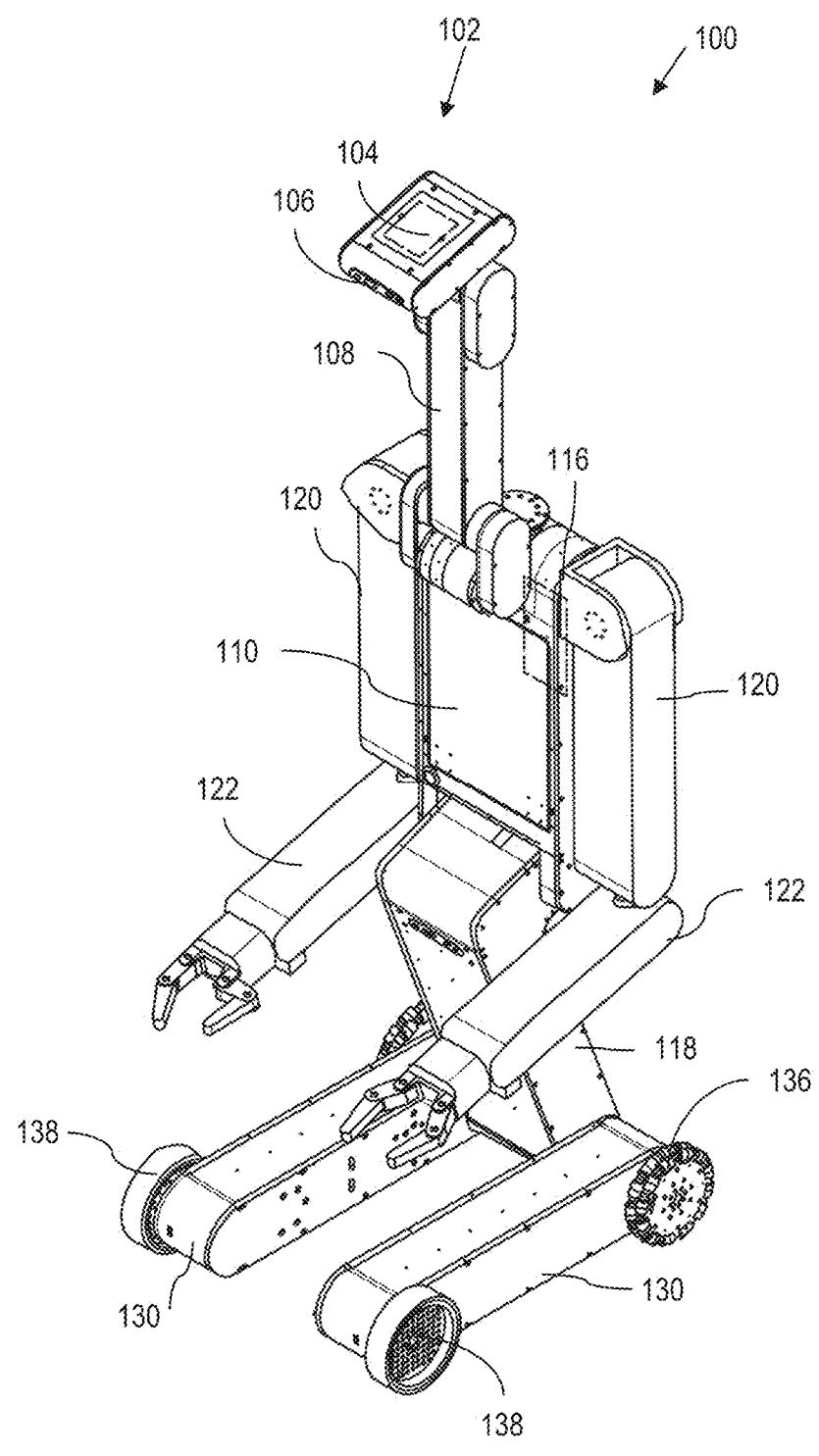
FIGS. 12-14 are various views of a robot according to some non-limiting embodiments of the present disclosure in a partially extended state.

As shown in the exemplary embodiments of FIGS. 9-10, in a fourth mode of operation, robot 100 may be in a partially extended state such that riser member 118, and one or more legs 130 may be rotated and folded to be parallel to each other. Torso 110 may be extended perpendicular to riser member 118 and elongate neck member 108 may be extended up from and parallel to torso 110. Screen 104 or one or more first sensors 106 may be directed perpendicular to elongate neck member 108 in a second direction (i.e., backward), opposite the first direction (i.e., forward).

Figure 13:
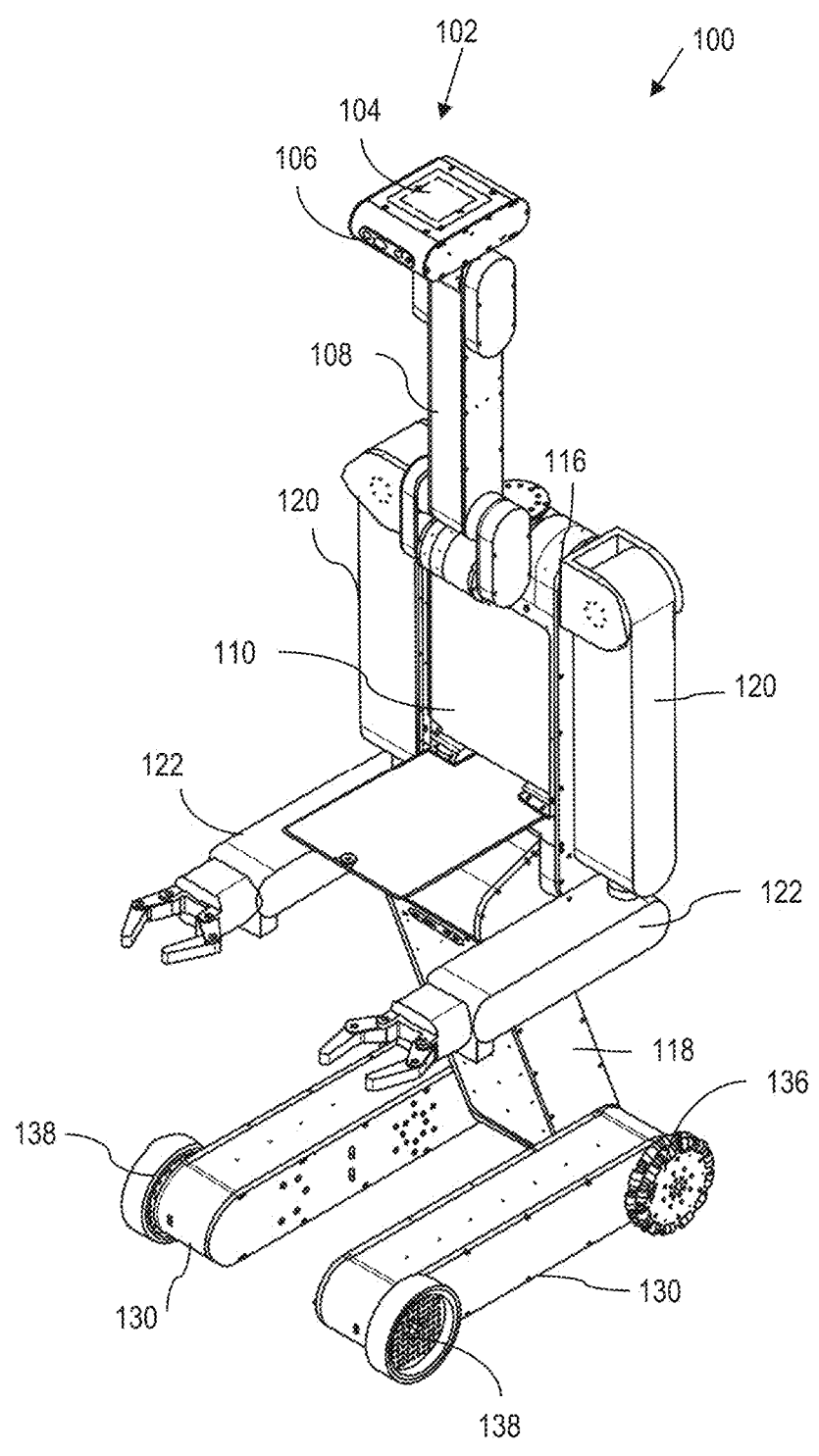
Figure 14:
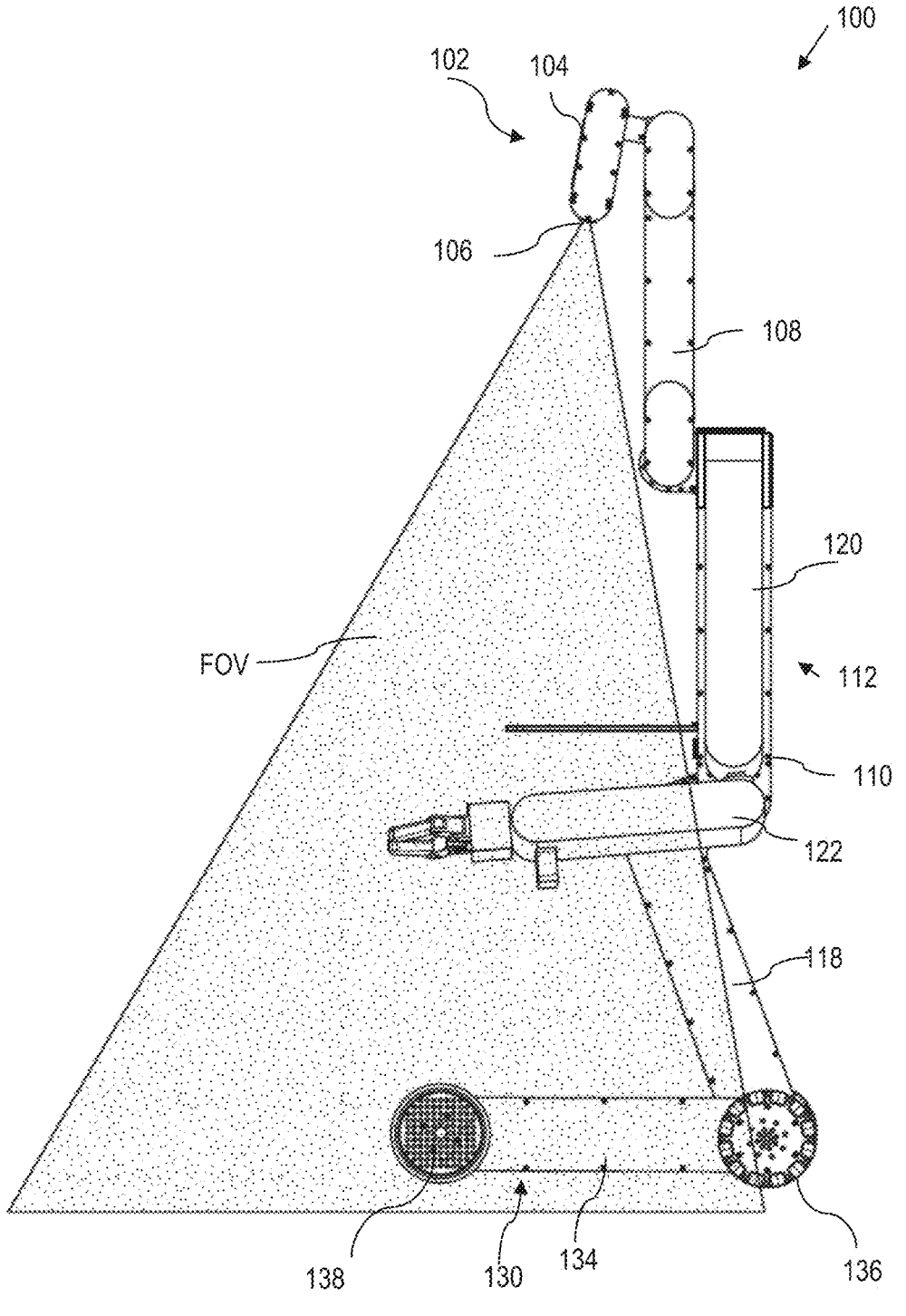
Figure 15:
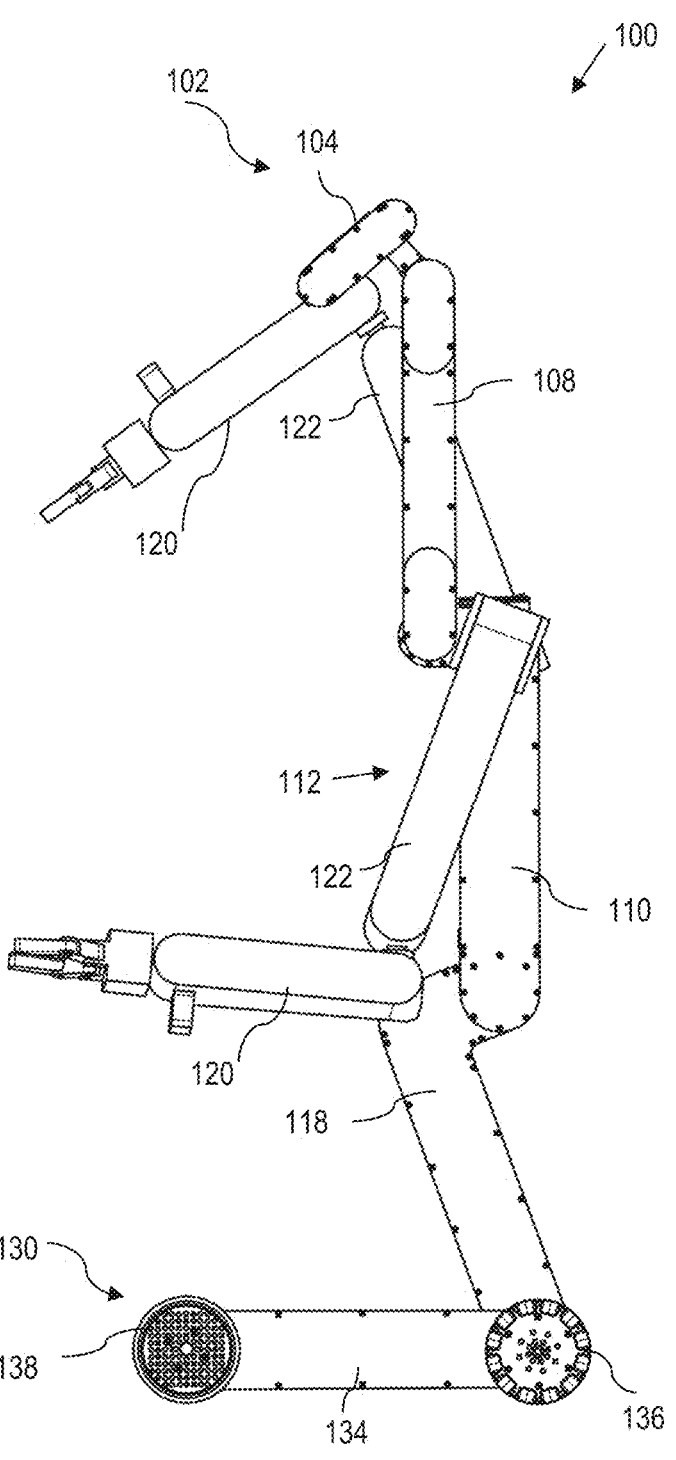
FIGS. 15 and 16 are a side view and a perspective view of a robot according to some non-limiting embodiments of the present disclosure in a partially extended state.
Figure 16:
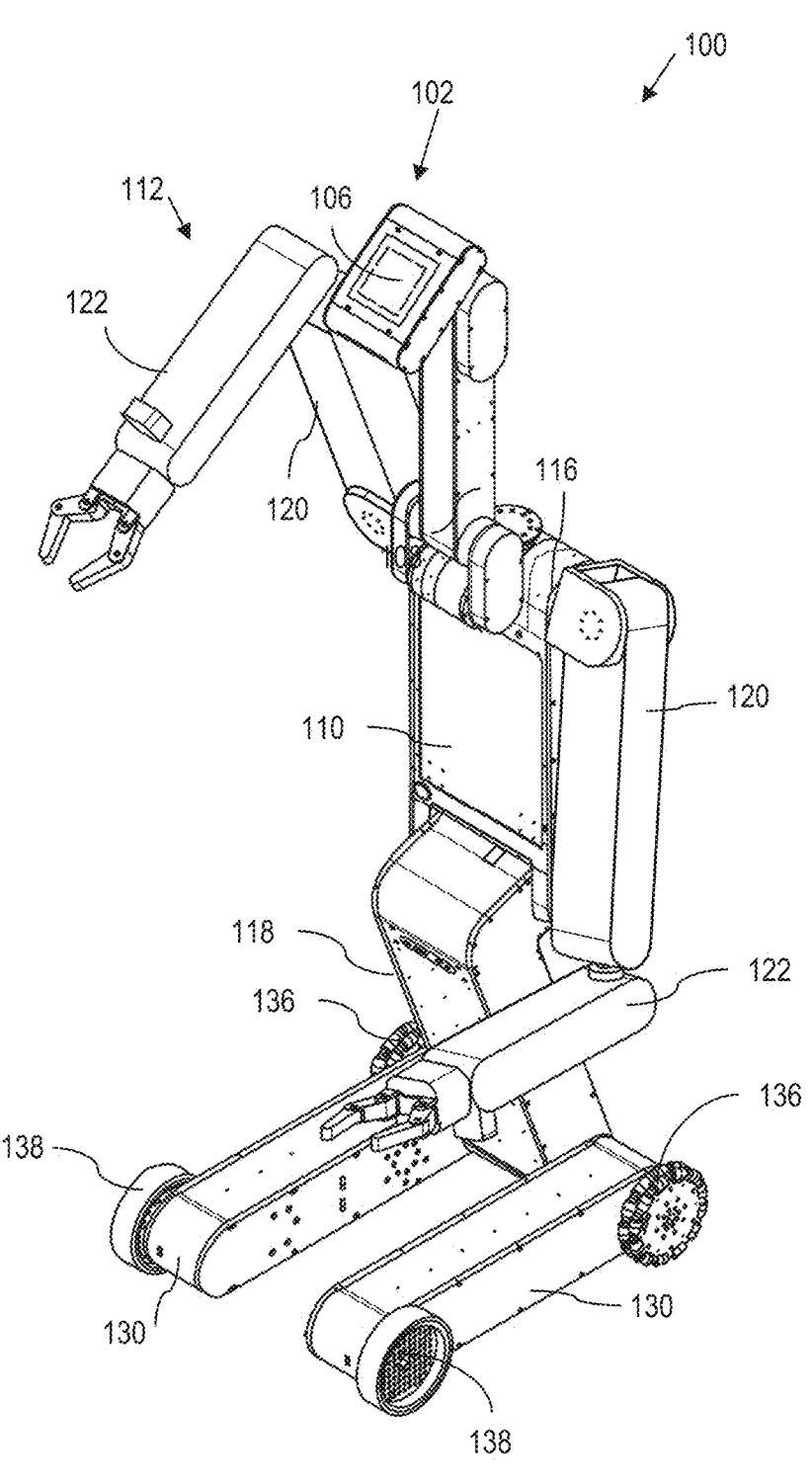

Referring now to FIGS. 11-20, FIGS. 11-20 are various views of robot 100 according to some non-limiting embodiments of the present disclosure in partially extended states. As shown for example in FIGS. 11-16, in a fifth mode of operation, robot 100 may be in a partially extended state such that one or more legs 130 may be rotated and folded to be parallel to each other and to a surface of travel (i.e., the ground, the floor), and first and second drive wheels 136, 138 may be in contact with the surface of travel. Riser member 118 may be extended up from and at an angle with respect to one or more legs 130, torso 110 may be extended up from and at an angle with respect to riser member 118, and elongate neck member 108 may be extended up from and at an angle with respect to riser member 118. Screen 104 or one or more first sensors 106 may be directed in the second direction (i.e., backward) and one or more arms 112 may extend from torso 110 in the second direction. In some non-limiting embodiments, as shown in FIG. 13, robot 100 may include a tray to assist with carrying objects. As shown in FIG. 14 robot 100 may be capable of "looking" straight down at the tray or other objects being carried, which is allowed by the neck joint and articulation of the neck joint attaching elongate neck member 108.

Figure 17:
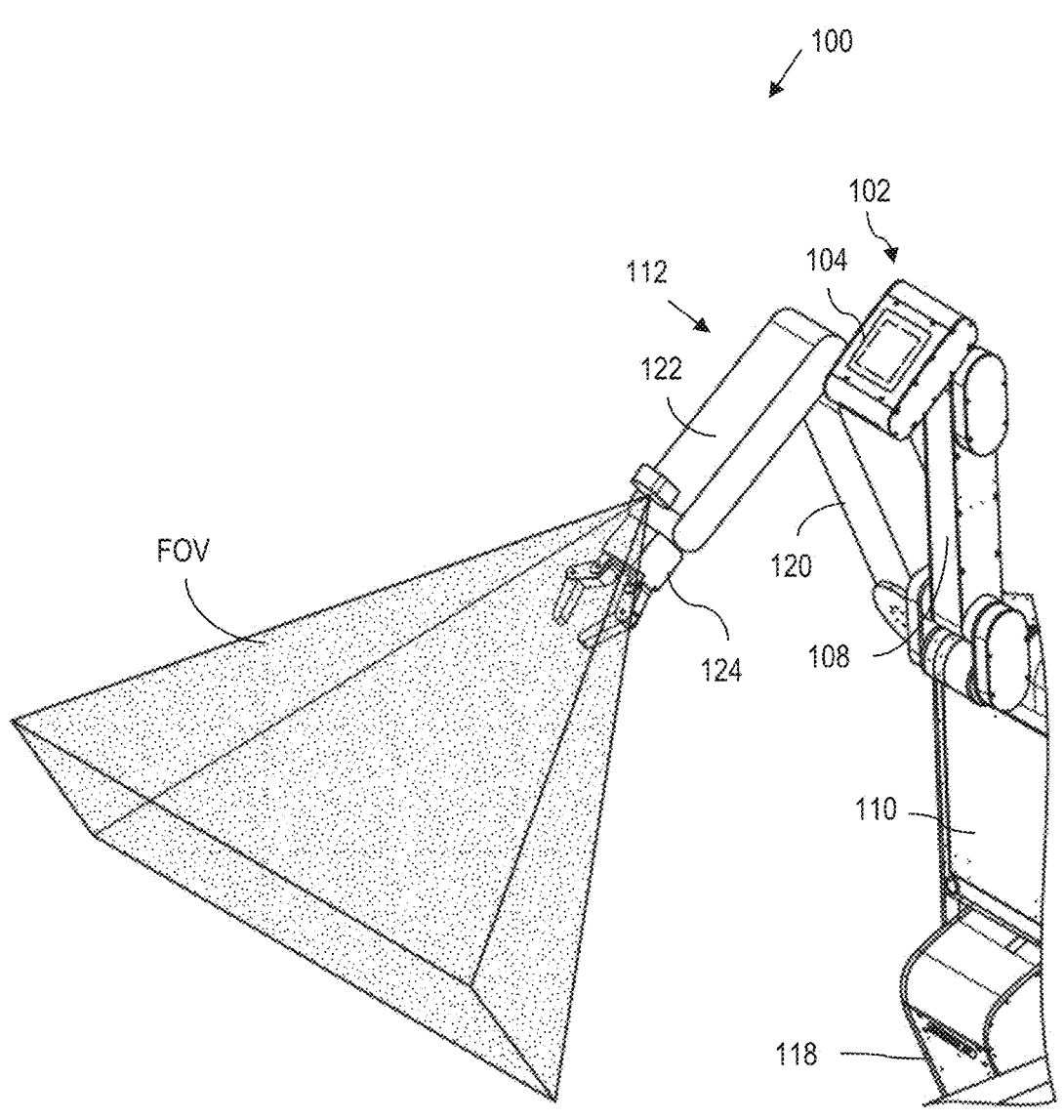
FIG. 17 is a perspective view of components of a robot according to some non-limiting embodiments of the present disclosure.

In some non-limiting embodiments, as shown in FIG. 17, robot 100 may include a micro-projector such as in the hand or head to allow projection of messages, pictures, images, layouts, and the like on a wall or other surface. This may allow robot 100 to communicate with users. Another exemplary use of the projector may be to demonstrate to a user where to place nails in a wall to place pictures squarely and with even spacing. In some non-limiting embodiments, robot 100 may include a short-range camera, which may allow robot 100 to manipulate occulated objects.

Figure 18:
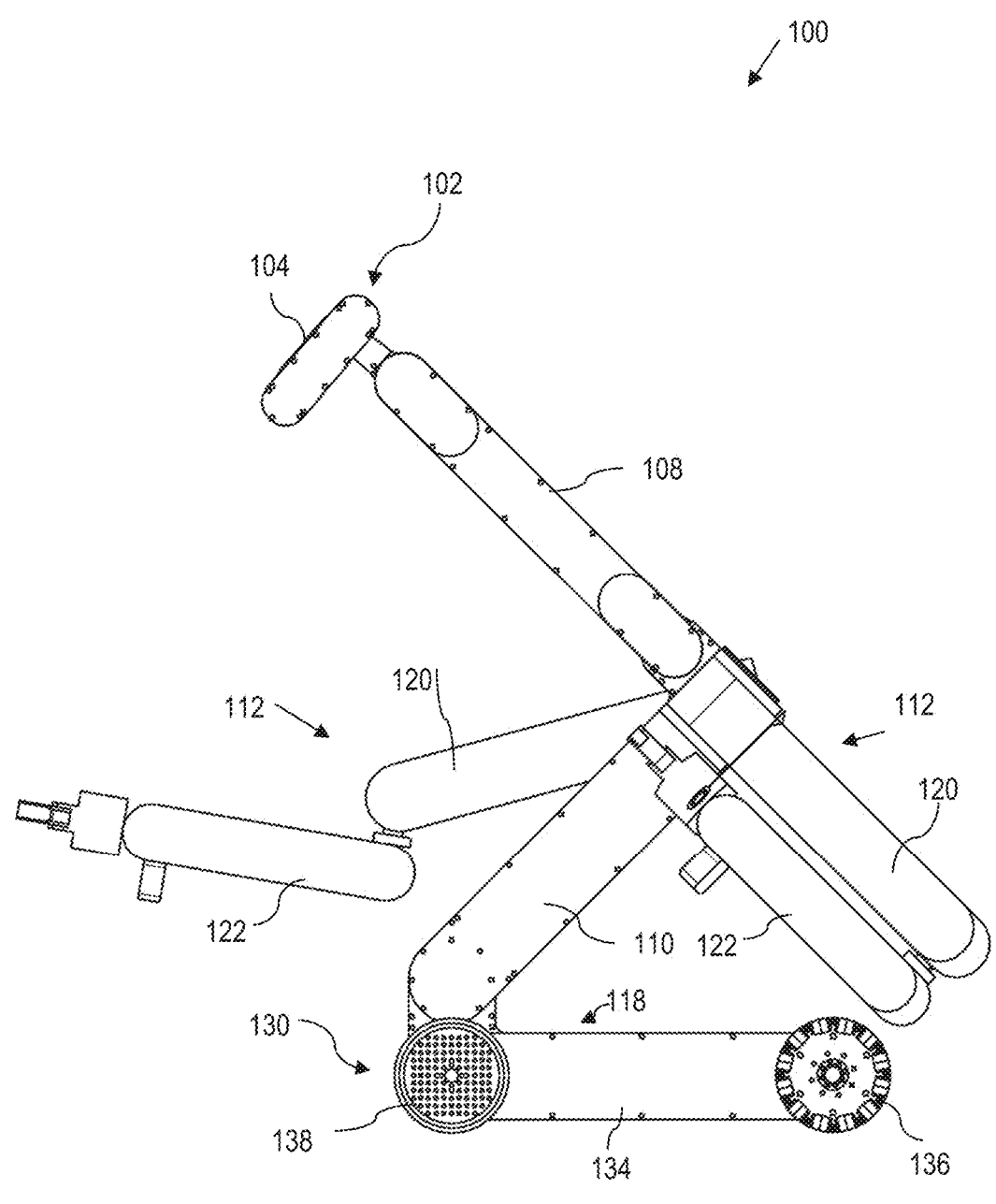
FIGS. 18-20 are a side view and perspective views of a robot according to some non-limiting embodiments of the present disclosure in partially extended states.
Figure 19:
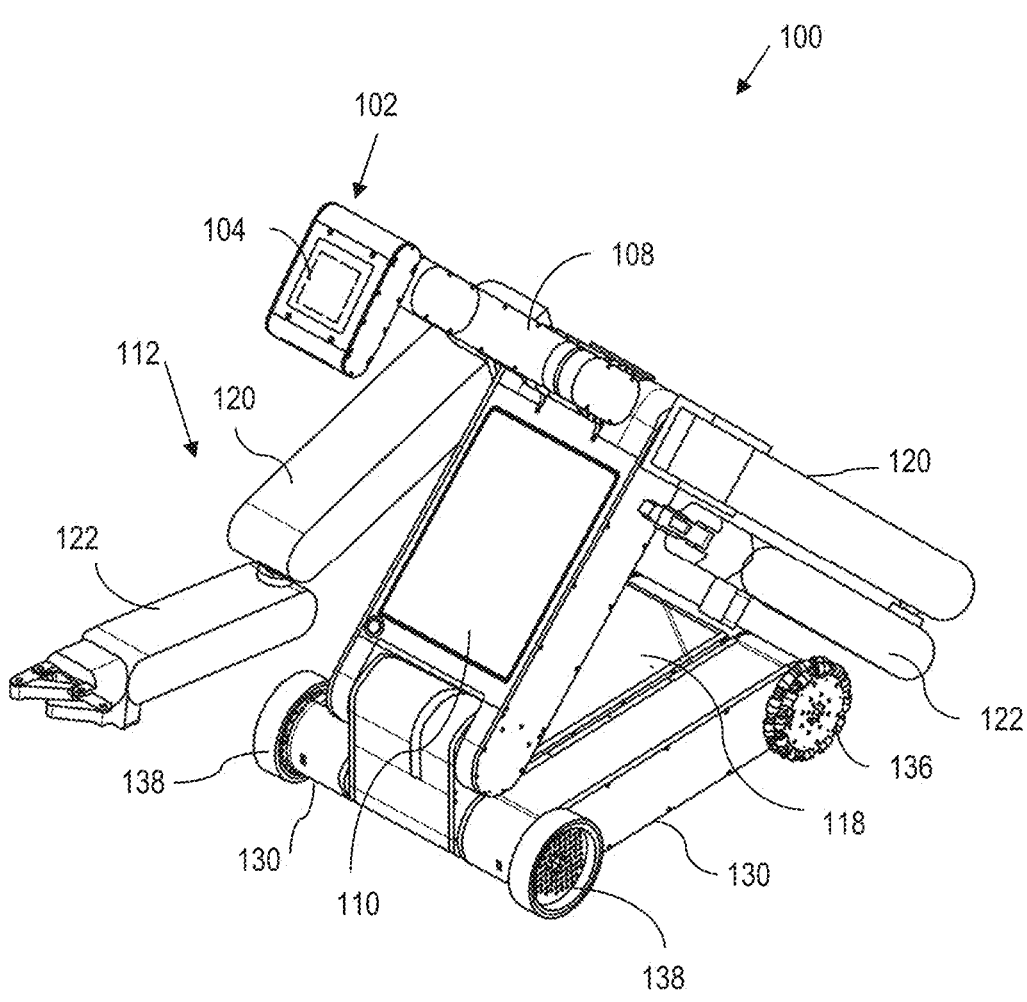
Figure 20:
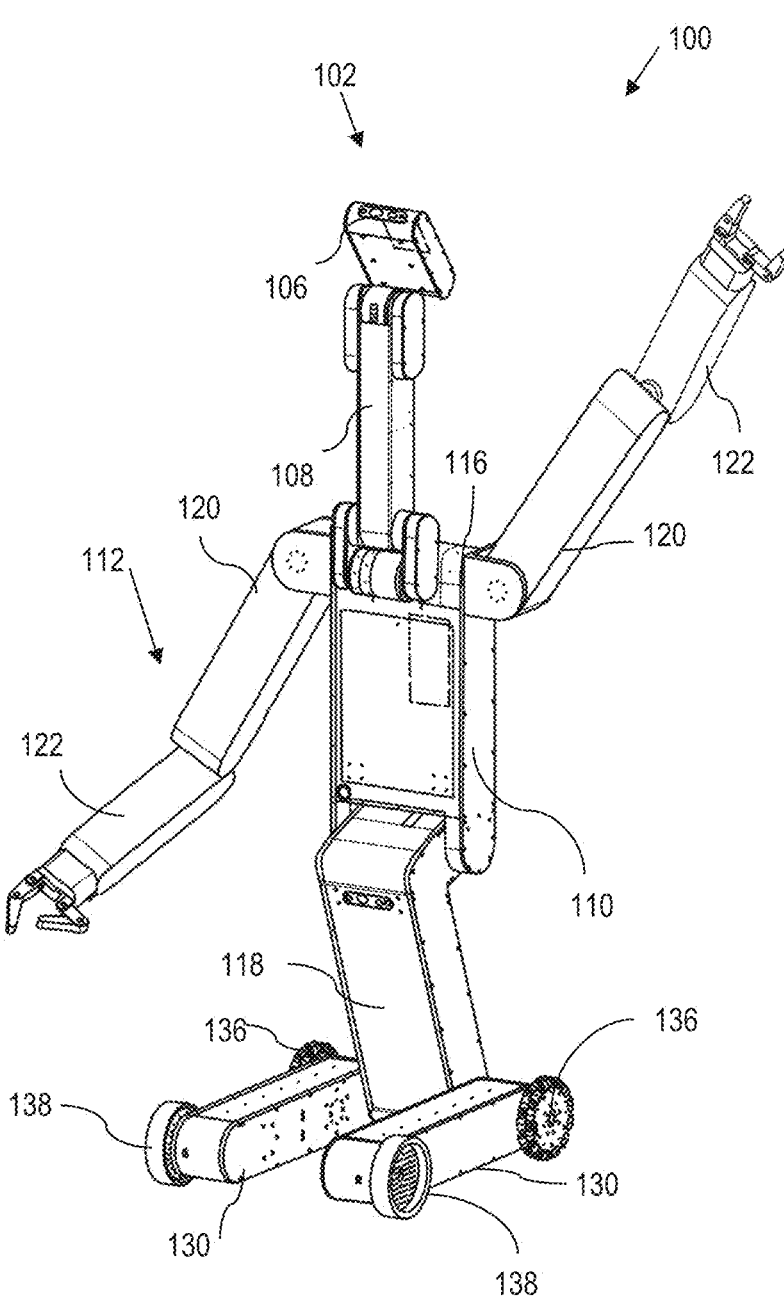
Figure 21A:
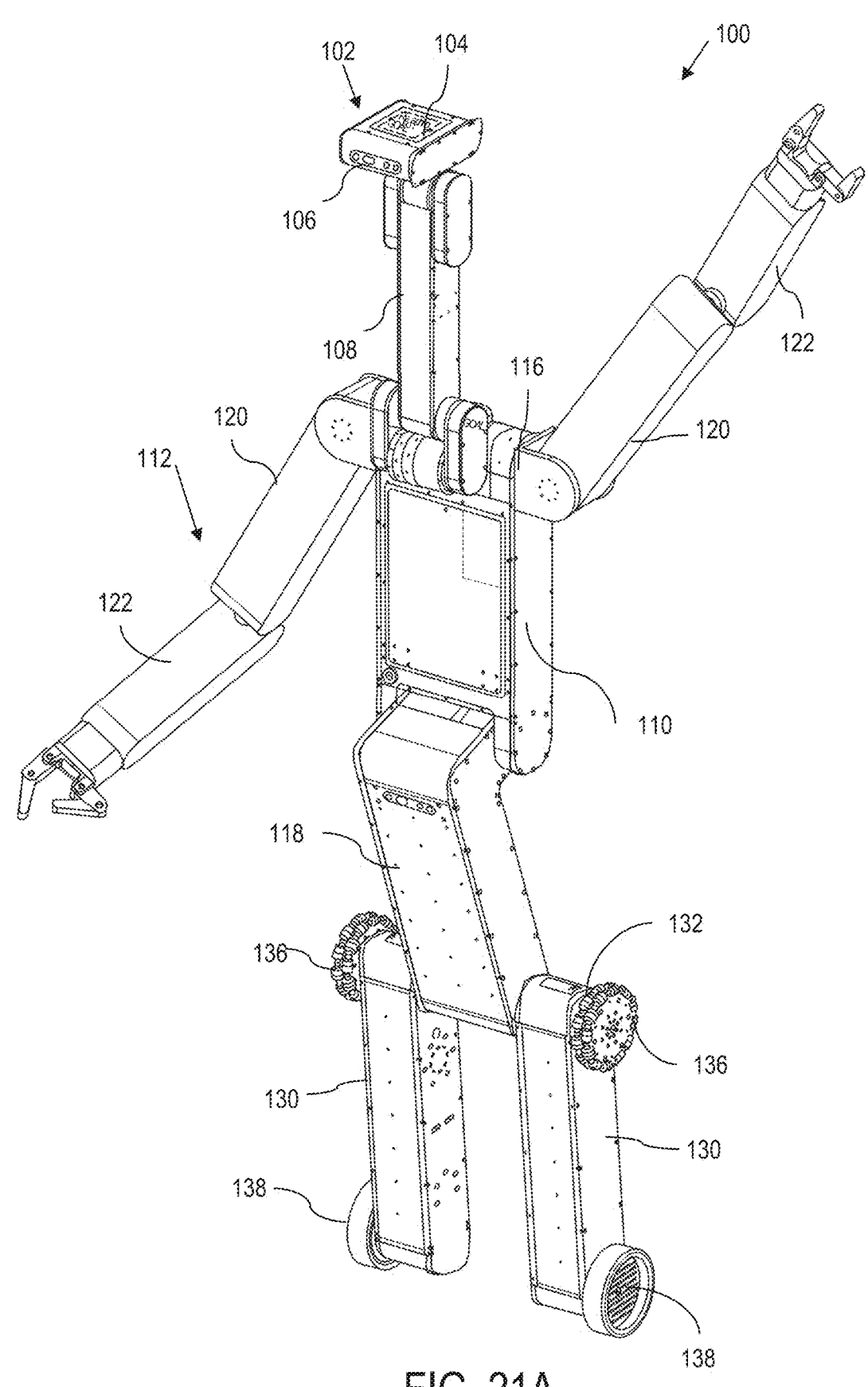
FIGS. 21A and 21B are perspective views of a robot according to some non-limiting embodiments of the present disclosure in an extended state.
Figure 21B:
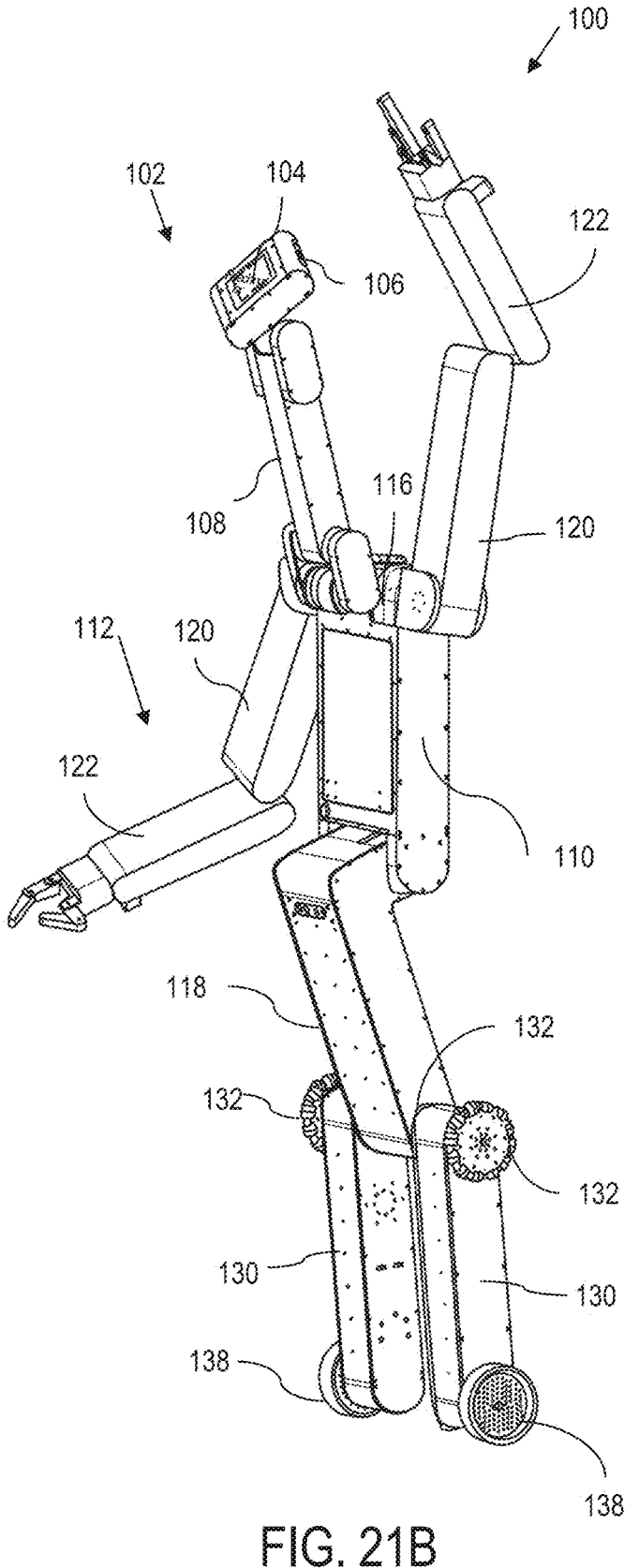

In some non-limiting embodiments, as shown in FIGS. 18 and 19, in a sixth mode of operation robot 100 is in a partially extended state such that one or more legs 130 may be rotated and folded to be parallel to each other and to a surface of travel (i.e., the ground, the floor), and first and second drive wheels 136, 138 may be in contact with the surface of travel. Riser member 118 may be extended up from and at an angle with respect to one or more legs 130, torso 110 may be extended up from and at an angle with respect to riser member 118, and elongate neck member 108 may be extended up from and at an angle with respect to riser member 118. Screen 104 or one or more first sensors 106 may be directed in the in the first direction (i.e., forward) and one or more arms 112 may extend from torso 110 in the first direction. In exemplary embodiments, there is no limit to the achievable configurations of robot 100.

Referring now to FIGS. 21A-24, FIGS. 21A-24 are various views of robot 100 and implementations of robot 100 according to some non-limiting embodiments of the present disclosure in an extended state. As shown in FIGS. 21A-24, in a seventh mode of operation, robot 100 may be in an extended state such that only second drive wheel 138 of one or more legs 130 may be in contact with the surface of travel (i.e., the ground, the floor). One or more legs 130 extend upward from second drive wheel 138 of one or more legs 130 at an angle with respect to the surface of travel. Riser member 118 may be extended up from and at an angle with respect to one or more legs 130 and torso 110 may be extended up from and at an angle with respect to riser member 118. Further, elongate neck member 108 may be extended up from and at an angle with respect to riser member 118, and robot 100 may be self-balancing (i.e., actively balanced) on second drive wheel 138 of one or more legs 130.

Figure 22:
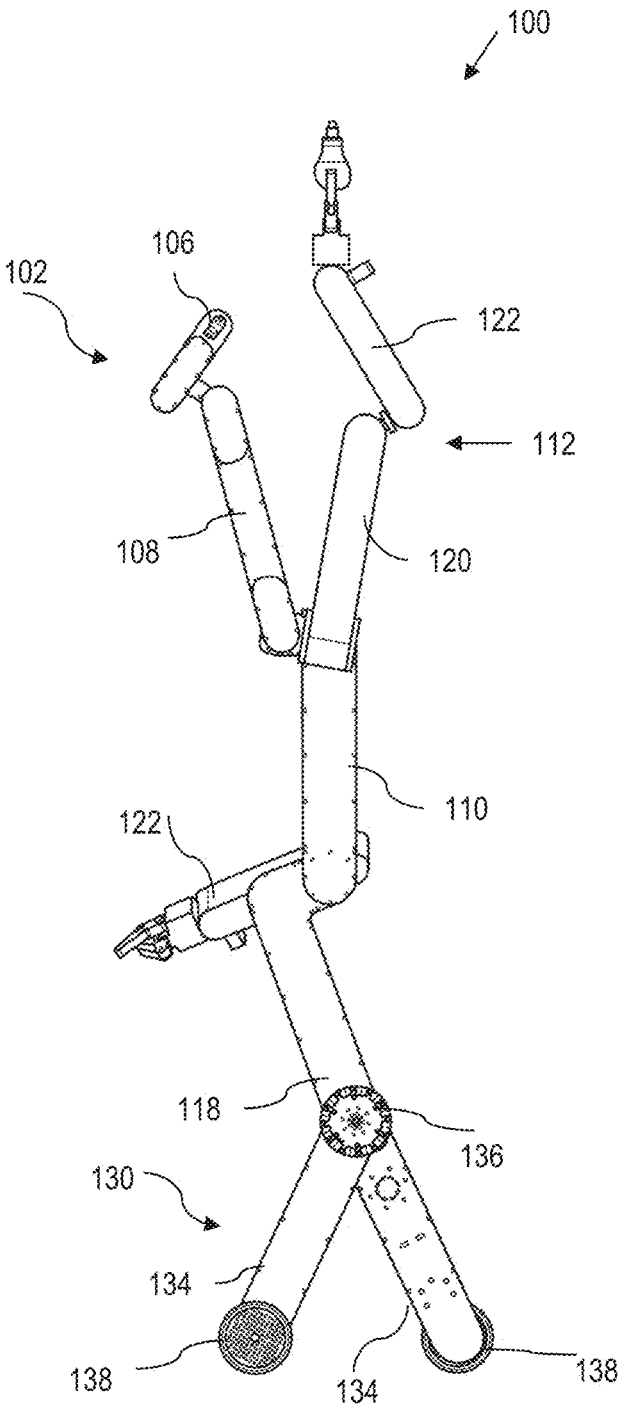
FIGS. 22 and 23 are a side view and a perspective view of an implementation of a robot according to some non-limiting embodiments of the present disclosure.
Figure 23:
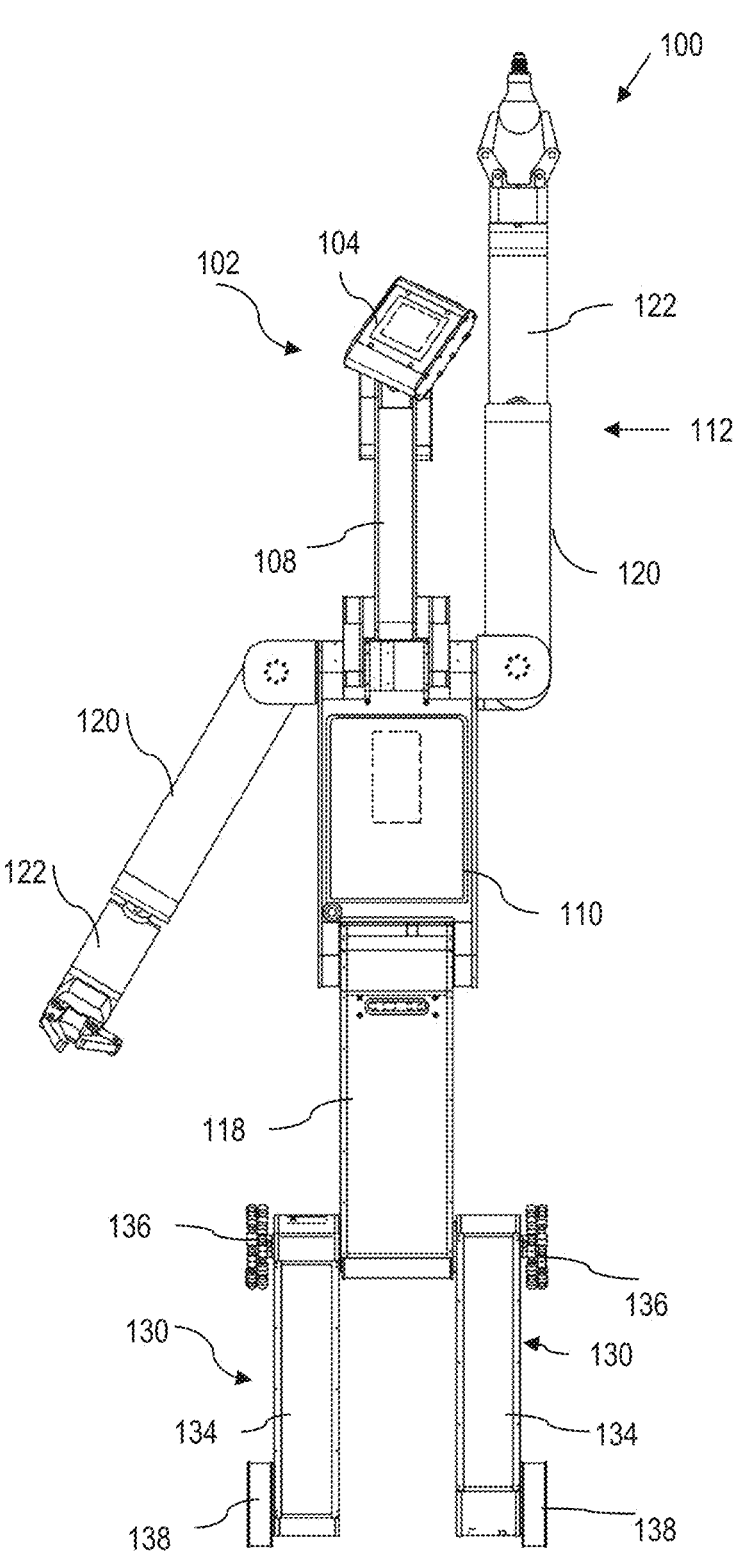
Figure 24:
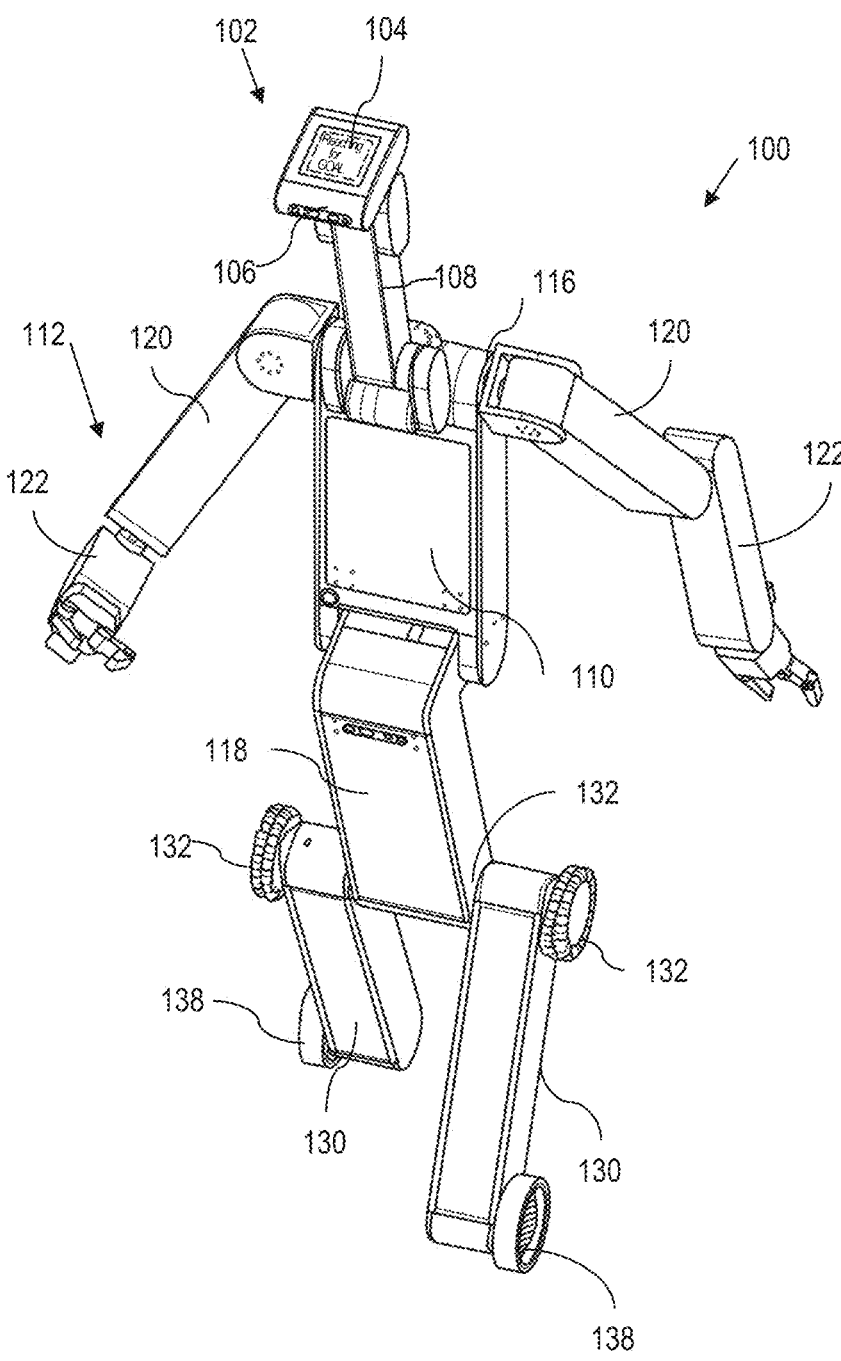
FIG. 24 is a perspective view of a robot according to some non-limiting embodiments of the present disclosure in an extended state.

Referring now to FIGS. 22 and 23, FIGS. 22 and 23 are a side view and a perspective view of an implementation of robot 100 according to some non-limiting embodiments of the present disclosure. As shown in FIGS. 22 and 23, the seventh mode of operation may be suitable for tasks associated with reaching higher off the ground, such as changing a light bulb. FIG. 24 is a perspective view of robot 100 according to some non-limiting embodiments of the present disclosure in an extended state Referring additionally now to FIG. 24, as shown in FIGS. 22-24 where robot 100 is in the seventh mode of operation, the lower legs 130 may be in an open stance. Given that the lower joints can move independently, robot 100 may balance statically, reducing power consumption required by self-balancing. As shown in FIG. 22, the center of mass may roughly be in between the second drive wheels 138. In some non-limiting embodiments, lower joint independence may also allow robot 100 to slalom in turns in case there is a need to traverse a long distance quickly.

Figure 25:
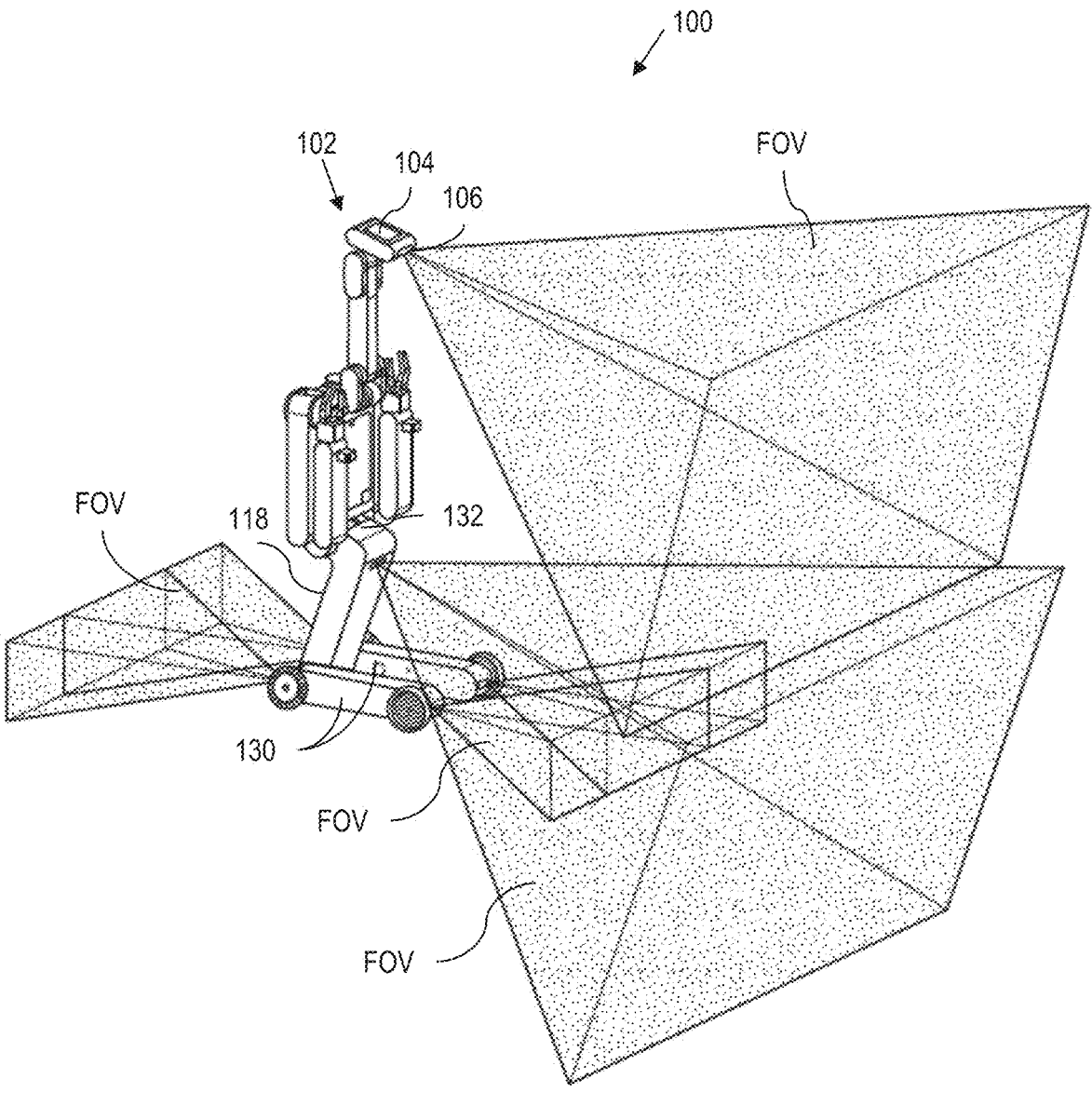
FIG. 25 is a perspective view of a robot and components thereof according to some non-limiting embodiments of the present disclosure.

Referring now to FIG. 25, FIG. 25 is a perspective view of robot 100 and components thereof according to some non-limiting embodiments of the present disclosure. In some non-limiting embodiments, as shown in FIG. 25 robot 100 may include multiple additional sensors in various positions.

In some non-limiting embodiments, one or more first sensors 106 of head 102 of robot 100 may be a camera. In some non-limiting embodiments, robot 100 may include at least one of the following additional sensors: a camera; a motion sensor; a time-of-flight sensor; a multiple inertial measurements unit sensor; an accelerometer; a pressure sensor; a temperature sensor; a humidity sensor; a smoke detector; a Carbon Monoxide (CO) sensor; a particulate matter sensor; an indoor air-quality sensor; a radiation sensor; an oximeter; a heart rate sensor; or a biometric sensor.

Exemplary fields of view (FOV) of these additional sensors are shown in FIG. 25. For example, robot 100 may include a camera on the front of the hip joint. This may allow robot 100 to see an avoid collision with any low obstacle, moving or not, including children and the traveling path. As shown in FIG. 25, the FOV between the head and hip cameras may overlap so there is not blind spot while robot 100 is moving.

One such additional sensor may be a camera on the hands of robot 100 to make manipulation tasks more robust. Feedback from a camera may help robot 100 to avoid occlusion during grasping. It may also allow robot 100 to use a technique known as visual-servoing, where robot 100 may control and calibrate the hand position as it gets closer to the object. This additional camera may also serve to aggregate images to the other cameras improving robot 100 mapping and localization capabilities.

Other additional sensors may include Multiple Inertial Measurements Units (IMU) sensors to detect robot 100 orientation in space (e.g., if it is climbing a ramp, adjusting the controllers to compensate for it). It may also detect small impacts and react accordingly; Multiple Time of Flight Sensors (TOF), to detect obstacles during runtime, send an emergency signal to the motor controllers and the main computer, and to stop robot 100, avoiding collisions; Temperature, pressure, or humidity sensors to inform humans about the environment; Safety sensors such as Carbon Monoxide (CO) sensors, particulate matter sensors, indoor air-quality sensors, or radiation sensors; Health monitoring sensors (for example, located at the finger) such as oximeters, heart rate sensors, or thermal imaging cameras. Thermal imaging cameras may help to spot illness, or detect hot/dangerous surfaces (e.g., stove surface) allowing robot 100 to alert humans and protect itself from touching it; and Biometric sensors such as face recognition from camera or fingerprint sensors. For example, as shown in FIG. 25, robot 100 may include two depth sensors (i.e., RGB cameras), which may be positioned on head 102 and hip joint 132 or riser member 118, respectively. Robot 100 may also include four TOF sensors positioned on legs 130, which may aid in collision avoidance and to detect obstacles such as holes or stairs.

Figure 26:
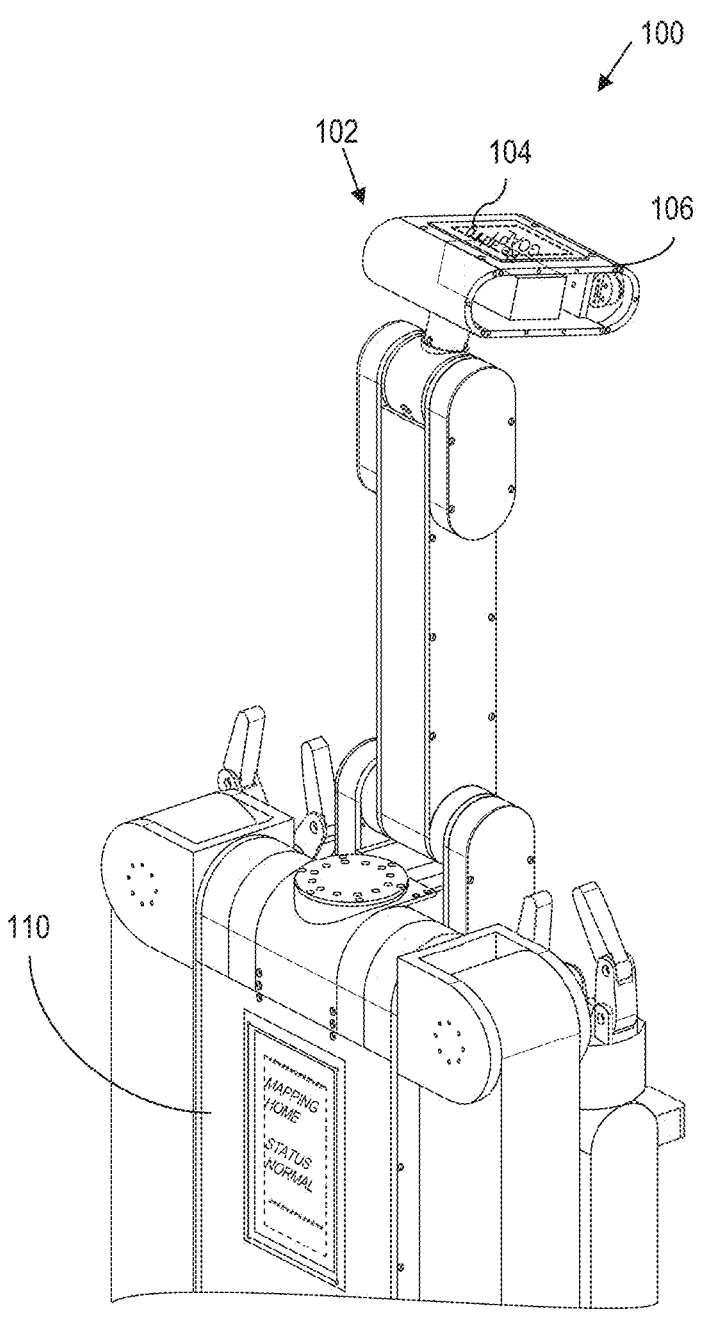
FIGS. 26 and 27 are perspective views of various components of a robot according to some non-limiting embodiments of the present disclosure.
Figure 27:
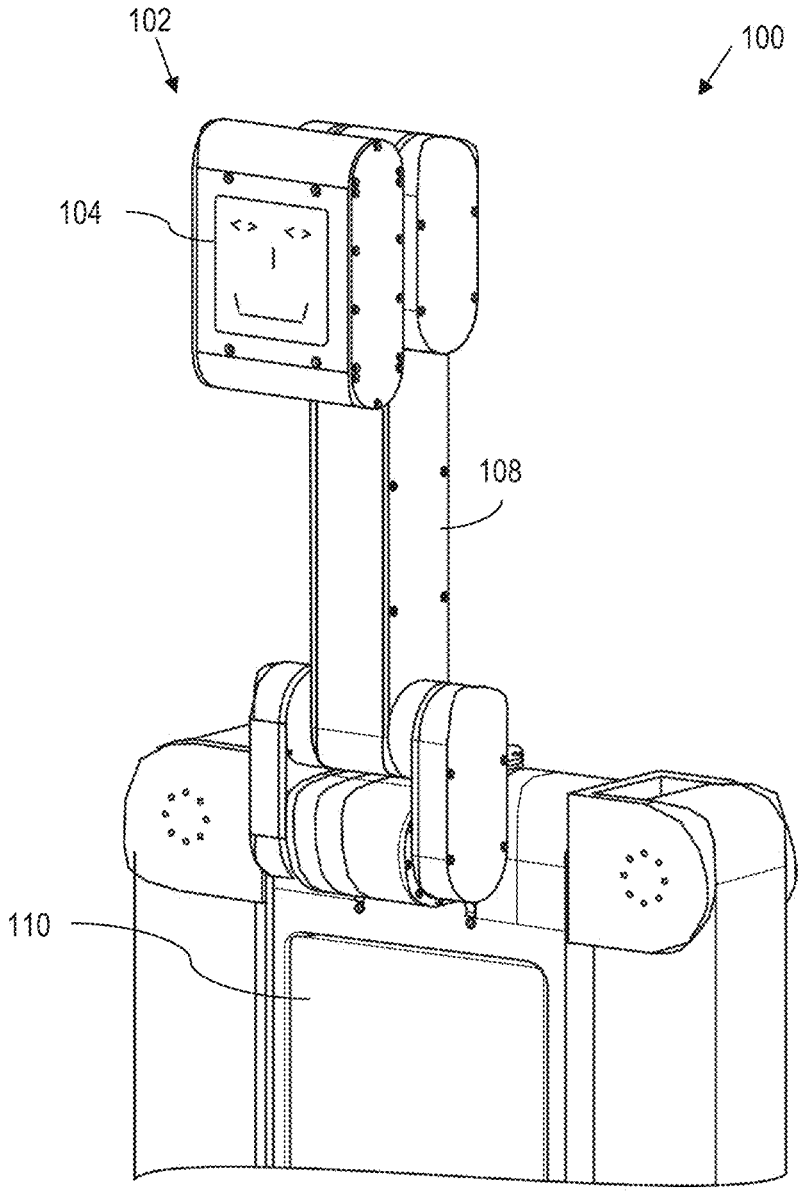

Referring now to FIGS. 26 and 27, FIGS. 26 and 27 are perspective views of various components of robot 100 according to some non-limiting embodiments of the present disclosure. As shown, robot 100 may include screen 104 provided on head 102. Screen 104 may be capable of displaying interactive images, for example a face, for interaction with a user (i.e., Human-Machine-Interactions). In some non-limiting embodiments, robot 100 may further include one or more speakers, one or more lights, and one or more microphones. For example, head 102 may contain a microphone array that listens to words and parses them with Natural Language Processing (NLP) into understandable instructions. The microphone may also hear sounds and detect the direction where they came from (i.e., multi-directional microphones). Head 102 may also contain speakers so that robot 100 can speak with humans in their natural language. In some non-limiting embodiments, additional screens for further interaction and communication may be positioned on torso 110.

In some non-limiting embodiments, the one or more speakers may be configured to communicate audible warnings, alerts, messages and instructions to a user and other robots. The one or more lights may be configured to communicate visual warnings, alerts, messages and instructions to a user and other robots. The one or more microphones may be configured to record sounds including verbal commands from a user, and wherein the controller is further configured to receive and process the sounds recorded by the one or more speakers, convert the sounds to a data set, and communicate the data set with the components during execution of a task.

Figure 28:
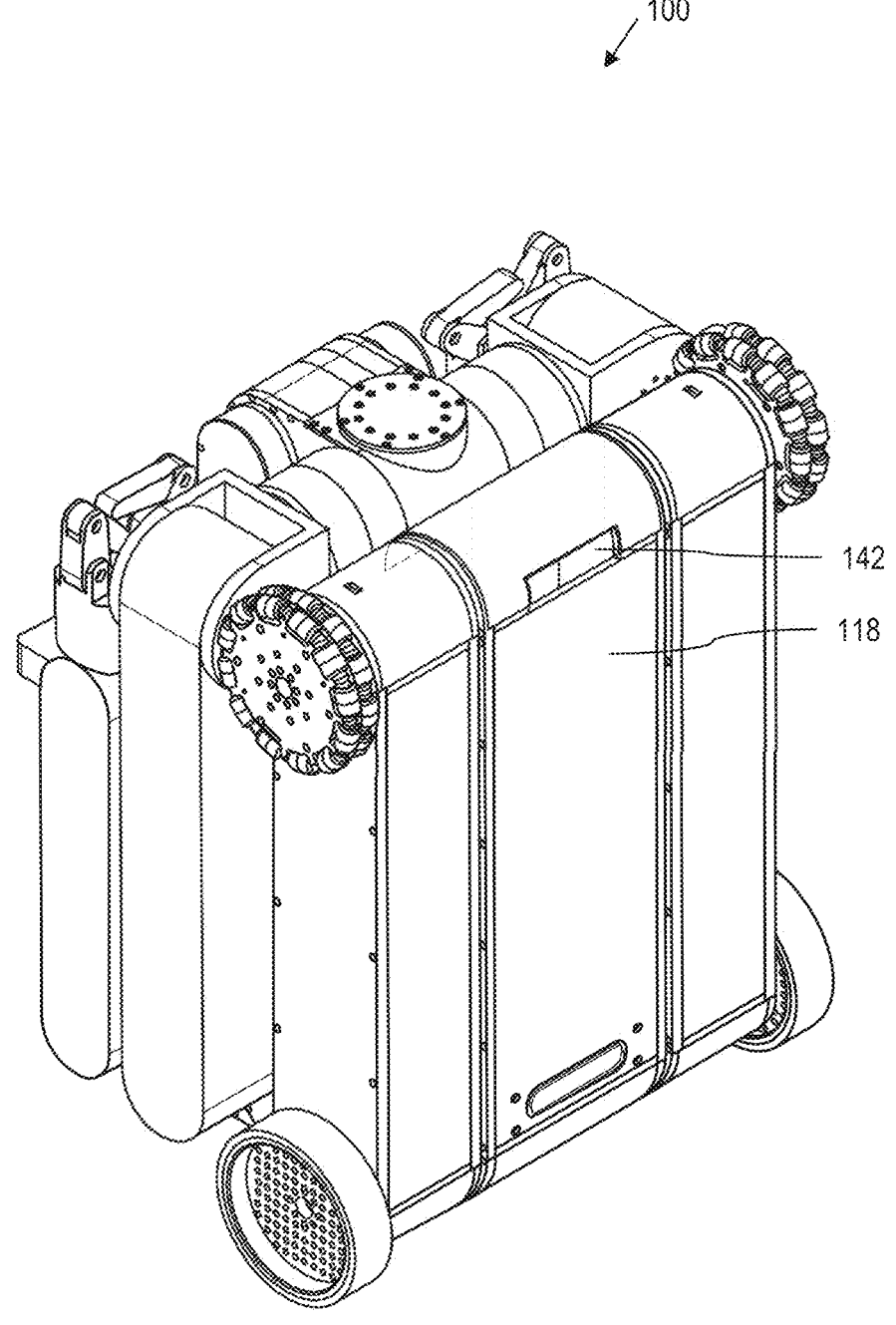
FIG. 28 is a perspective view of a robot in a folded state and components thereof according to some non-limiting embodiments of the present disclosure.

Referring now to FIGS. 28-32, FIGS. 28-32 are perspective views of various implementations of robot 100 in a folded state according to some non-limiting embodiments of the present disclosure. As shown in FIG. 28, in some non-limiting embodiments, robot 100 may include a handle 142 (e.g., an opening), which may be disposed on the bottom of robot 100 or on the bottom of riser member 118. The opening or handle 142 may be configured to allow a user to pick up and transport robot 100. The opening or handle 142 makes it easier to carry robot 100, transport robot 100, and even hang robot 100 such as on a wall.

Figure 29:
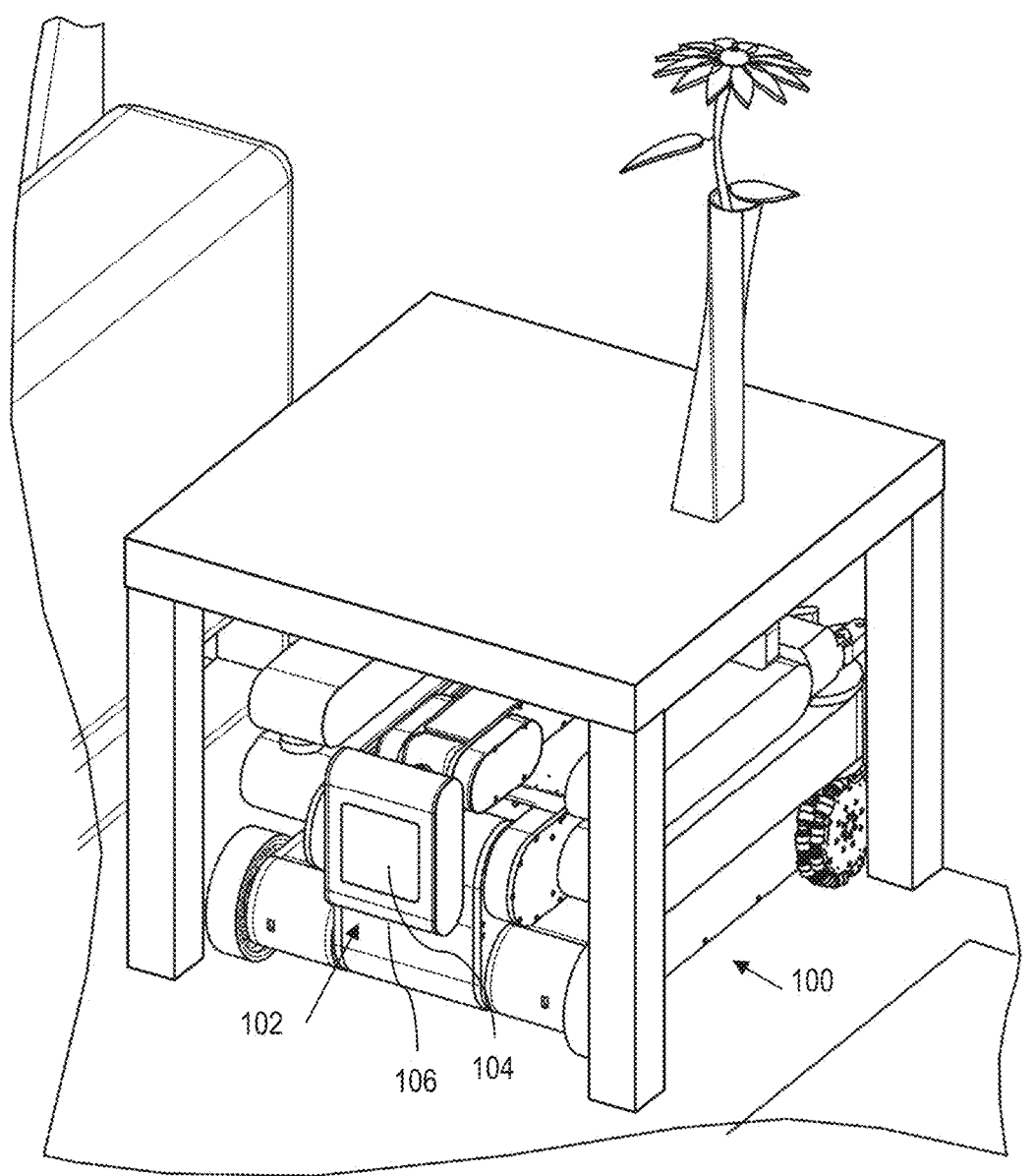
FIGS. 29-31 are perspective views of various implementations of a robot in a folded state according to some non-limiting embodiments of the present disclosure.
Figure 30:
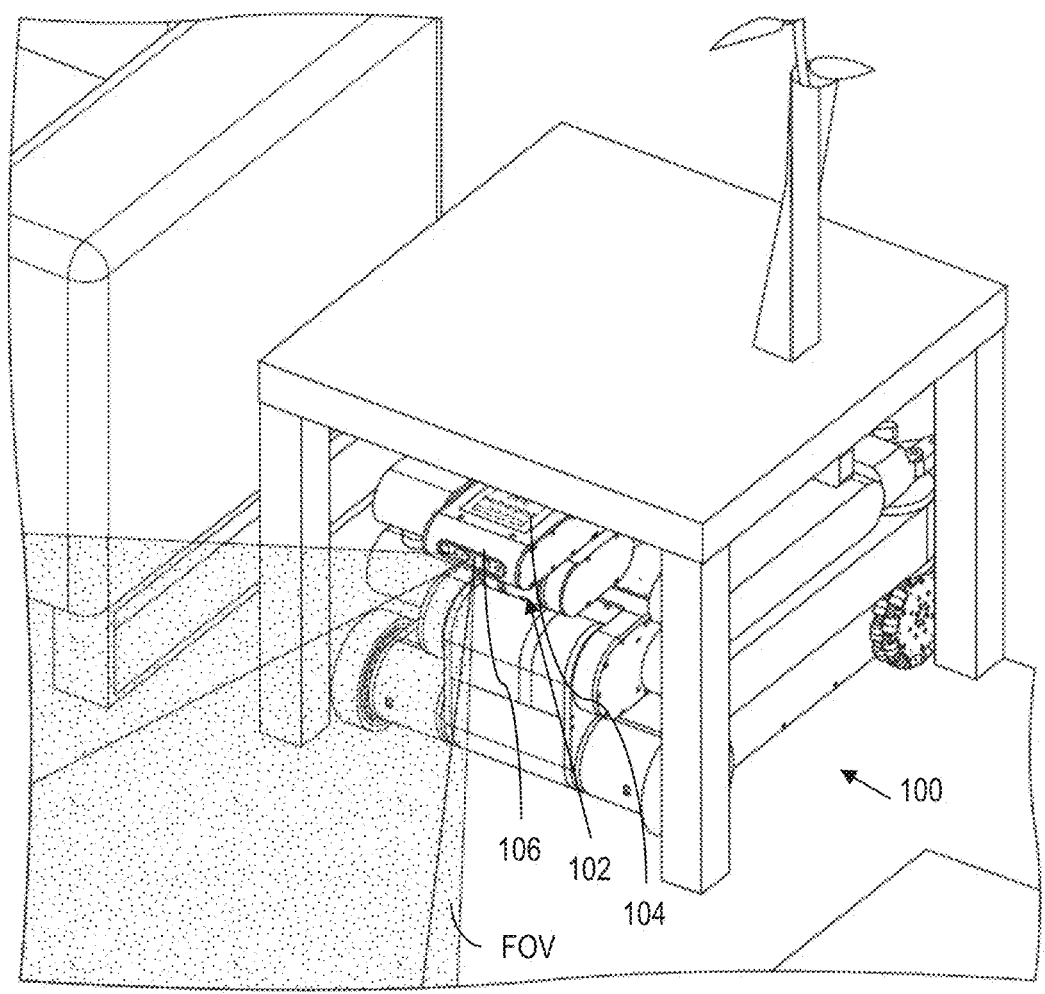
Figure 31:
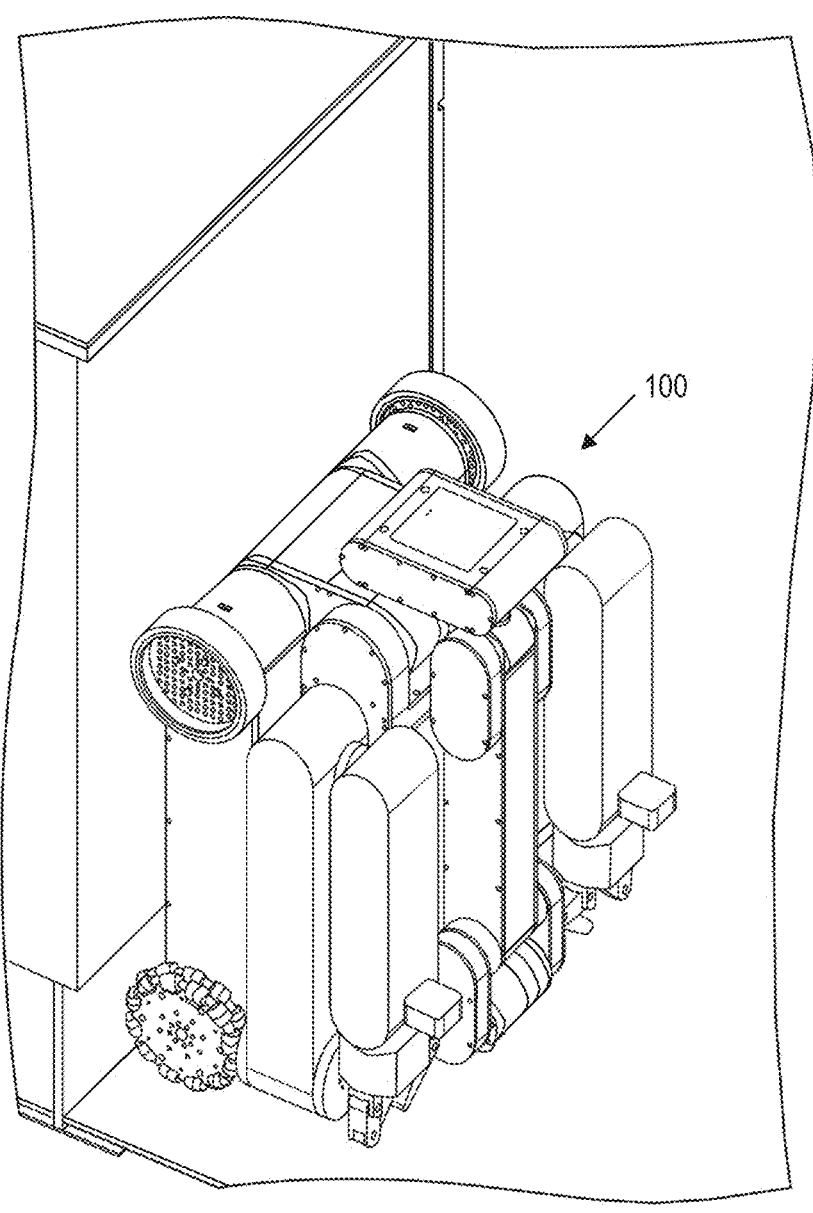
Figure 32:
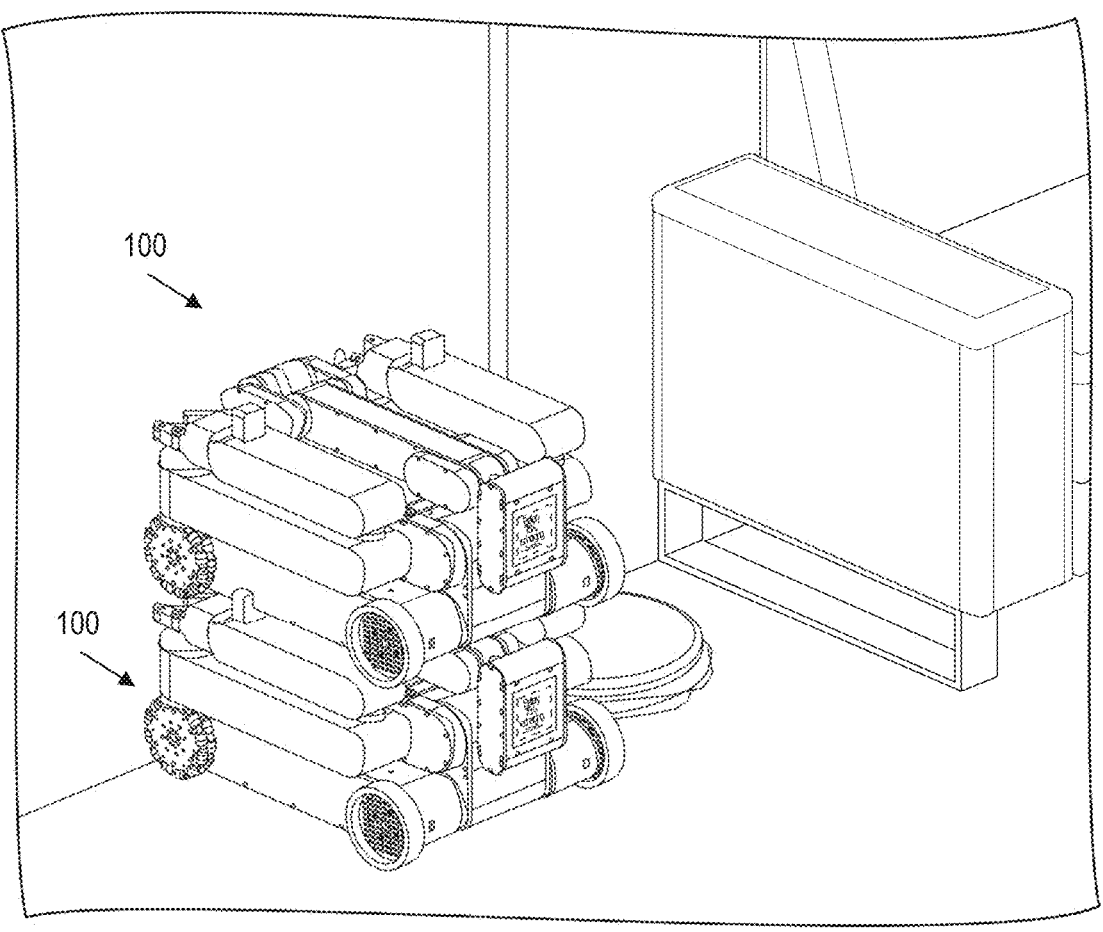
FIG. 32 is a perspective view of an implementation of robots in a folded state according to some non-limiting embodiments of the present disclosure.

In some non-limiting embodiments, as shown in FIGS. 29-32, the folded state may define a first mode of operation, which may be a standby mode. In some non-limiting embodiments, in the first mode of operation, sensor 106 (e.g., a camera such as a the front RGBD (3D point cloud camera) may face forward while robot 100 is fully folded. From this state, robot 100 may navigate a room, scan it, and map it while avoiding obstacles. Robot 100 can also localize itself and move to specific destinations. If a user desires, robot 100 may be ready to receive commands such as hand gestures. Robot 100 may also watch home while residents are out. For example, head 102 may have a depth and RGB camera (RGBD) capable of producing a 3D point cloud representation of the environment and may also identify human gestures and convert them into instructions. As shown in FIG. 29, robot 100 may be inconspicuous and may put itself away, out of the way, after a task is completed. Head 102 may be kept lowered for privacy or may be kept up to monitor the room as a security monitoring measure or while receiving instruction. An exemplary Field of View (FOV) of sensor 106 is shown in FIG. 30. In the exemplary position, robot 100 may be charging its battery. Actuation of head 102 allows robot 100 to navigate around and under obstacles so that it is out of sight and out of the way of users. Robot 100 may also be stored or store itself in a vertical position to take up less ground space, as shown in FIG. 31. As shown in FIG. 32, multiple robots 100 may be stack for storage to further save room.

Figure 33:
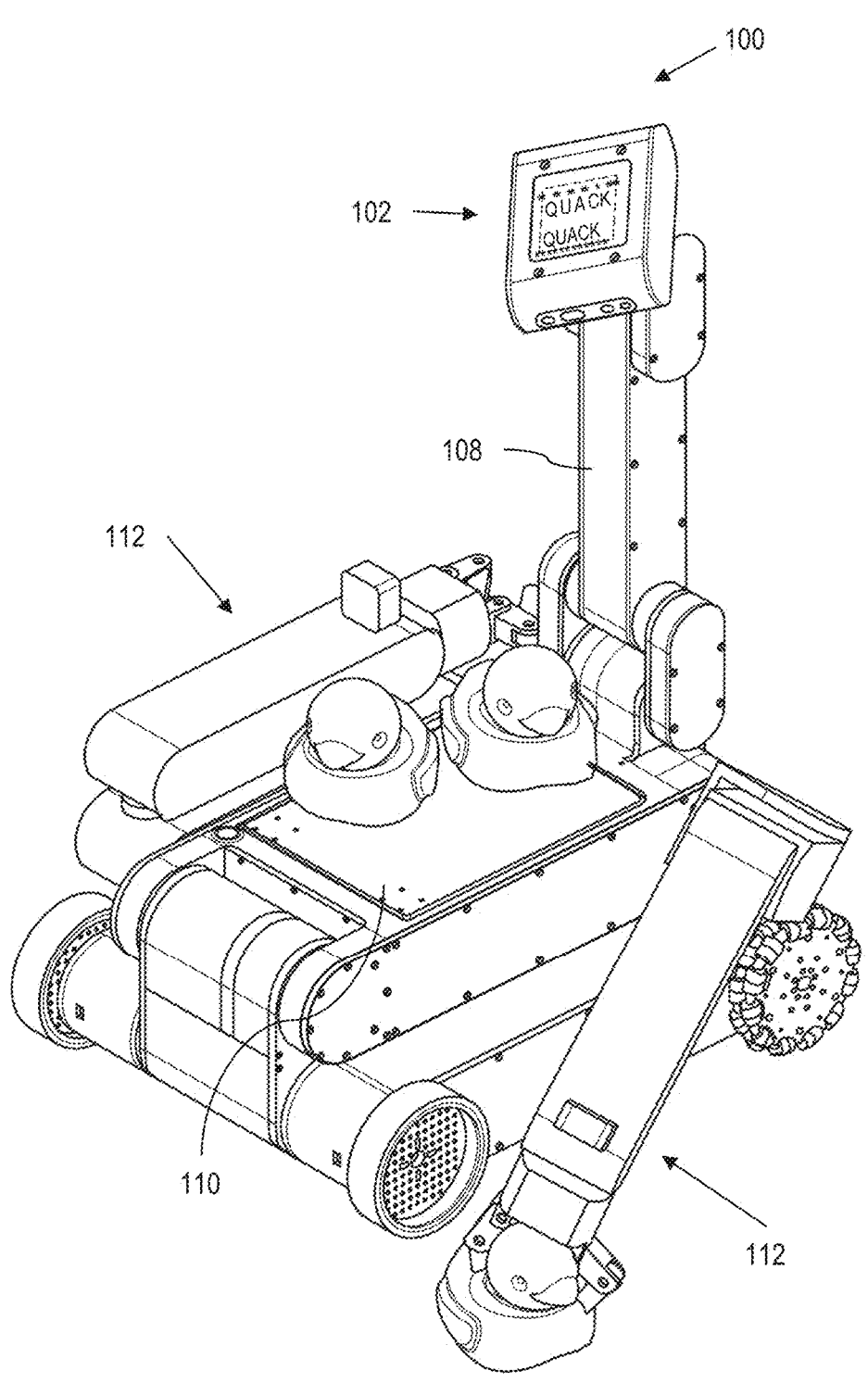
FIGS. 33-43 are perspective views of various implementations of a robot according to some non-limiting embodiments of the present disclosure.

Referring now to FIGS. 33-43, FIGS. 33-43 are perspective views of various implementations of robot 100 according to some non-limiting embodiments of the present disclosure. As shown in FIG. 33, the state of robot 100 may be a second mode of operation defined by a vertical elongate neck member 108, head 102 facing back, and arms 112 deployed backward. An example of a use for this mode may be decluttering a room by reaching objects close to the ground. In some non-limiting embodiments, robot 100 can use its back to carry clutter back to a bin. This interim storage saves multiple travels. A container may also be placed on the back of robot 100, such as one torso 110, and objects can be placed directly into it. Robot 100 may then place such container back into a desired spot, into a drawer or neatly place objects on a shelf.

Figure 34:
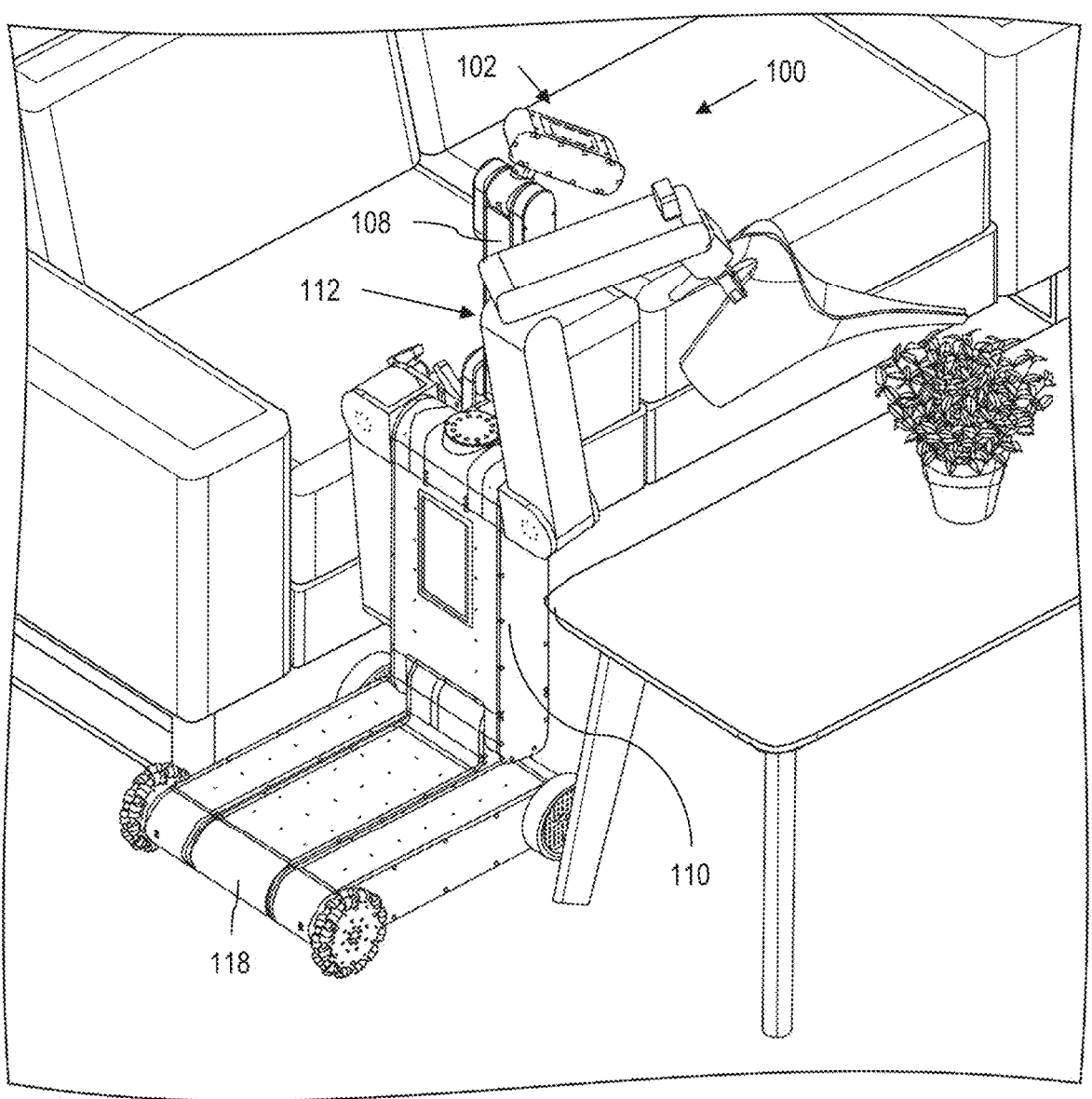
Figure 35:
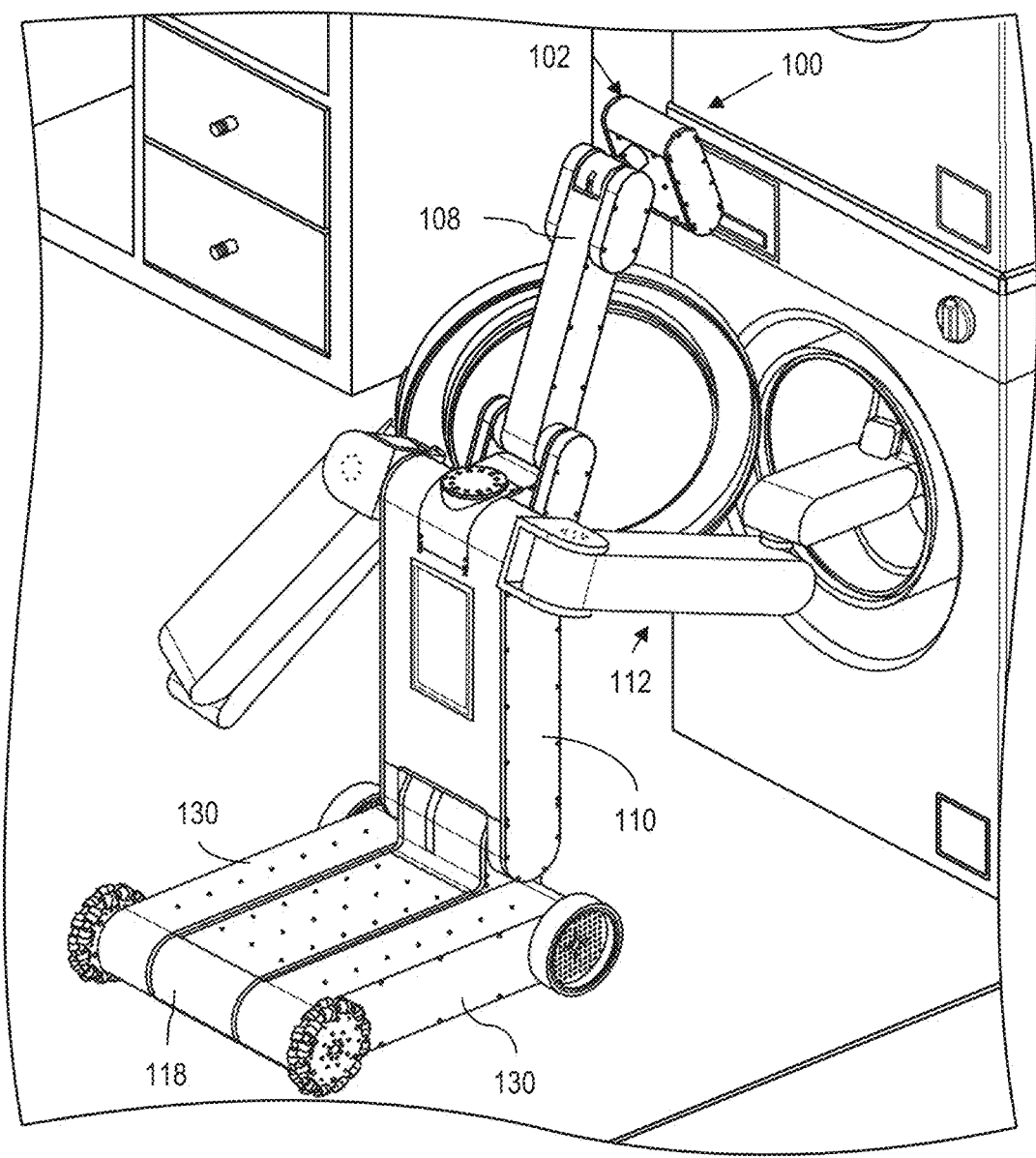

The state illustrated in FIGS. 34-35 may be a third mode of operation defined by a vertical elongate neck member 108, head 102 facing forward, torso 110 vertical, and arms 112 deployed forward. An example of a use for this state may be to water plants as shown in FIG. 34, to change laundry in a laundry machine as shown in FIG. 35, to make up a bed, to tidy up low furniture, or to organize or pick and place books and objects at lower shelves. In exemplary embodiments, robot 100 may be able to put clothes in a washing machine, later moved them to a drying machine, and finally get all dried clothes into a basket. It may also be able to sort it by color, or type of clothes. Over time robot 100 may also learn to fold and store clothes and towels.

Figure 36:
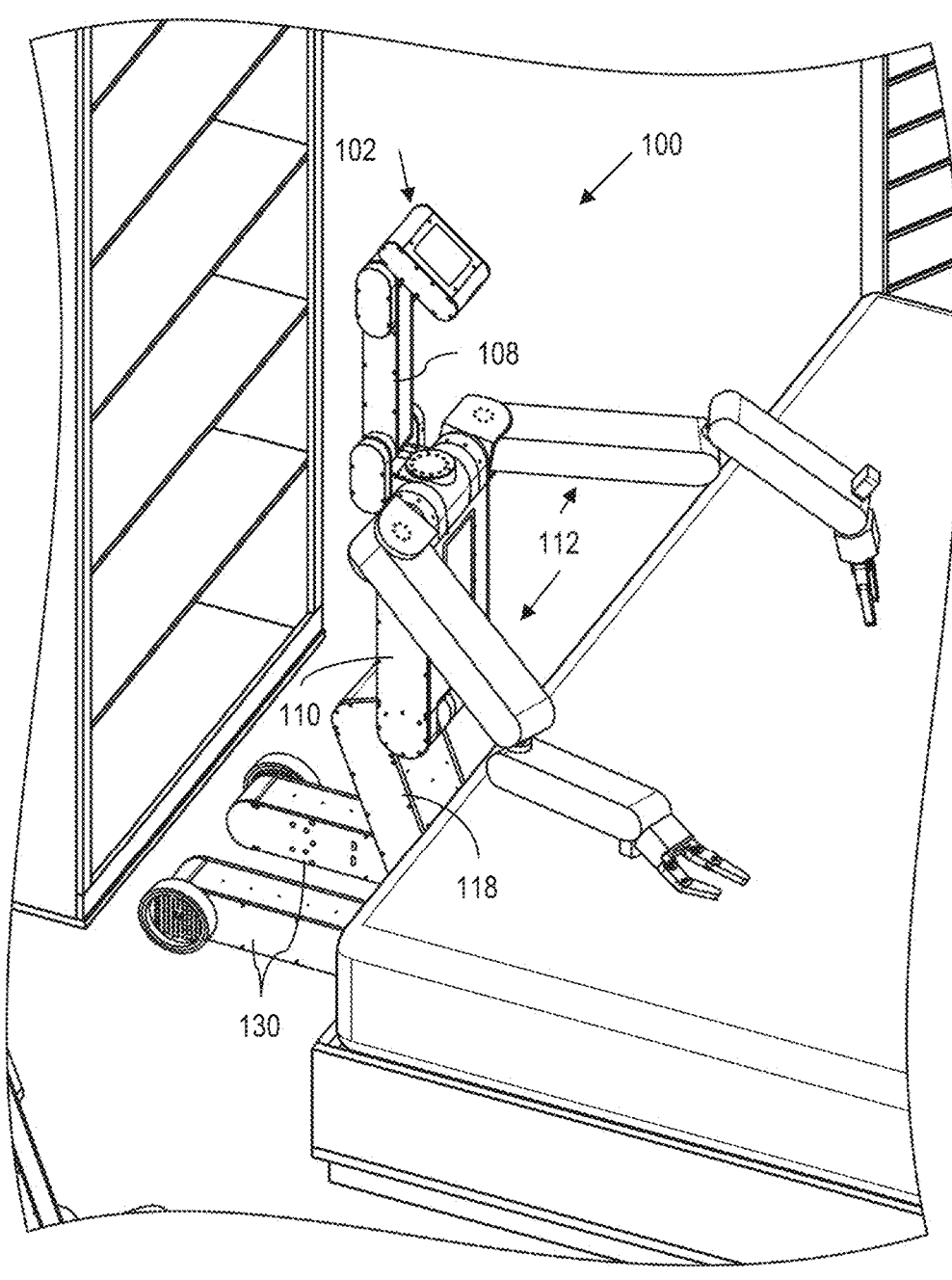
Figure 37:
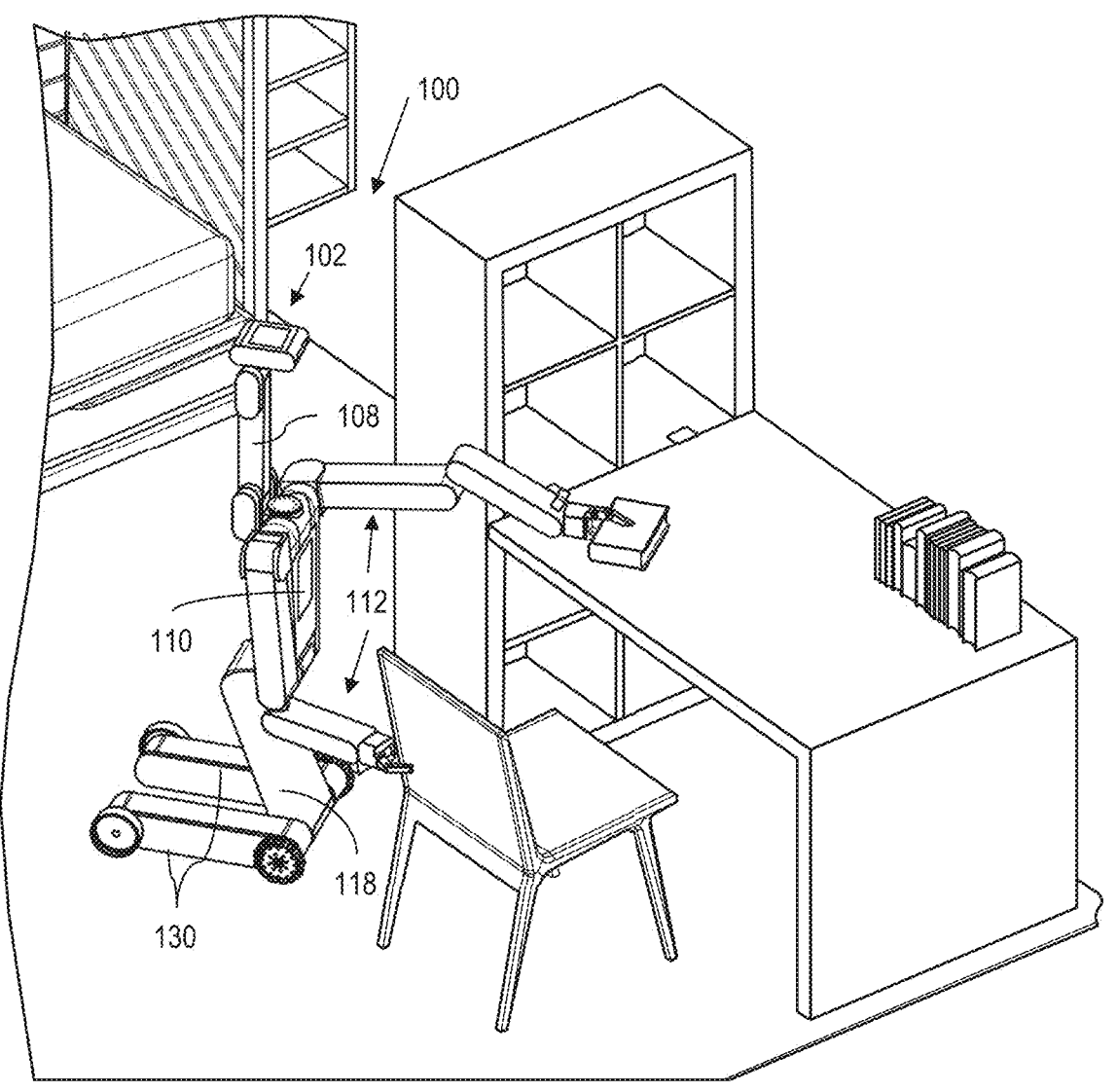
Figure 38:
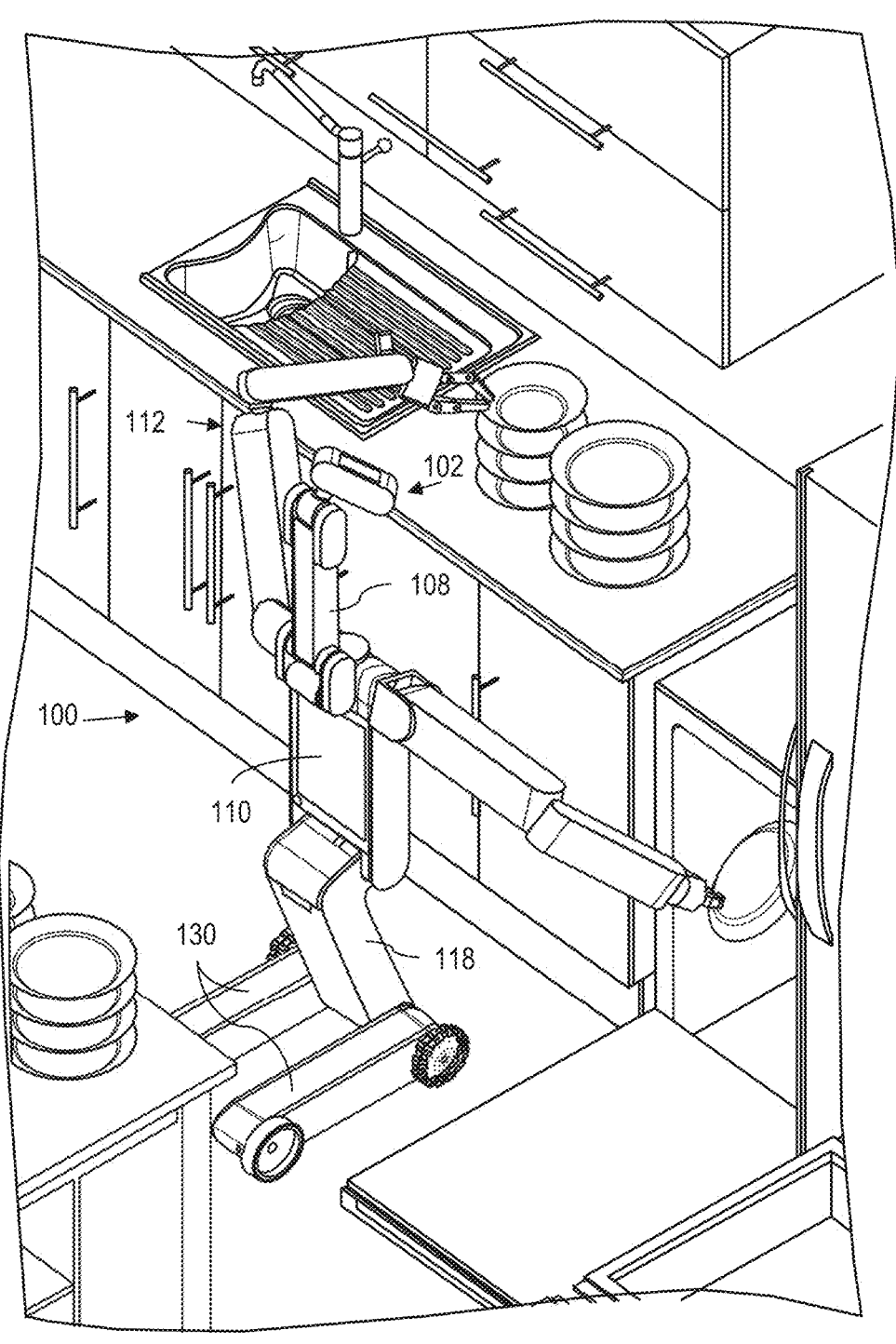
Figure 39:
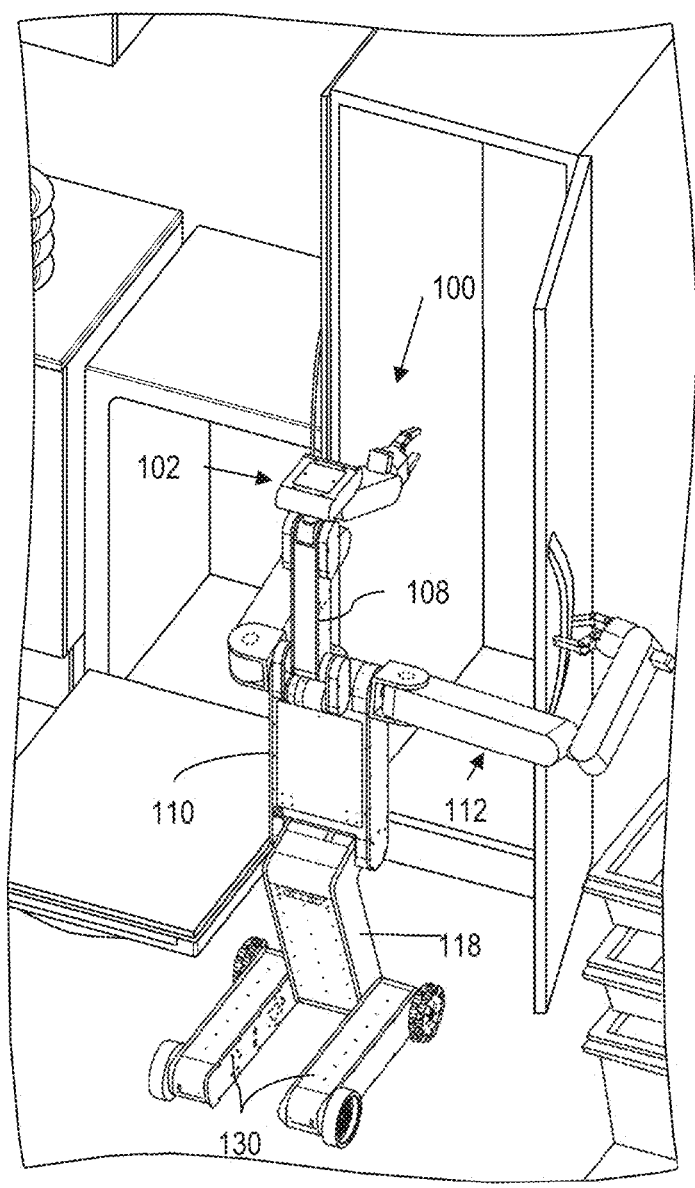

The state illustrated in FIGS. 36-39 may be a fifth mode of operation defined by a vertical elongate neck member 108, head 102 facing backward, vertical torso 110, arms 112 deployed backward, and riser member 118 positioned at an angle with respect to legs 130. As shown in FIGS. 36-39, riser member 118 may be positioned at an angle of about 60 degrees with respect to legs 130. An exemplary use for this state may be to make up a bed, as shown in FIG. 36. As shown in FIG. 37, another exemplary use for this state may be to tidy up low furniture or to organize or pick and place books and objects at lower shelves or tables. Another example of a use for this mode may be to localize and open a dishwasher to load or unload dishes, as shown in FIG. 38. Robot 100 may raise the dishwasher door and put dishes away in higher places by adjusting its posture to reach higher grounds, as shown in FIG. 39.

Figure 40:
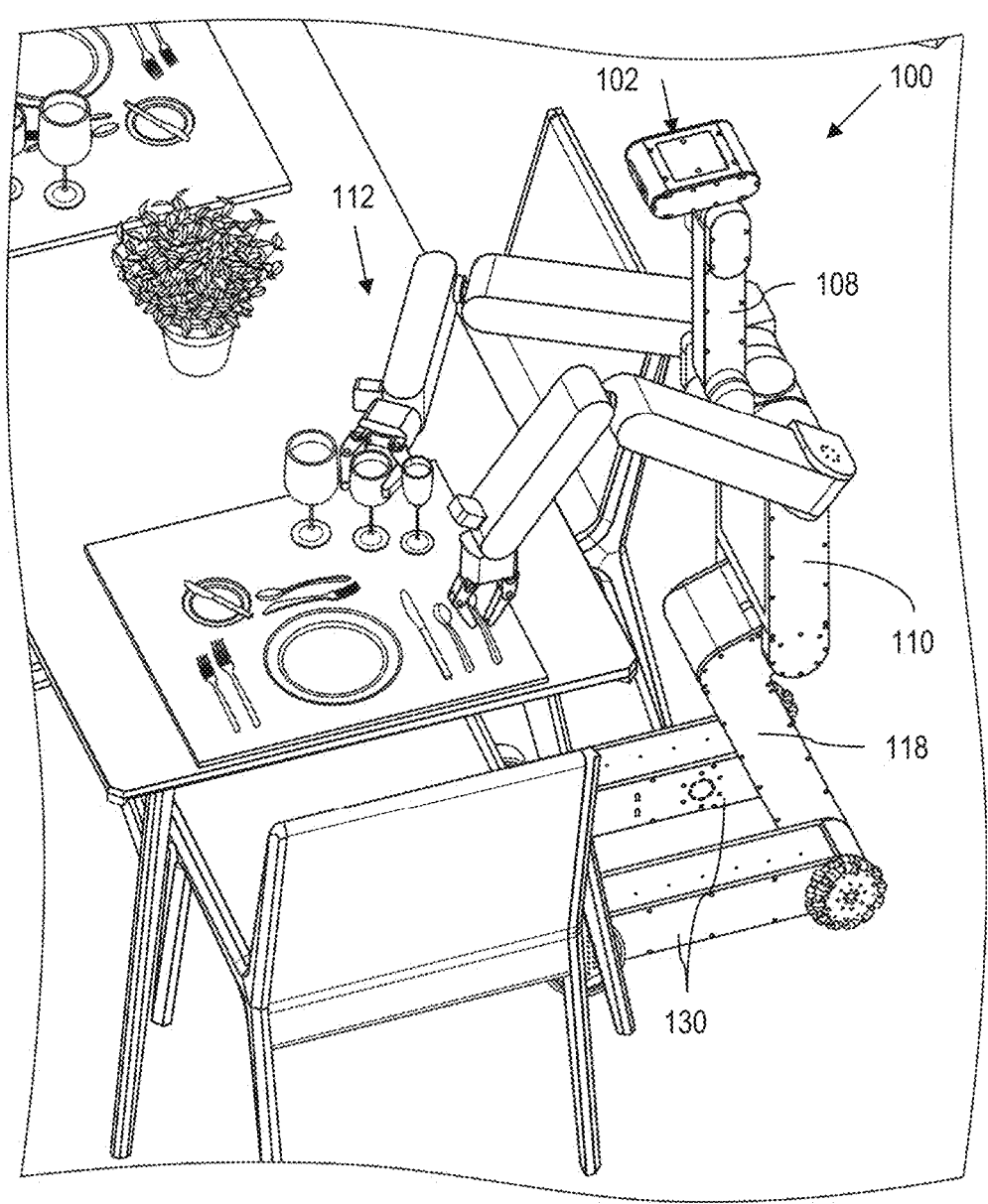
Figure 41:
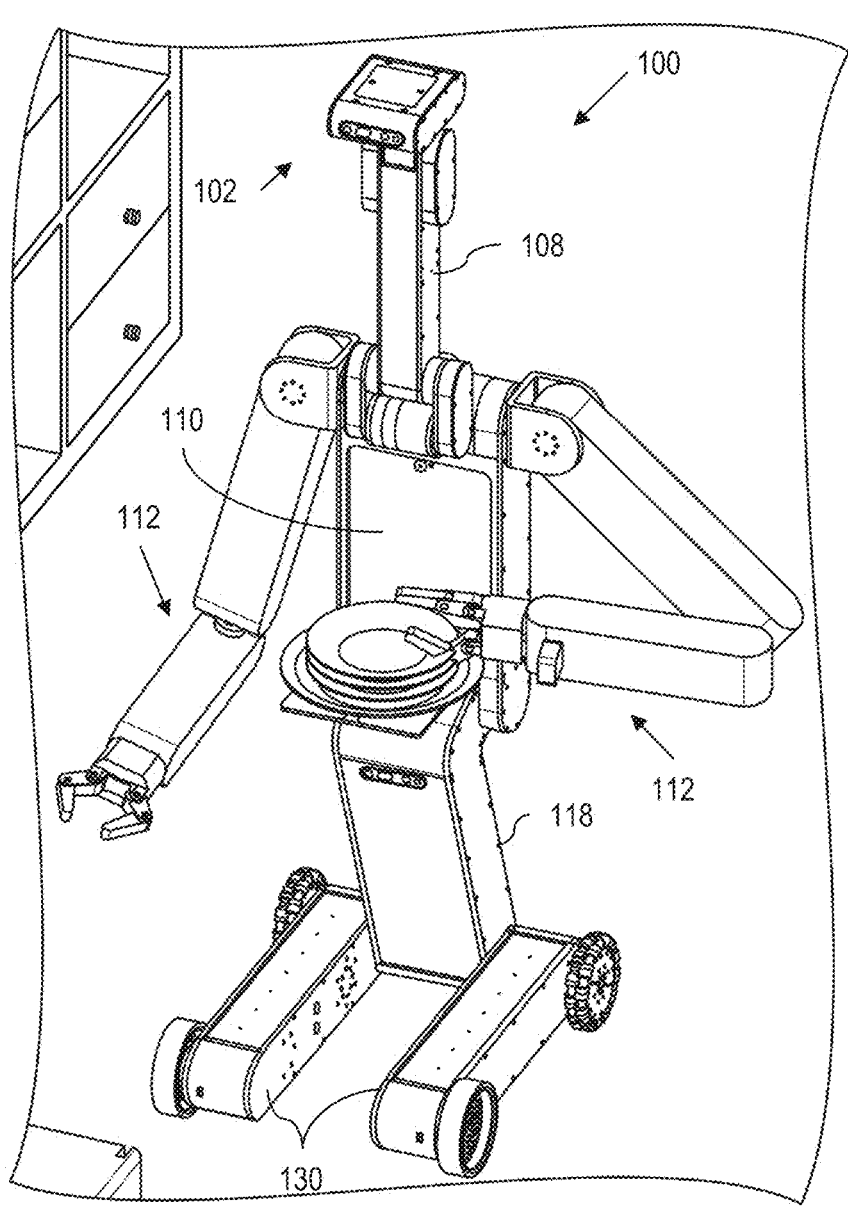
Figure 42:
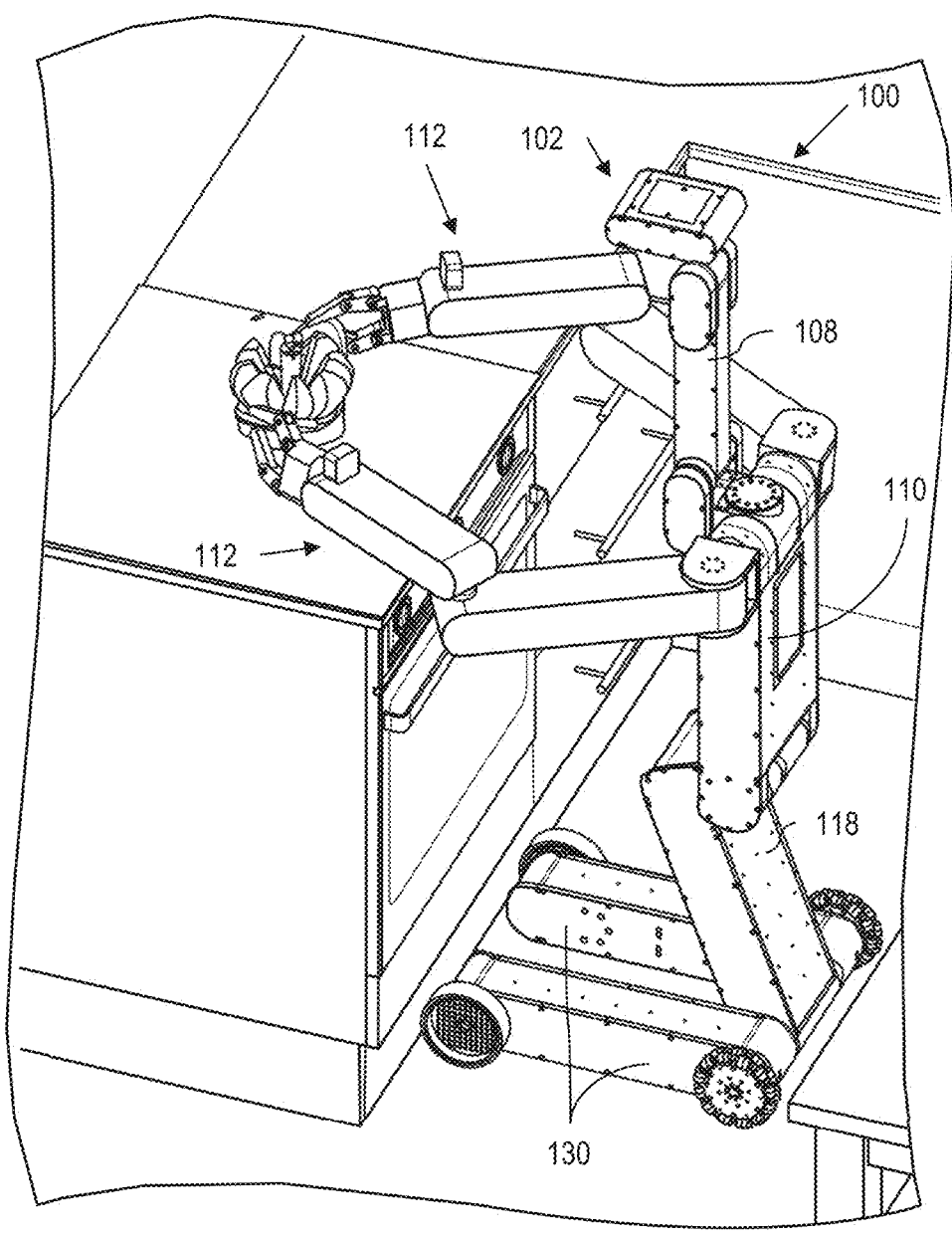

The state illustrated in FIGS. 40-42 may be a sixth mode of operation defined by a vertical elongate neck member 108, head 102 facing forward, vertical torso 110, arms 112 deployed forward, and riser member 118 at 60 degrees. Examples of a use for this mode may be setting up or cleaning up a table as shown in FIGS. 40-42. In some non-limiting embodiments, pan & tilt mechanics of head 102 allows robot 100 to see in the desired direction. In some non-limiting embodiments, this may be a default position of robot 100 while in operation. In some non-limiting embodiments, as shown in FIG. 40, the base of robot 100 may have a fork shape with two separate legs 130 which allows robot 100 to place them under a furniture improving its reach. The alternative would be a solid base in one body, but that would not allow robot 100 to place its base around an object.

Figure 43:
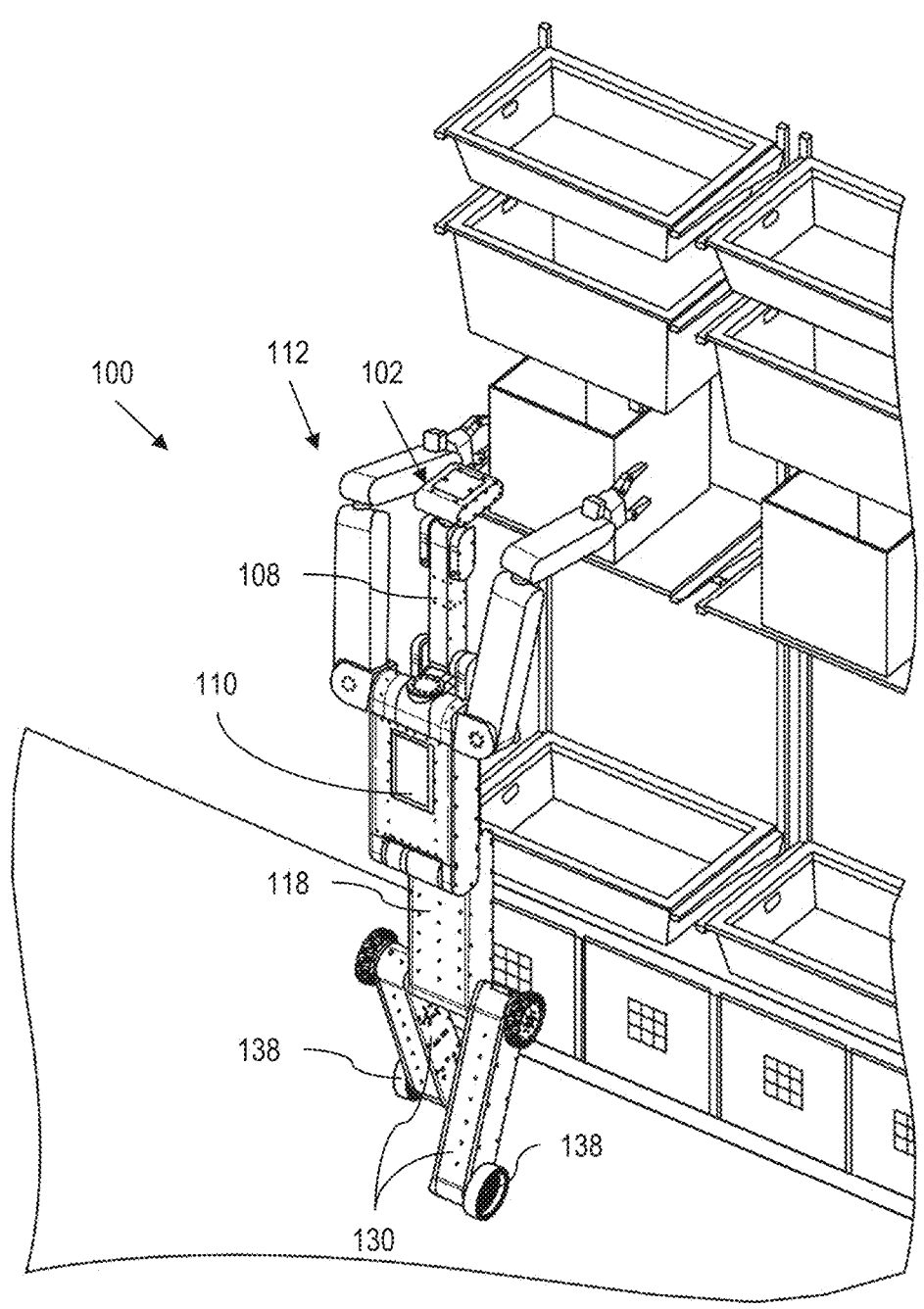

The state shown in FIG. 43 may be a seventh mode of operation whereby robot 100 is fully extended and self-balancing on second drive wheels 138. In this mode, robot 100 may reach its full potential of observability and speed. As shown in FIG. 43, this mode may allow robot 100 to reach higher for completion of tasks such as picking up objects at higher shelves. Examples of a use for this mode may be inspection and monitoring of surroundings. In exemplary embodiments, the center of mass may be roughly over drive wheels 138.

Figure 44:
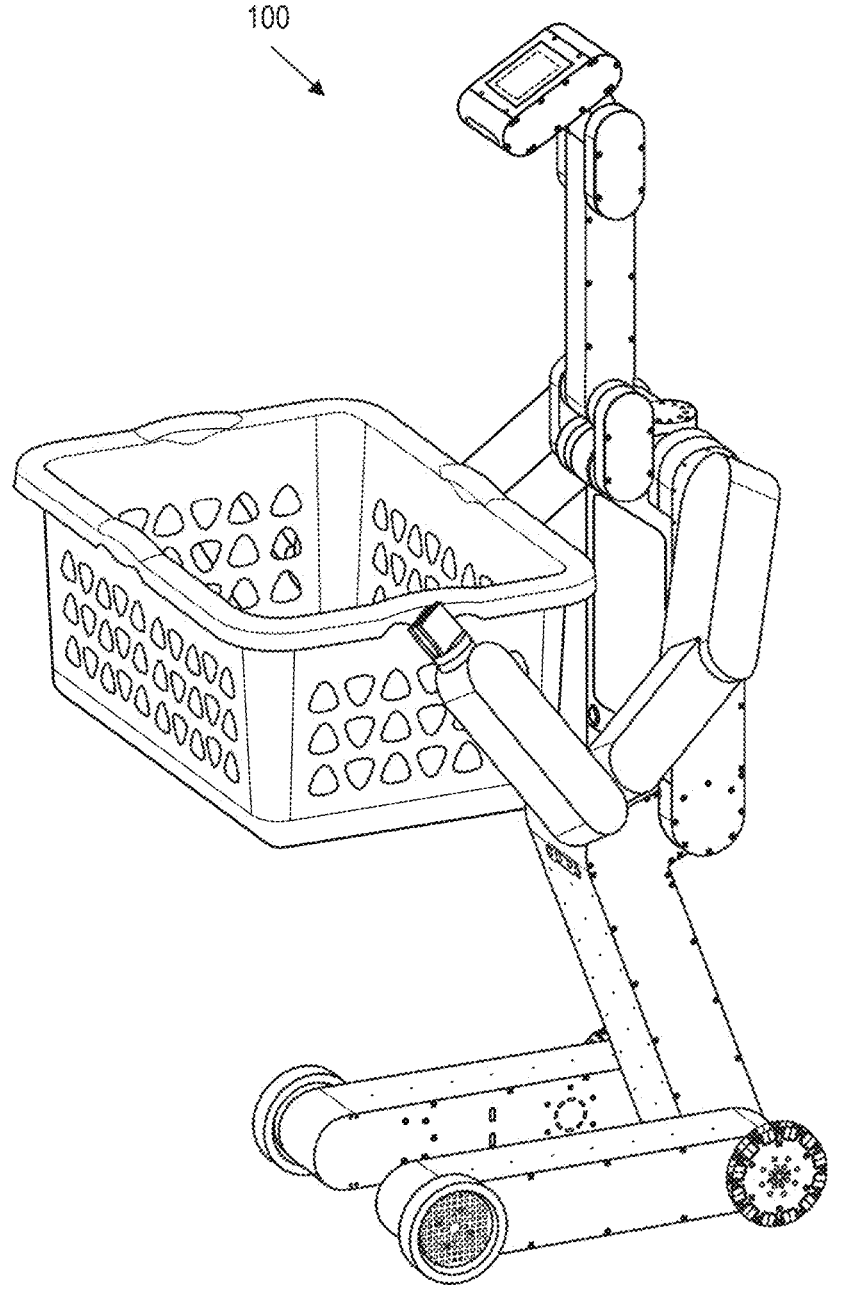

Referring now to FIGS. 44-46, FIGS. 44-46 are various views of an implementation of robot 100 according to some non-limiting embodiments of the present disclosure. As shown in FIGS. 44-46, robot 100 may transition between multiple states and modes of operation during completion of a task, as necessary. Robot 100 may be constantly monitoring its own weight and payloads to make sure that the total center of mass falls within its base to maintain stability and avoid any danger of tipping over. For example, as shown in FIGS. 44-46, while lifting a heavy laundry basket, robot 100 may sense that the center of balance is off and may adjust its height to re-center itself. Further, as shown in FIGS. 44-46, robot 100 may change its height without the need to adjust its grip.

The morphology of robot 100 may not follow anatomic human movement. It may be partially humanoid since it may have two arms, two hands, a torso, a neck and a head. However, not only may it fold, but it may have a mobile base, for increased efficiency when compared to legs for most situations, especially indoors. A difference in the morphology may be that for a robot 100 to perform work at high surfaces, it does not necessarily need a high torso or high shoulders. Accordingly, in some non-limiting embodiments, robot 100 may have a long neck and long arms, so that it may see and reach over tall surfaces, while keeping its center of mass low and overall size short.

Several of the components and subassemblies of a non-limiting embodiment of a robot 100 for assisting with and performing household chores in accordance with the present disclosure will now be described.

Robot 100 is considered a distributed computer system. Each joint has a motor controller with processing power which communicates, both ways, over a data bus with the main computer, and all other joints (nodes). For that reason, the motor controller of the present disclosure is a strategic component for robot 100, including the communication protocols and brushless DC motor controller.

Figure 47:
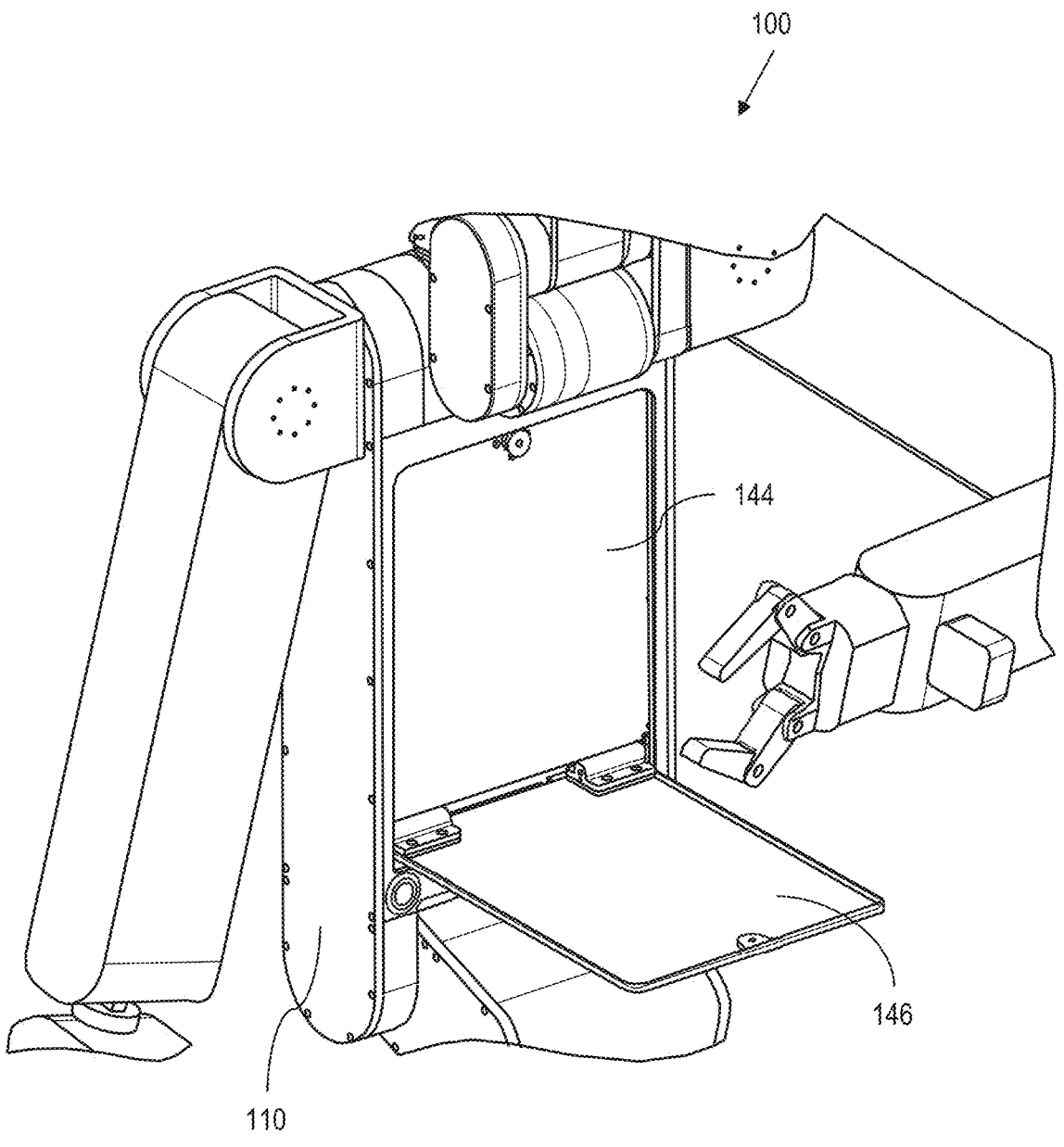
FIGS. 47 and 48 are perspective views of components of a robot according to some non-limiting embodiments of the present disclosure.
Figure 48:
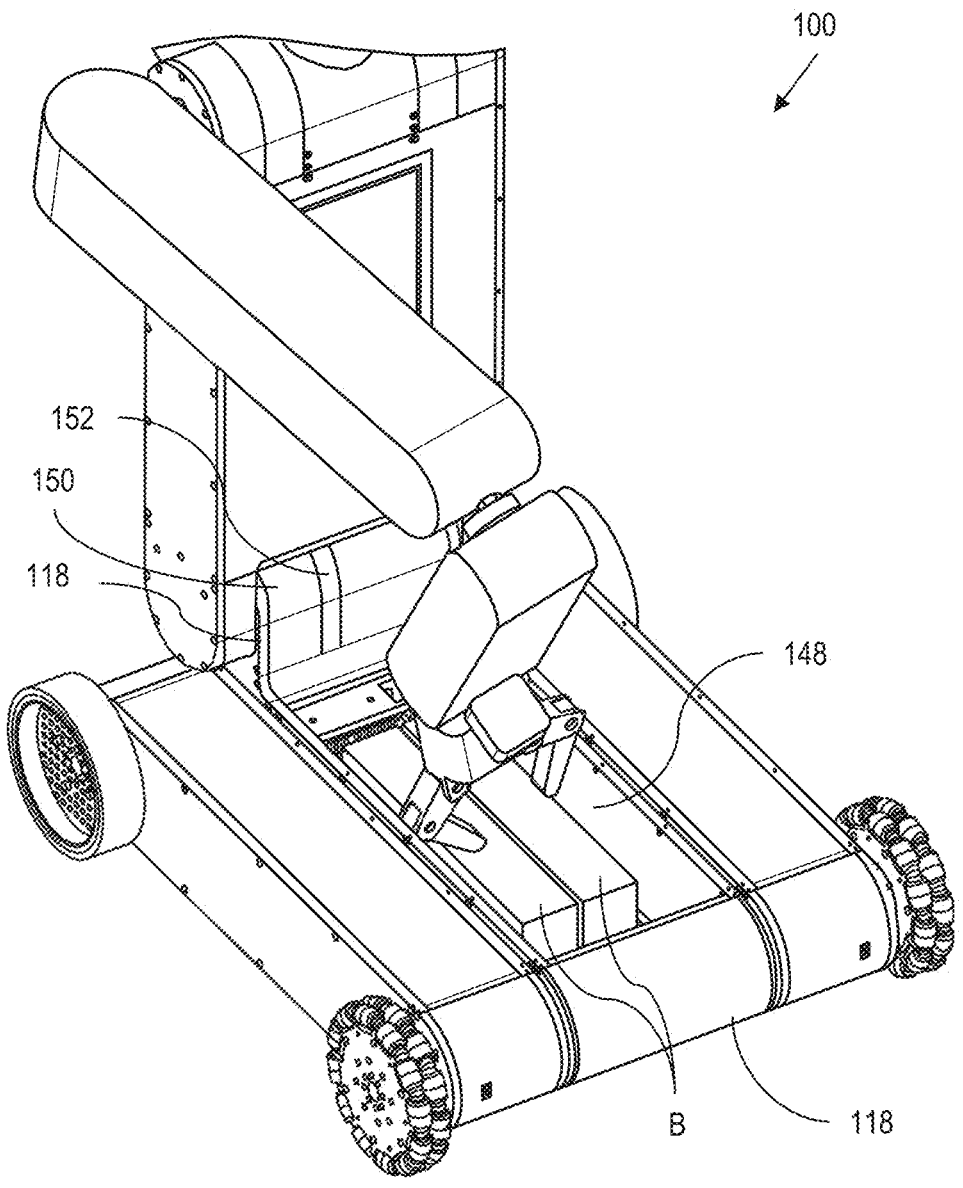

Referring now to FIGS. 47 and 48, FIGS. 47 and 48 are perspective views of components of robot 100 according to some non-limiting embodiments of the present disclosure. As shown in FIG. 47, robot 100 may have a folding front tray that can be very helpful while transporting objects such as cleaning up a table and bringing the dishes to the dishwasher (e.g., as shown in FIG. 41). This may increase object handling capacity of robot 100 and eliminate the number of trips necessary to complete a task. In some non-limiting embodiments, torso 110 may include a recess 144 configured to receive and store one or more objects and lid 146 configured to cover recess 144 and hold the one or more object in recess 144 in a closed position. In some non-limiting embodiments, in an open position, lid 146 may be configured to be a folding front tray or shelf for holding one or more object. In some non-limiting embodiments, lid 146 may be connected to torso 110 and/or recess 144 via a magnetic latch, a spring and a damper hinge. Further, the magnetic latch, spring, and damper hinge may control the open/close function of lid 146 such that robot 100 may open and close lid 146 without being driven by an actuator (i.e., a motor). In some non-limiting embodiments, robot 100 may utilize arms 112 and/or other components to open and close lid 146 when appropriate for a desired use case.

As shown in FIG. 48, in some non-limiting embodiments, riser member 118 comprises compartment 148 configured to receive and store one or more objects. Compartment 148 may further be configured to receive and store one or more rechargeable batteries B configured to power robot 100, and/or a battery management system. In some non-limiting embodiments, robot 100 may further include a surface 150 of riser member 118, and surface 150 may include at least one charging terminal 152 configured to accept one or more wires to charge the rechargeable batteries B and may further be configured to interact with a wireless charging pad to charge rechargeable batteries B. As shown in FIG. 48, robot 100 may be capable of changing its own batteries. For example, where robot 100 is mid-task and recharging is unfeasible, robot 100 may determine that instead of stopping the task and re-starting, it may be more desirable to replace its batteries to continue executing the task. Similarly, robot 100 may maintain itself by following its own preventative maintenance schedule by, for example, lubricating its own joints, tightening timing belts, or replacing broken parts if necessary, including ordering the parts itself.

Referring now to FIGS. 49-54, FIGS. 49-54 are sectional views of various components of robot 100 according to some non-limiting embodiments of the present disclosure. Robot 100 may include several types of actuators. For example, a riser joint may include one or more brushless DC motor and motor controller driving a three-stage spur-gear drive train. A riser joint may further include a cross-roller-bearing (high bending moment load) attached to the output shaft for transmitting the torque from the final gear, and an absolute encoder attached to the output shaft, providing feedback to the controller for precise position control. Further, opposite the output shaft, an Omni-wheel (free to move sideways) may be attached to an idler bearing. This riser joint may be responsible for lifting robot 100 to a specific height. A driving joint may include a similar setup to the riser joint, but with two-stage reduction gear for higher speeds at lower torque, and a standard wheel, rubberized for low noise and good traction properties, is attached to the output of the joint. An encoder may capture its position over time, giving the motor controller position and speed feedback.

Figure 49:
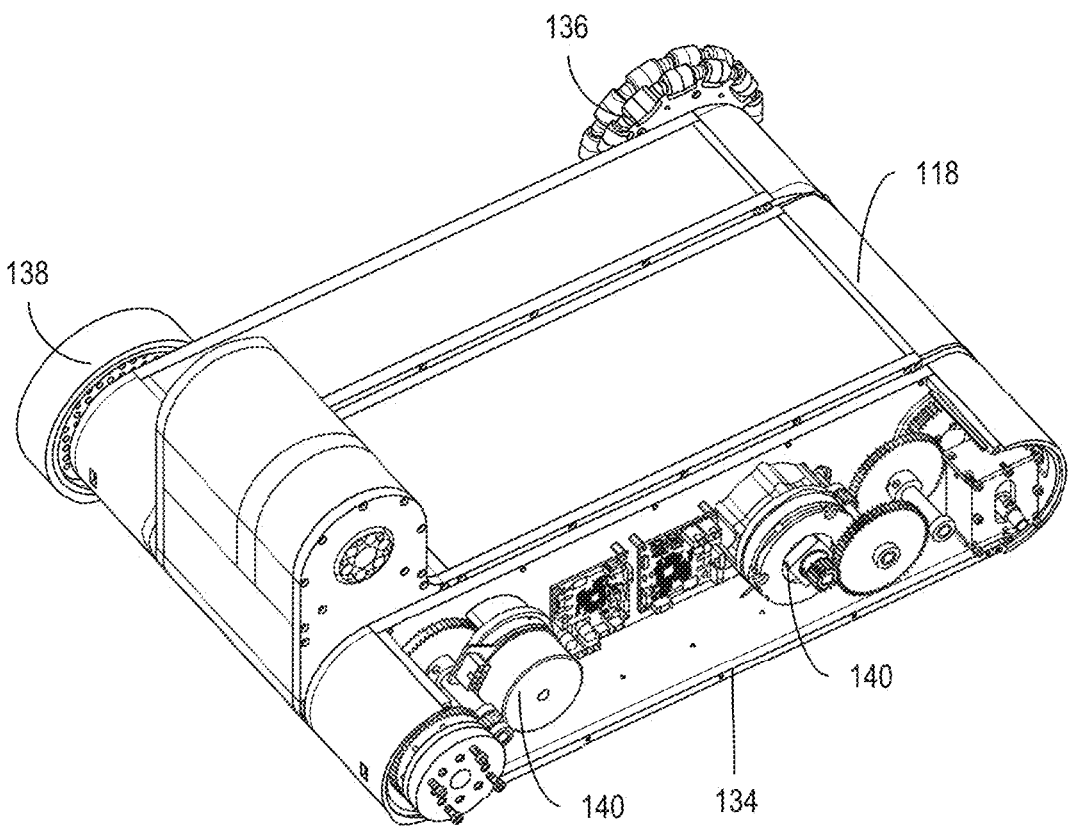
FIGS. 49-54 are sectional views of various components of a robot according to some non-limiting embodiments of the present disclosure.
Figure 50:
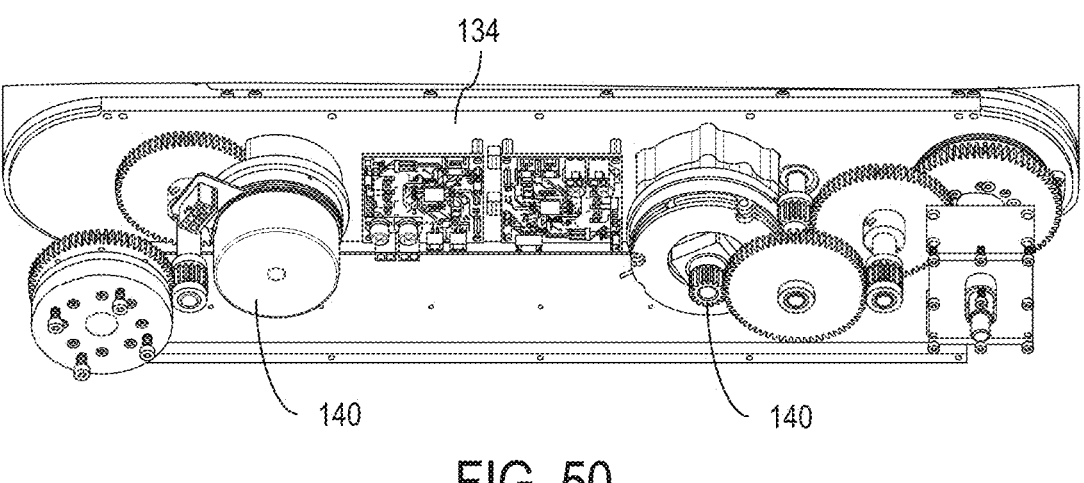

As shown in FIGS. 49 and 50, leg member 134 may include a riser joint combined with a driving joint. For example, leg member 134 may include a front motor 140 with a gear box, an absolute encoder, and a motor controller (i.e., motor controller 500) at the second end of leg member 134. At the first end of leg member 134 may be a similar setup with the addition of a brake. The brake may allow robot 100 to maintain its height without using power. For example, the brake may lock when the power is off. The second end of leg member 134 may also include a passive suspension for first drive wheel 136 with the shaft traveling up and down, supported by linear guides, cushioned by an elastomer. This configuration may reduce vibration all the way up robot 100 to head 102 for stabilization and to improve sensor quality and perception, for example, where robot 100 has to navigate an obstacle such as a carpet or transition strip between room.

In some non-limiting embodiments, riser member 118 (e.g., a secondary link, a riser link) may be mounted to the output of the riser joint. This link may contain the battery, the battery management system, and the charging pads which will be close to the ground in a folded position. At the opposing joint, an RGBD (3D point cloud) camera may be located at the hip height of robot 100 for computer vision mapping, localization, and obstacle avoidance. Torso 110 may be attached to the top of the riser member 118 through a large, actuated torso joint.

Figure 51:
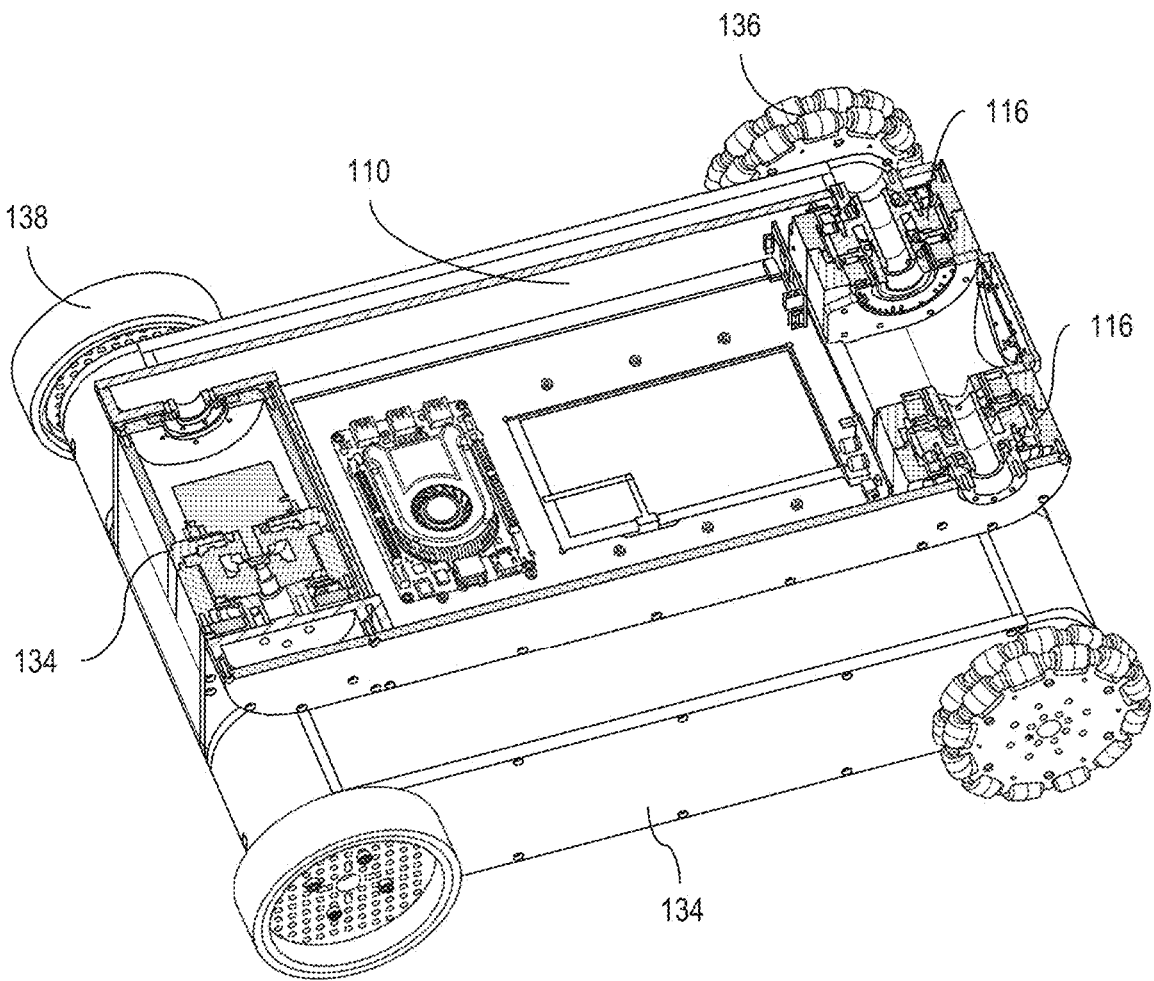

As shown in FIG. 51, torso 110 may include a large torso joint 154 at a second end, which may include a motor, a strain wave gear (i.e., a Harmonic Drive), a controller, and an absolute encoder. Shoulder joint 116 is shown on the first end of torso 110 (right side of figure). In some non-limiting embodiments, a torso joint a torso joint may include a brushless DC motor, coupled with a strain-wave-gear with a reduction of 100:1 to give it enough torque at reduced speeds. The opposite side of the motor may have a slewing ring that may act as an idle joint.

Torso 110 may further house the main computer of robot 100 (e.g., a computer with a GPU), which may communicate with all of the joints of robot 100 over a CAN Bus protocol, as well as multiple ports, and a screen at the center. All cameras and/or sensors of robot 100, from the head and hip, may be attached to the main computer and all of the cables of robot 100 may be routed such that they are concealed. Side shoulder joints 116, with similar construction to the torso joint, may also be attached to the torso 110.

Figure 52:
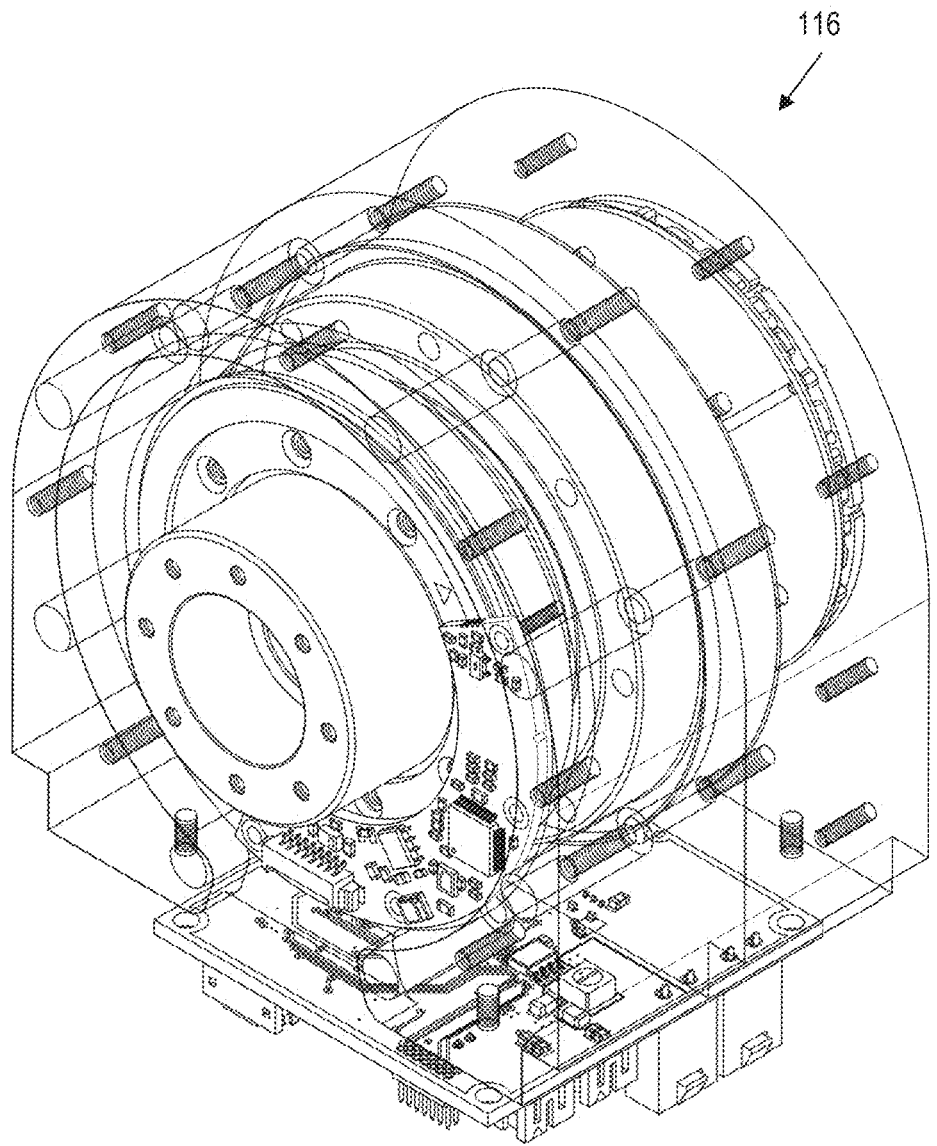

Shoulder joint 116 is illustrated in FIG. 52. Shoulder joint 116 may include a frameless brushless DC motor, a motor controller, a strain wave gear (i.e., a Harmonic Drive), and a brake to hold position under load. The brake may be a spring-loaded power-off brake that is released only under power, thus saving energy and guaranteeing the safety of robot 100 while operating under load. Shoulder joint 116 may further include an 18-bit (262,144 positions) absolute encoder at its output shaft for precise position control. In some non-limiting embodiments, frontal shoulder brackets may be attached to the side shoulder joints. The neck and head assembly may be attached to the upper torso.

Figure 53:
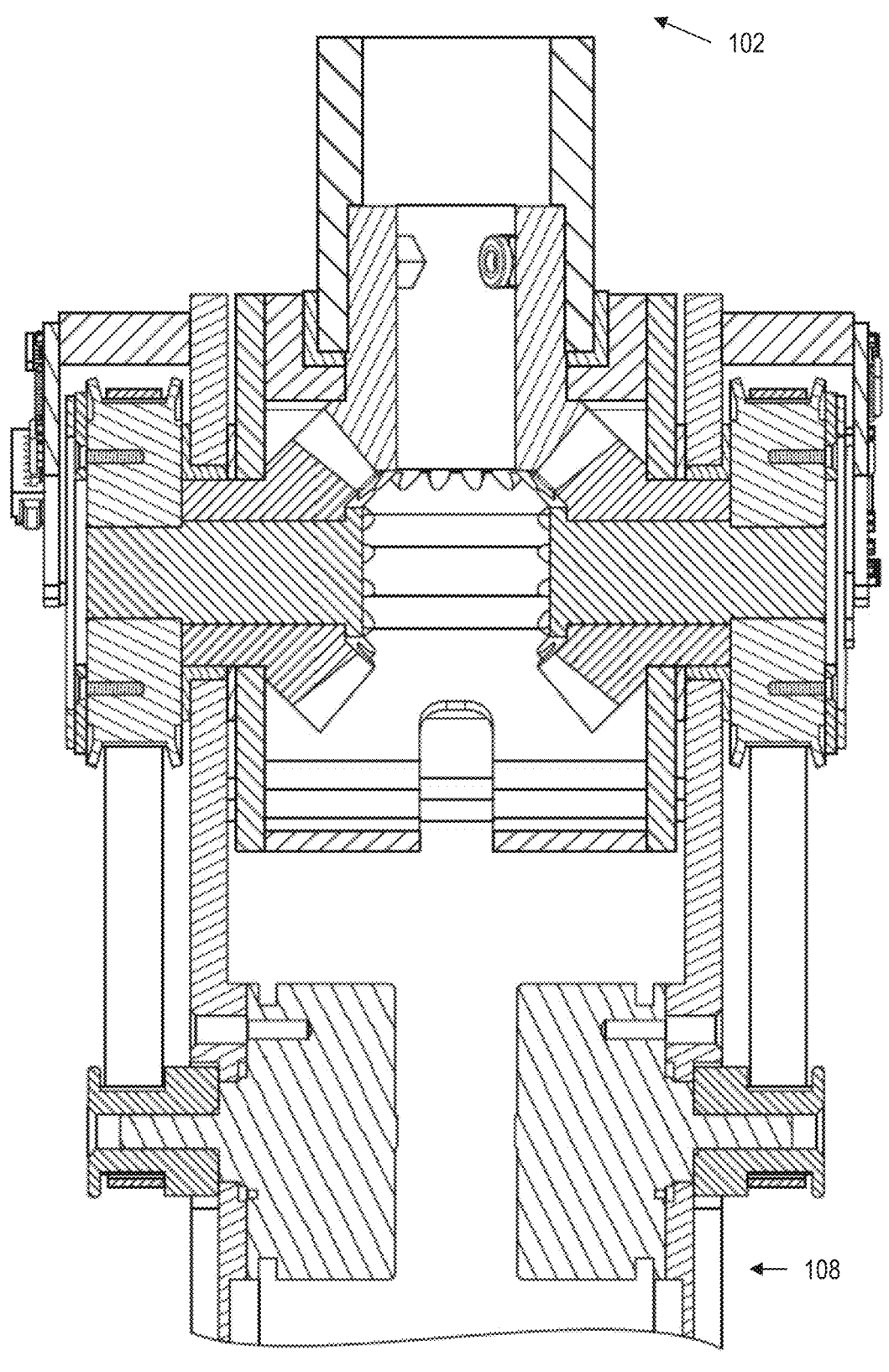
Figure 54:
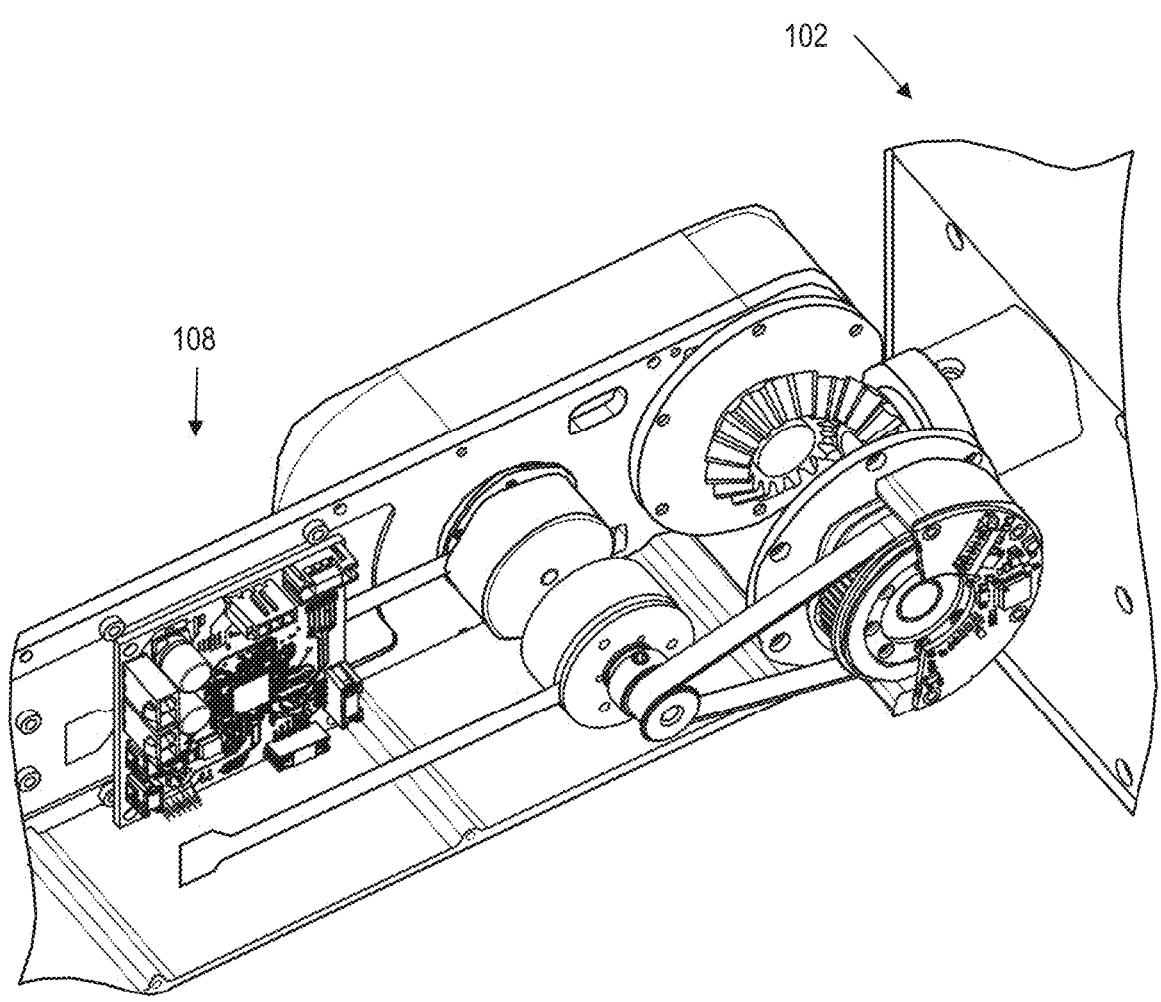

FIGS. 53 and 54 show the differential drive mechanism (i.e., differential joint) of the upper neck joint where elongate neck member 108 is connected to head 102. In exemplary embodiments, two motors work together for the tilt of the central portion of the joint and the roll of the shaft above. This configuration provides head 102 and elongate neck member 108 with tilt and pan capabilities, and also allows cables and USB ports to go internally through elongate neck member 108. The same or a similar configuration may be used for wrist member 124 and for an elbow joint to attach first arm member 120 to second arm member 124. In some non-limiting embodiments, wrist member 124 may utilize a slip ring to transmit power and data between arms 112 and fingers 126, 128 (i.e., the hand of robot 100), which may allow the hand to spin freely as many rotations as necessary, unencumbered by limits of traditional wiring (i.e., tangling). This function may be especially useful for screwing/unscrewing a lightbulb or bolt or opening/closing a jar. Further, the lower neck may unilaterally be driven by a small brushless motor and a mini-harmonic drive as little torque is required, but a smooth motion is still allowed.

Figure 55:
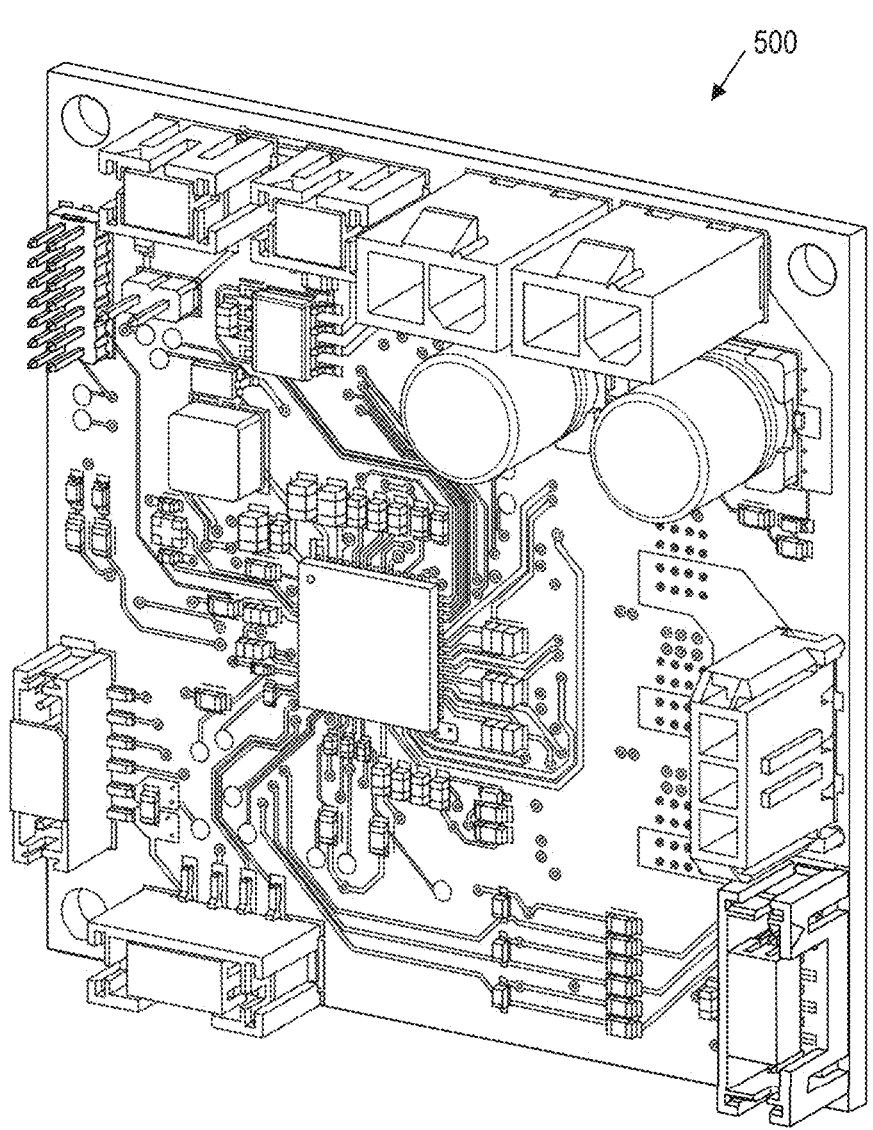
FIGS. 55-57 are various views of a motor controller of a robot according to some non-limiting embodiments of the present disclosure.
Figure 56:
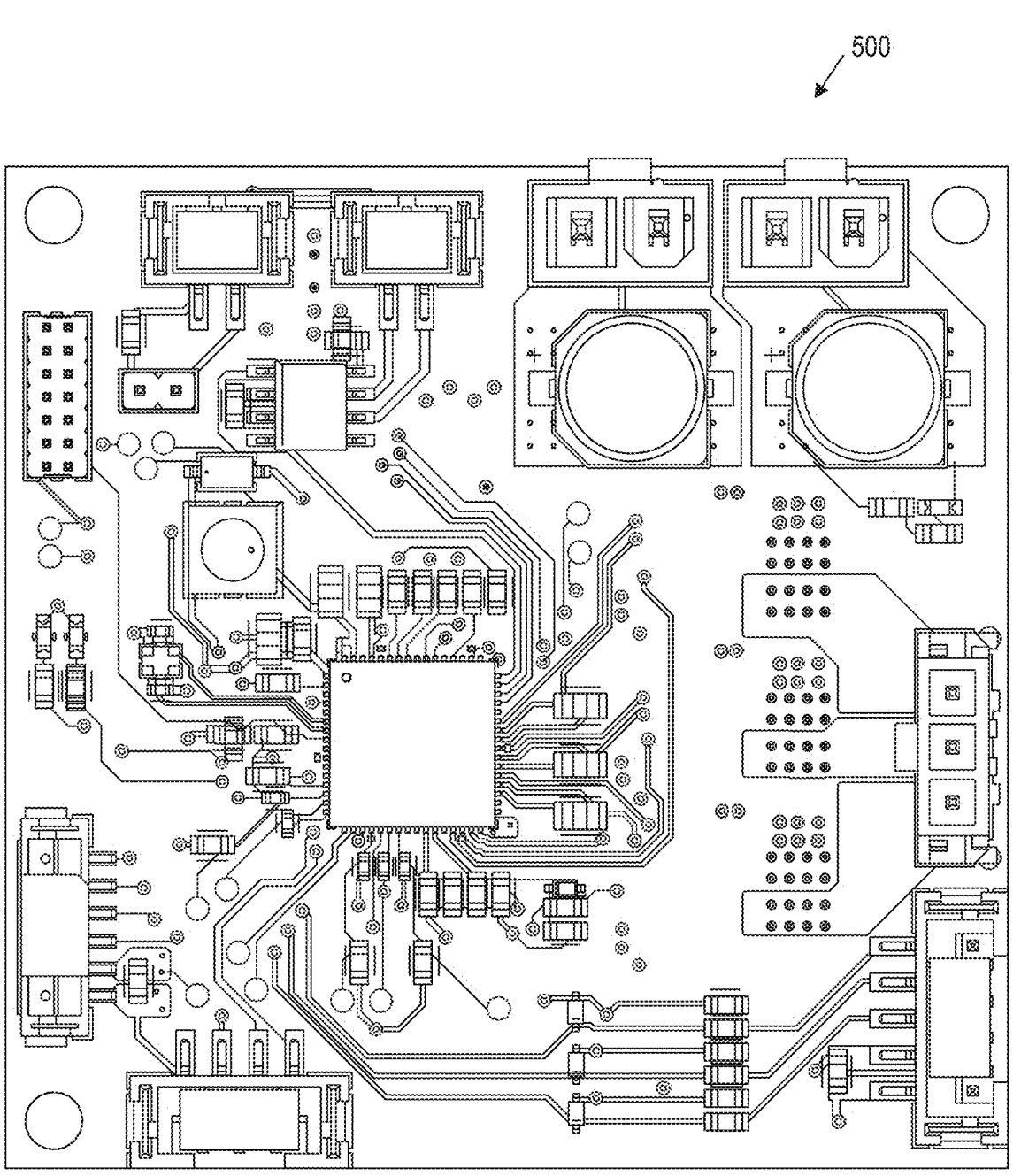
Figure 57:
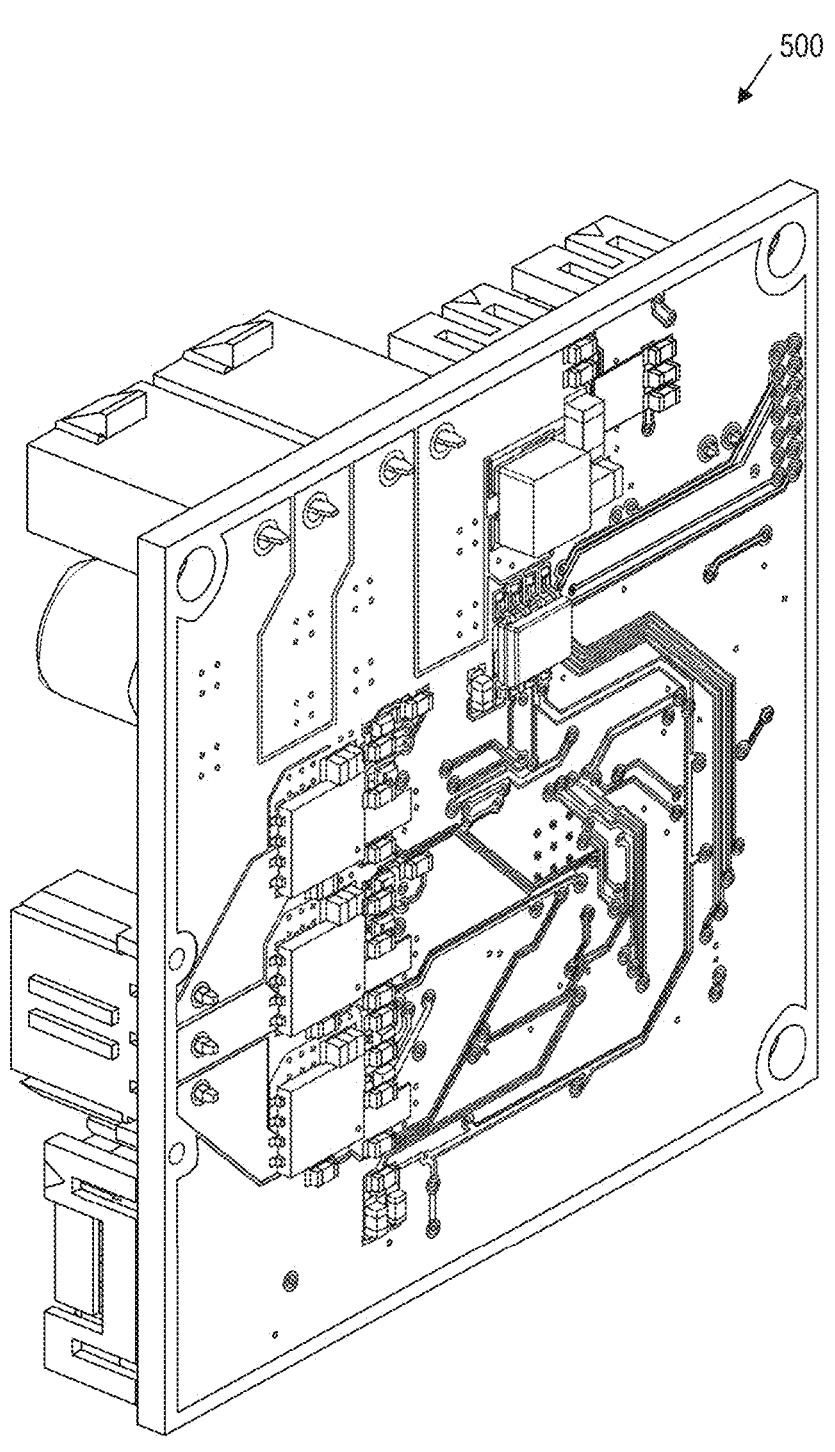

Referring now to FIGS. FIGS. 55-57, FIGS. 55-57 are various views of motor controller 500 of a robot according to some non-limiting embodiments of the present disclosure. According to another aspect of the disclosure, a system (e.g., system 900) for operating a robot may include at least one processor (i.e. a controller, such as controller 500), which may be programmed or configured to receive data associated with robot 100 for completion of household tasks, send data associated with robot 100 for completion of household tasks, learn sequences of operation of robot 100 for completion of household tasks, teach sequences of operation of robot 100 for completion of household tasks, and execute operation of robot 100 for completion of household tasks.

The present configuration may allow control of robot 100 with the versatility and efficiency desired by the user. The motor controller 500 may be a four-layer PCB board with up to 250 W of power. Motor controller 500 may include motor hall-sensor feedback for precise commutation. Motor controller 500 additionally may include daisy chained CAN Bus communication and power lines for robust communication and ease of wiring multiple robotic joints, as well as absolute encoder capability with line drivers. The configuration may also include one or more additional I2C ports to connect with IMU or TOF sensors. Importantly, the controller may have current feedback, so that the torque currently applied to the joint during a task can be computed. This may allow robot 100 to operate among humans and stop the motion of any joint at the lightest unintended contact.

Figure 58:
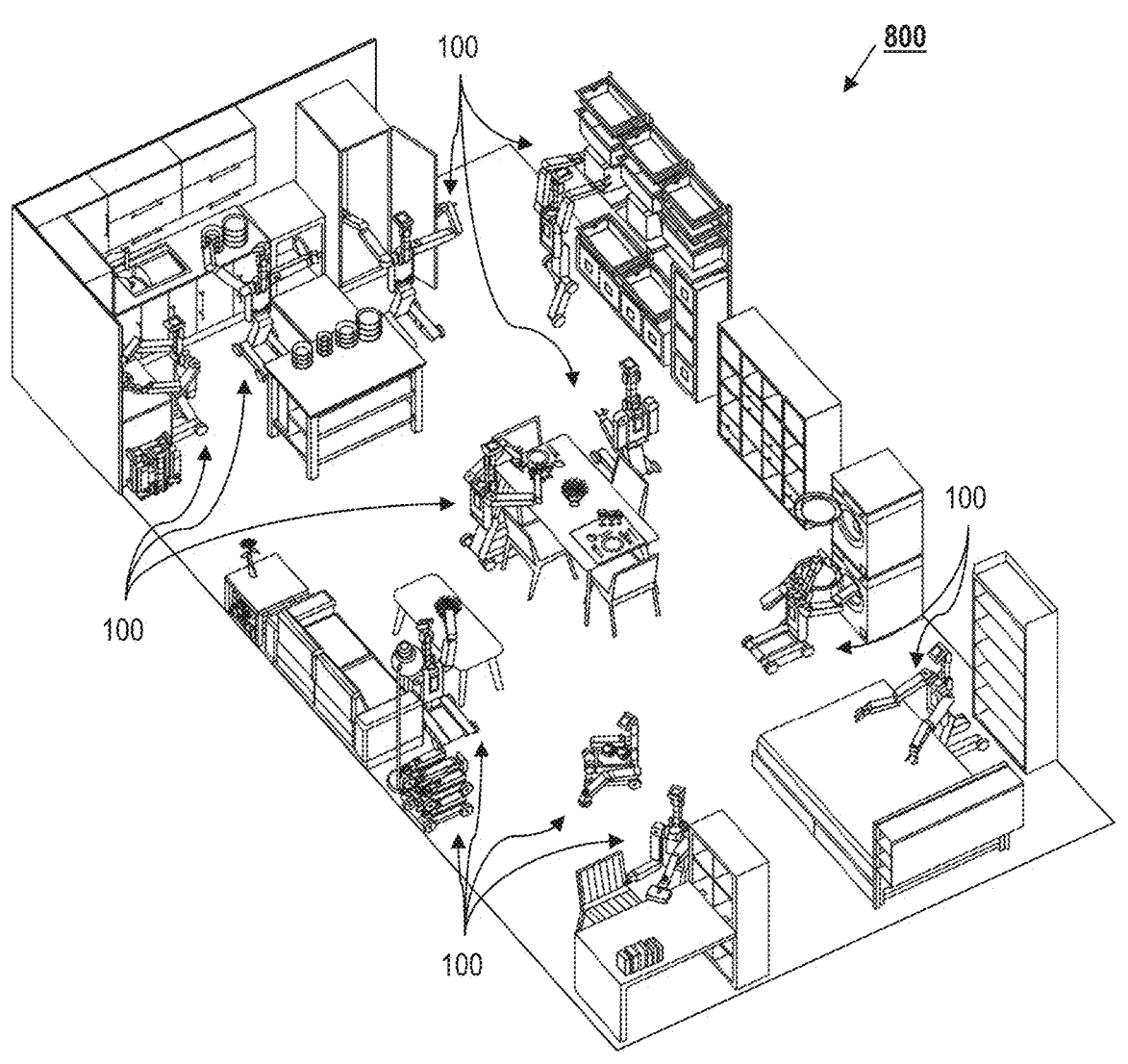
FIG. 58 is a perspective view of an environment in which a robot or a fleet of robots according to some non-limiting embodiments of the present disclosure may be deployed.

Referring now to FIG. 58, FIG. 58 is a perspective view of environment 800 in which robot 100 or a fleet of robots 100 according to some non-limiting embodiments of the present disclosure may be deployed for completion of household tasks. In some exemplary embodiments, environment 800 may be a house, which may include several robots 100 for assisting with and performing household chores in accordance with the present disclosure in various operational states, undergoing completion of various tasks. As shown in FIG. 58, multiple robots 100 can work in a fleet or a swarm to complete tasks faster and easier. For example, two robots 100 placing a bedsheet is much easier than one. Robot 100 may also be taught and learn how to complete new tasks from a user, or from another robot 100 that has already learned how to complete the task, for example, through "swarm" artificial intelligence.

The various states, modes, and positions described and illustrated herein are provided for exemplary purposes and are not to be construed as limiting. It is to be understood that there are various other states, modes, and positions for completing various other tasks that are achievable by robot 100 of the present disclosure.

Figure 59:
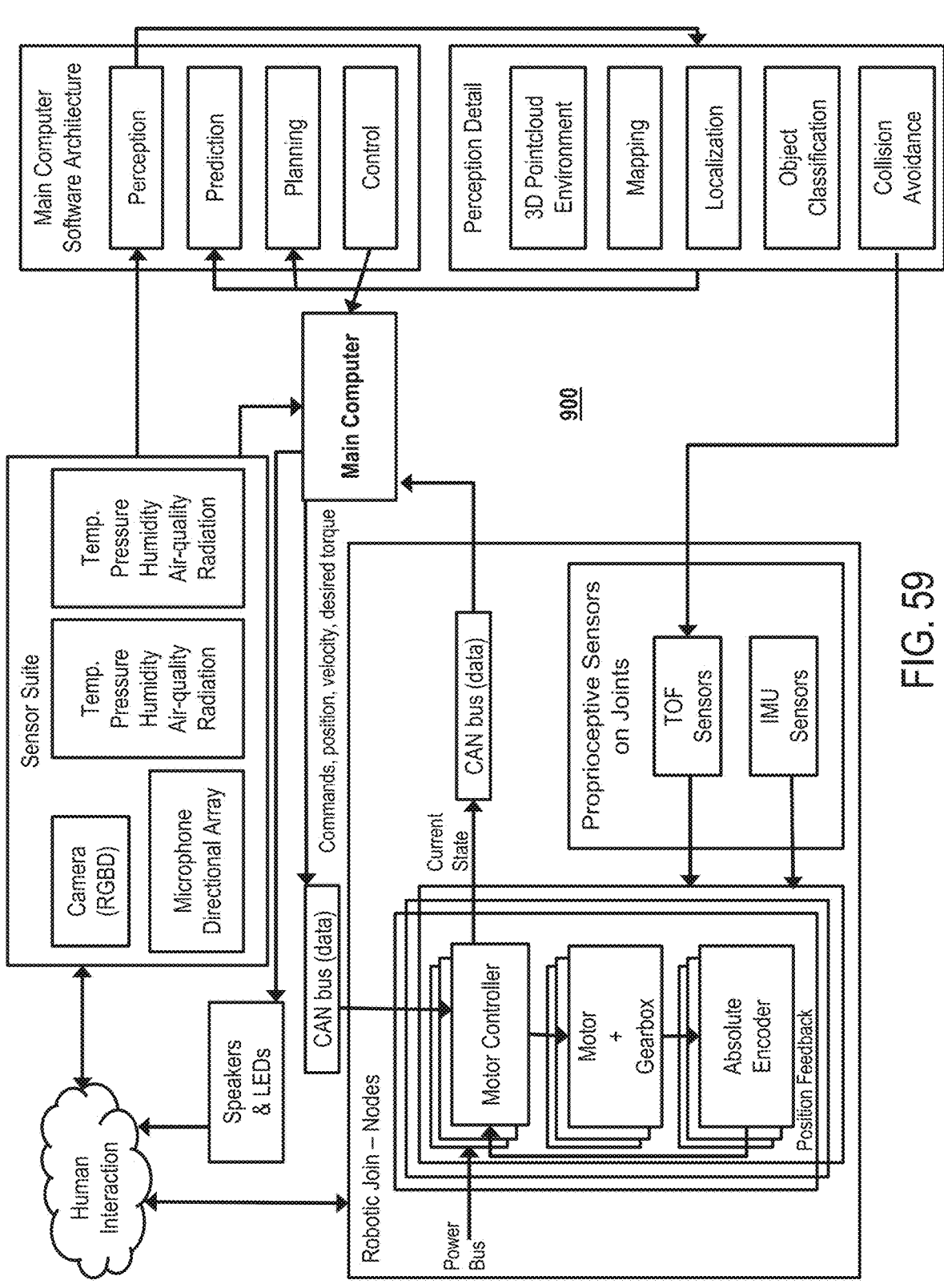
FIG. 59 is a schematic diagram of an exemplary system and components of a robot according to some non-limiting embodiments of the present disclosure.

Referring now to FIG. 59, FIG. 59 is a schematic diagram of an exemplary system 900 and components of robot 100 according to some non-limiting embodiments of the present disclosure. According to another aspect of the disclosure, system 900 for operating a robot may include at least one processor (i.e. a controller, such as controller 500), which may be programmed or configured to receive data associated with robot 100 for completion of household tasks, send data associated with robot 100 for completion of household tasks, learn sequences of operation of robot 100 for completion of household tasks, teach sequences of operation of robot 100 for completion of household tasks, and execute operation of robot 100 for completion of household tasks.

According to another aspect of the disclose, a computer program product for providing one or more features with regard to a robot, the computer program product including at least one computer-readable medium including one or more instructions that, when executed by at least one processor, cause the at least one processor to receive data associated with robot 100 for completion of household tasks, send data associated with robot 100 for completion of household tasks, learn sequences of operation of robot 100 for completion of household tasks, teach sequences of operation of robot 100 for completion of household tasks, and execute operation of robot 100 for completion of household tasks.

It is to be understood, that while the embodiments of the present disclosure have been described with respect to a folding robot for assisting with and performing household chores having multiple states and modes defined by multiple different folding configurations, the robots, devices, systems, and assemblies are applicable for, but not limited to, implementation with regard to the learning and completion of any number of household tasks or chores, and it is considered that there are various other configurations and uses for the robots, devices, systems, and assemblies of the present disclosure. Additionally, although the robot has been described herein with respect to use in a household, it is contemplated that, as general-purpose robot, the robot may also be used anywhere to assist humans with any chores, for example, a working personal assistant robot, such as in an office or work setting, or any other conceivable location where the robot may be useful (e.g., hotels, airports, factories).

While several examples of a folding robot for assisting with and performing household chores having multiple states and modes defined by multiple different folding configurations are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The disclosure described hereinabove is defined by the appended claims and all changes to the disclosure that fall within the meaning and range of equivalency of the claims are to be embraced within their scope.

What is claimed is:

1. A robot for assisting with and performing household chores, comprising:
   a head having a screen and one or more first sensors;
   an elongate neck member;
   a torso;
   one or more arms connected to the torso;
   a riser member connected to the torso and rotatable with respect to the torso;
   one or more legs connected to the riser member, wherein each of the one or more legs comprise:
   a leg member;
   a first drive wheel disposed at a first end of the leg member; and
   a second drive wheel disposed at a second end of the leg member,
   wherein the first drive wheel and second drive wheel are independently controllable for travel of the robot; and
   at least one controller configured to send and receive data associated with the robot for completion of household tasks,
   wherein the robot is configured to move and fold to multiple states such that components of the robot including the head, the elongate neck member, the torso, the one or more arms, the riser member, and the one or more legs including the leg member, the first drive wheel, and the second drive wheel are positionable in multiple configurations, and
   wherein, in at least one state of the multiple states, the second drive wheel of the one or more legs is locked by a brake and in contact with a surface of travel and the one or more legs extend upward from the second drive wheel of the one or more legs at an angle with respect to the surface of travel.

2. The robot of claim 1,
   wherein each state of the multiple states correspond to a mode of operation defined by a task to be completed, and further defined by which of the components are extended, folded, moved, or otherwise positioned for completion of various household tasks.

3. The robot of claim 2, wherein a hip joint of each one or more legs allows rotation of the leg member with respect to the riser member,
   wherein a shoulder joint of each of the one or more arms allows rotation of the first arm member with respect to the torso about a first axis extending perpendicular from a side surface of the torso and about a second axis extending perpendicular to the first axis.

4. The robot of claim 3, wherein the elongate neck member is configured to rotate with respect to the torso, and wherein the head is rotatable with respect to the elongate neck member about a fifth axis extending from the elongate neck member and about a sixth axis extending perpendicular to the fifth axis.

5. The robot of claim 4, wherein the robot comprises:
two arms connected to the torso; and
two legs connected to the riser member;
wherein the first and second drive wheels of each leg member are actuated by independent motors, and
wherein each of the independent motors are controlled by the controller for travel of the robot.

6. The robot of claim 5, wherein the one or more first sensors of the head of the robot is a camera, and wherein robot comprises at least one of the following additional sensors:
a camera;
a motion sensor;
a time-of-flight sensor;
a multiple inertial measurements unit sensor;
an accelerometer;
a pressure sensor;
a temperature sensor;
a humidity sensor;
a smoke detector;
a Carbon Monoxide (CO) sensor;
a particulate matter sensor;
an indoor air-quality sensor;
a radiation sensor;
an oximeter;
a heart rate sensor; or
a biometric sensor.

7. The robot of claim 6, further comprising one or more speakers, one or more lights, and one or more microphones,
wherein the one or more speakers are configured to communicate audible warnings, alerts, messages and instructions to a user and other robots,
wherein the one or more lights are configured to communicate visual warnings, alerts, messages and instructions to a user and other robots,
wherein the one or more microphones are configured to record sounds including verbal commands from a user, and
wherein the controller is further configured to receive and process the sounds recorded by the one or more speakers, convert the sounds to a data set, and communicate the data set with the components during execution of a task.

8. The robot of claim 4, wherein a first mode of operation is a standby mode in which the robot is in a folded state such that:
the elongate neck member, the torso, the first arm member, the second arm member, the riser member, and the one or more legs are rotated and folded to be parallel to each other;
the head is folded down such that the one or more first sensors is directed perpendicular to the elongate neck member, the torso, the first arm member, the second arm member, the riser member, and the one or more legs.

9. The robot of claim 8, wherein in a second mode of operation, the robot is in a partially folded state such that:
the torso, the first arm member, the second arm member, the riser member, and the one or more legs are rotated and folded to be parallel to each other;
the elongate neck member is extended upward to be perpendicular to the riser member; and the screen or the one or more first sensors is directed perpendicular to the elongate neck member in a first direction.

10. The robot of claim 9, wherein in a third mode of operation, the robot is in a partially extended state such that:
the riser member, and the one or more legs are rotated and folded to be parallel to each other;
the torso is extended perpendicular to the riser member;
the elongate neck member is extended up from and parallel to the torso; and
the screen or the one or more first sensors is directed perpendicular to the elongate neck member in a first direction.

11. The robot of claim 10, wherein in a fourth mode of operation, the robot is in a partially extended state such that:
the riser member, and the one or more legs are rotated and folded to be parallel to each other;
the torso is extended perpendicular to the riser member;
the elongate neck member is extended up from and parallel to the torso; and
the screen or the one or more first sensors is directed perpendicular to the elongate neck member in a second direction, opposite the first direction.

12. The robot of claim 11, wherein in a fifth mode of operation the robot is in a partially extended state such that:
the one or more legs are rotated and folded to be parallel to each other and to the surface of travel and the first and second drive wheels are in contact with the surface of travel;
the riser member is extended up from and at an angle with respect to the one or more legs;
the torso is extended up from and at an angle with respect to the riser member;
the elongate neck member is extended up from and at an angle with respect to the riser member;
the screen or the one or more first sensors is directed in the second direction; and
the one or more arms extend from the torso in the second direction.

13. The robot of claim 12, wherein in a sixth mode of operation the robot is in a partially extended state such that:
the one or more legs are rotated and folded to be parallel to each other and to the surface of travel and the first and second drive wheels are in contact with the surface of travel;
the riser member is extended up from and at an angle with respect to the one or more legs;
the torso is extended up from and at an angle with respect to the riser member;
the elongate neck member is extended up from and at an angle with respect to the riser member;
the screen or the one or more first sensors is directed in the first direction; and
the one or more arms extend from the torso in the first direction.

14. The robot of claim 13, wherein in a seventh mode of operation the robot is in an extended state such that:
the second drive wheel of the one or more legs is locked by the brake and in contact with the surface of travel;
the one or more legs extend upward from the second drive wheel of the one or more legs at an angle with respect to the surface of travel;
the riser member is extended up from and at an angle with respect to the one or more legs;
the torso is extended up from and at an angle with respect to the riser member;

the elongate neck member is extended up from and at an angle with respect to the riser member; and the robot is self-balancing on the second drive wheel of the one or more legs.

15. The robot of claim 13, wherein the torso comprises a recess configured to receive and store one or more object and a lid configured to cover the recess and hold the one or more object in the recess in a closed position, and wherein, in an open position, the lid is configured to be a shelf for holding one or more object.

16. The robot of claim 1, wherein the riser member comprises a compartment configured to receive and store one or more objects and a handle configured to allow a user to pick up and transport the robot.

17. The robot of claim 16, wherein the compartment is further configured to receive and store one or more rechargeable batteries configured to power the robot, and a battery management system.

18. The robot of claim 16, wherein a surface of the riser member comprises at least one charging terminal configured to accept one or more wires to charge the rechargeable batteries and configured to interact with a wireless charging pad to charge the rechargeable batteries.

19. A system for operating a robot according to claim 1, the system comprising:

at least one processor programmed or configured to receive data associated with the robot for completion of household tasks, send data and associated with the robot for completion of household tasks, learn sequences of operation of the robot for completion of household tasks, teach sequences of operation of the robot for completion of household tasks, and execute operation of the robot for completion of household tasks.

* * * * *